US012580738B1

(12) United States Patent

Nair

(10) Patent No.: US 12,580,738 B1

(45) Date of Patent: Mar. 17, 2026

(54) SYSTEM AND METHOD FOR MULTI-FACTOR KEY DERIVATION

(71) Applicant: Multifactor, Inc., Newark, DE (US)

(72) Inventor: Vivek Chinar Nair, Santa Clara, CA (US)

(73) Assignee: Multifactor, Inc., Newark, DE (US)

( * ) Notice: Subject to any disclaimer, the term of this patent is extended or adjusted under 35 U.S.C. 154(b) by 494 days.

(21) Appl. No.: 18/152,660

(22) Filed: Jan. 10, 2023

Related U.S. Application Data

(60) Provisional application No. 63/266,610, filed on Jan. 10, 2022.

(51) Int. Cl.
  *H04L 9/08* (2006.01)
  *H04L 9/40* (2022.01)

(52) U.S. Cl.
  CPC .......... *H04L 9/0822* (2013.01); *H04L 63/083* (2013.01); *H04L 2463/082* (2013.01)

(58) Field of Classification Search
  None
  See application file for complete search history.

(56) References Cited

U.S. PATENT DOCUMENTS

| | | | | |
|---|---|---|---|---|
| 6,996,718 | B1 * | 2/2006 | Henry ..................... | G06F 21/41 |
| | | | | 713/184 |
| 8,656,471 | B1 * | 2/2014 | Allen ..................... | H04L 63/08 |
| | | | | 726/19 |
| 10,615,975 | B2 * | 4/2020 | Jeon ..................... | H04L 9/0869 |
| 2005/0047598 | A1 * | 3/2005 | Kruegel ................. | H04L 9/083 |
| | | | | 380/264 |
| 2005/0069138 | A1 * | 3/2005 | de Jong ................. | G06F 9/3017 |
| | | | | 380/278 |
| 2010/0100724 | A1 * | 4/2010 | Kaliski, Jr. ........... | H04L 9/3226 |
| | | | | 713/171 |
| 2010/0115260 | A1 * | 5/2010 | Venkatesan ........... | H04L 9/3234 |
| | | | | 713/150 |
| 2013/0132720 | A1 * | 5/2013 | Parsons ................. | H04L 9/3247 |
| | | | | 713/167 |
| 2014/0164768 | A1 * | 6/2014 | Kruglick ............... | H04L 63/062 |
| | | | | 713/168 |
| 2015/0263856 | A1 * | 9/2015 | Leboeuf ................ | H04L 9/0866 |
| | | | | 713/184 |
| 2016/0028737 | A1 * | 1/2016 | Srinivasan .......... | H04L 63/0807 |
| | | | | 726/4 |
| 2019/0268332 | A1 * | 8/2019 | Wang ..................... | G06F 21/32 |
| 2020/0076589 | A1 * | 3/2020 | Jeon ..................... | H04L 9/0894 |
| 2020/0328896 | A1 * | 10/2020 | Pellizzer ............... | H04L 9/3242 |
| 2024/0073693 | A1 * | 2/2024 | Vachnish .............. | H04L 9/3263 |

* cited by examiner

*Primary Examiner* — Backhean Tiv

(74) *Attorney, Agent, or Firm* — Robinson IP Law, PLLC

(57) ABSTRACT

A system and method for multi-factor key derivation includes: a user having a plurality of authentication factors; whereby the plurality of authentication factors are converted into key material using intermediate factor-specific functions, and whereby said key material is then converted into a key using a key derivation function.

20 Claims, 52 Drawing Sheets

Figure 8:
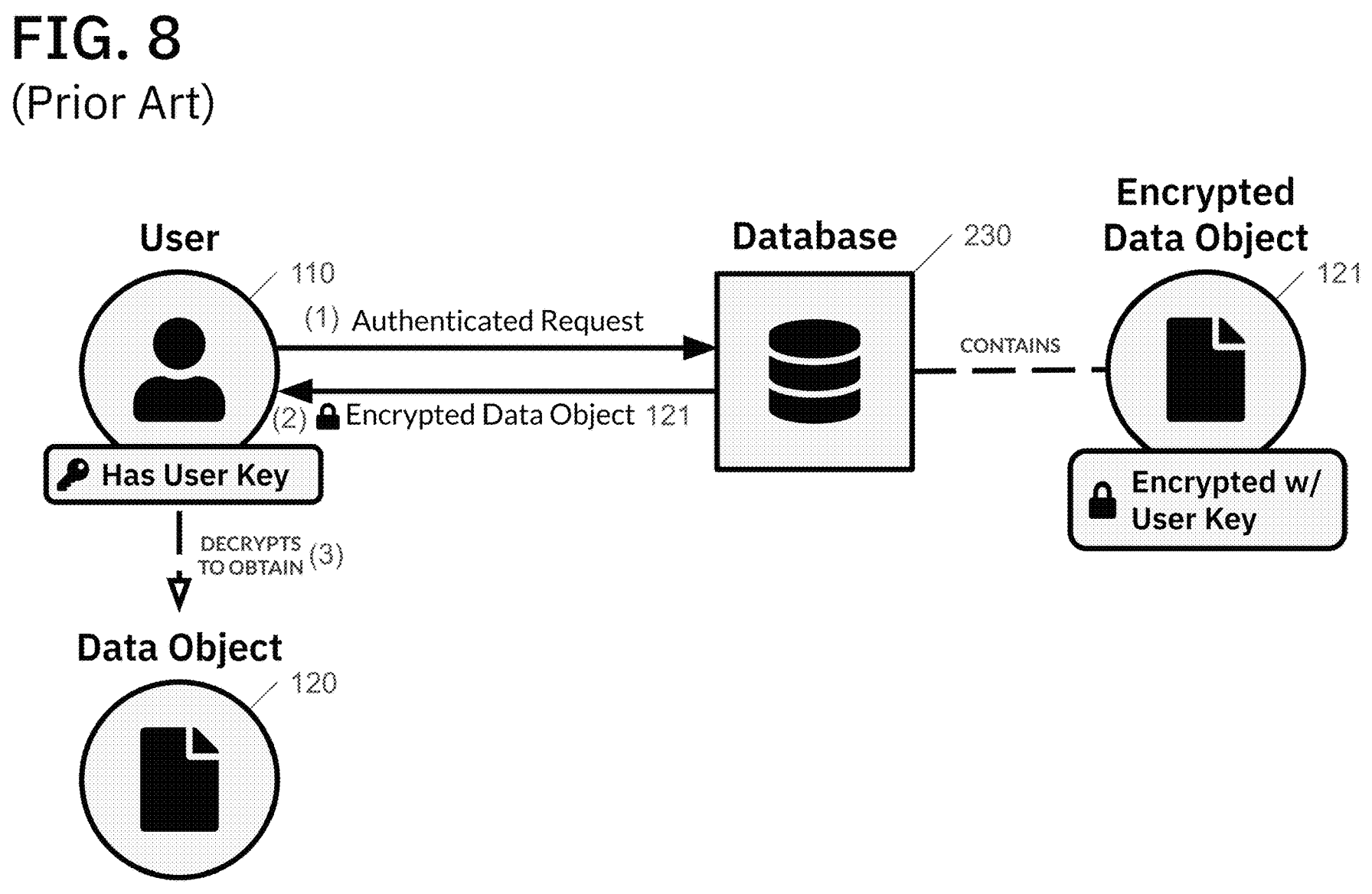

Encrypted Data Object 121

Encrypted w/ User Key

Database 230

CONTAINS (1) Authenticated Request (2) Encrypted Data Object 121

User 110

Has User Key

DECRYPTS (3) TO OBTAIN

Data Object 120

Figure 11:
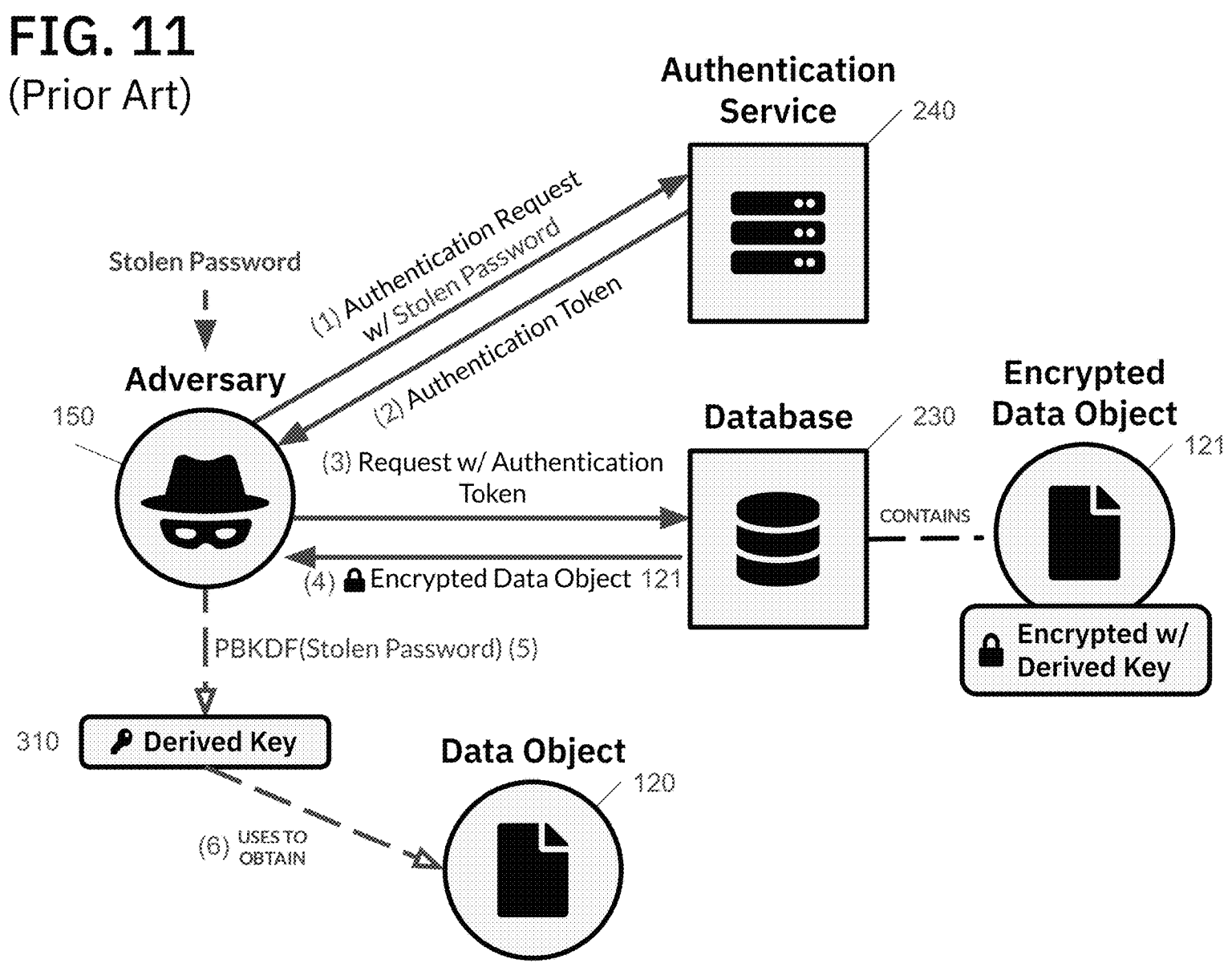

Authentication Service 240

Encrypted Data Object 121

Encrypted w/ Derived Key

Database 230

CONTAINS

Stolen Password

Adversary 150

(1) Authentication Request w/ Stolen Password (2) Authentication Token (3) Request w/ Authentication Token (4) Encrypted Data Object 121

PBKDF(Stolen Password) (5)

Derived Key 310

(6) USES TO OBTAIN

Data Object 120

Figure 13:
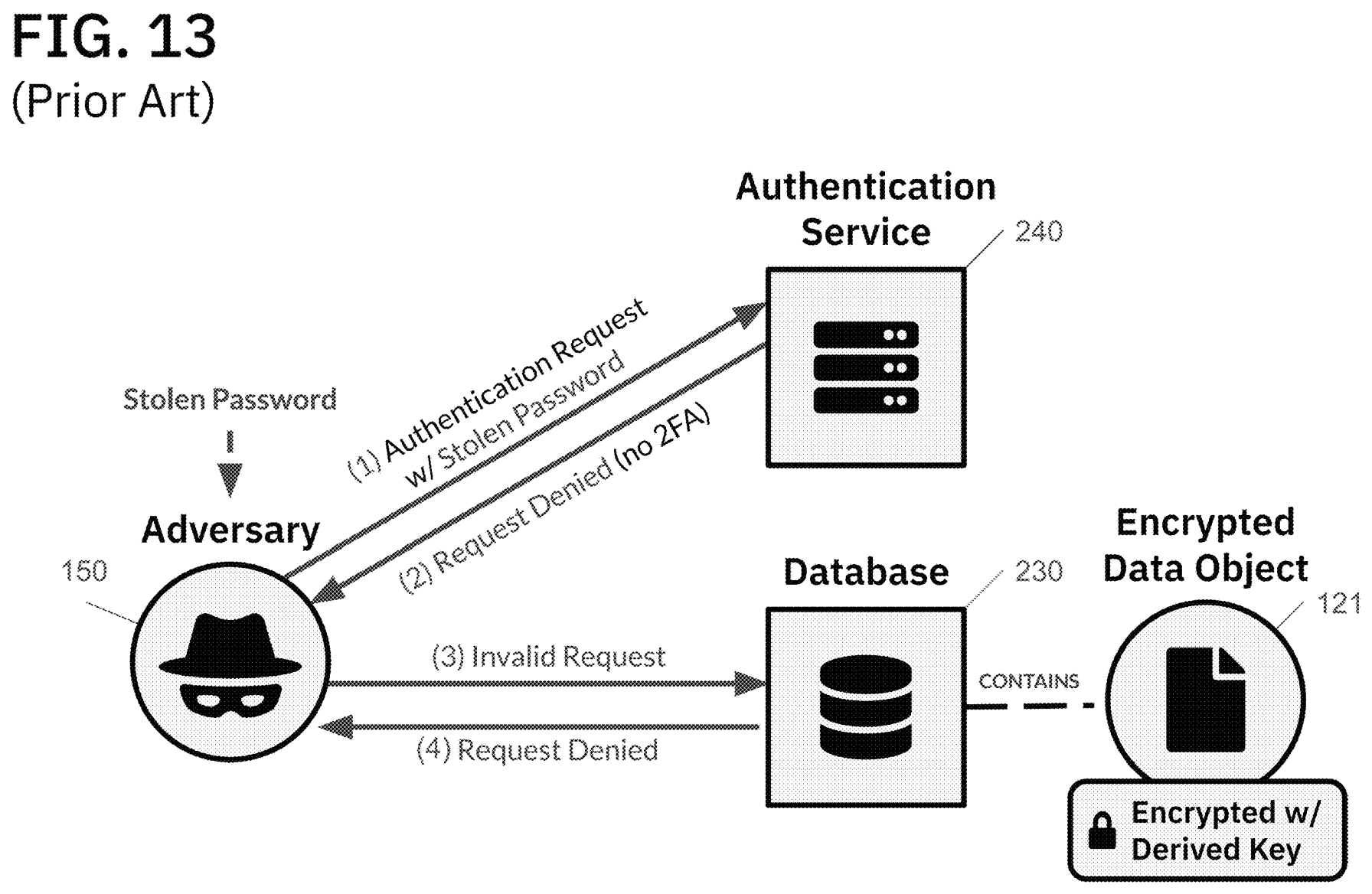

Encrypted
Data Object — 121

Encrypted w/
Derived Key

CONTAINS

Authentication
Service — 240

Database — 230

Stolen Password

Adversary — 150

(1) Authentication Request
w/ Stolen Password (2) Request Denied (no 2FA)

(3) Invalid Request (4) Request Denied

FIG. 21

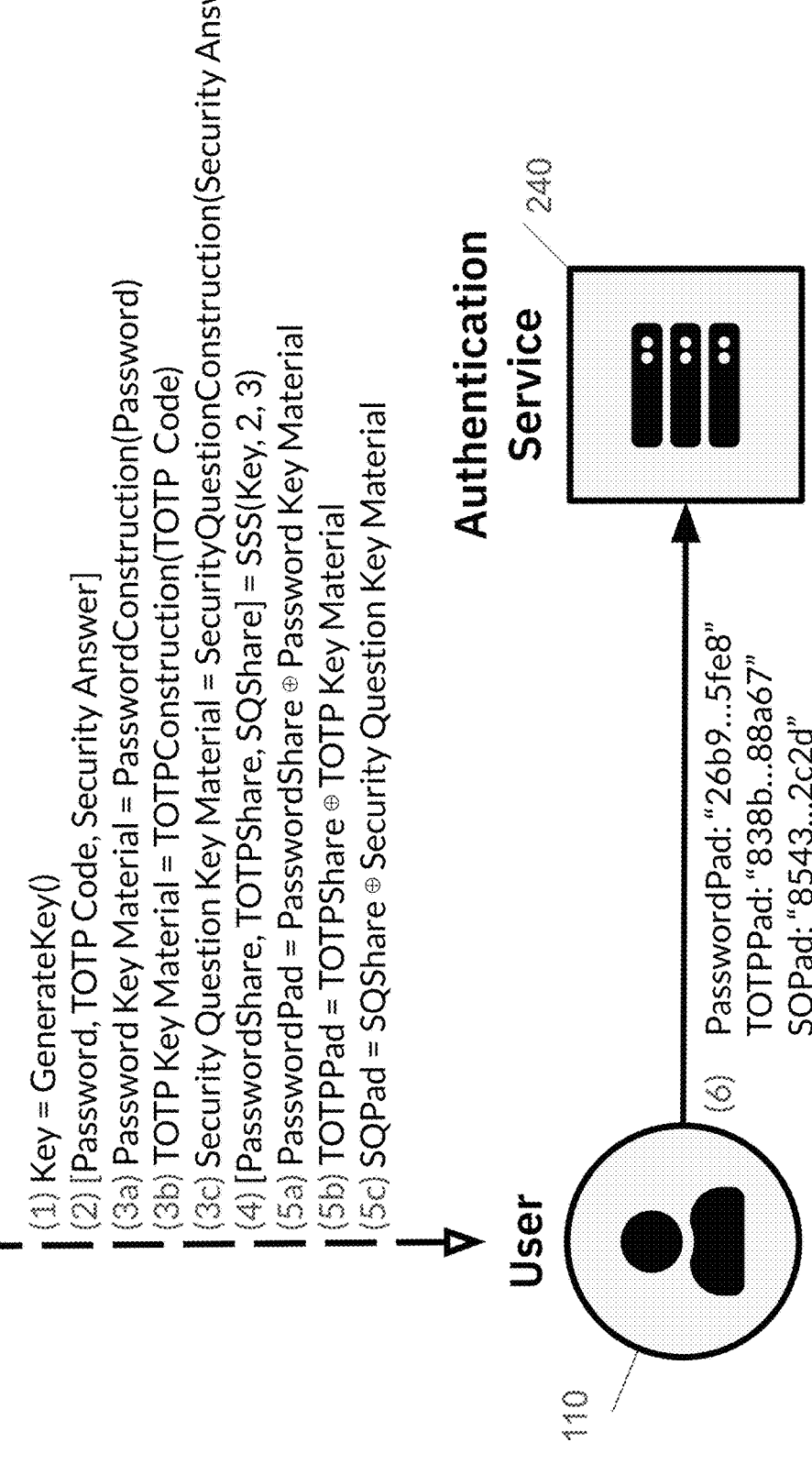

(1) Key = GenerateKey()
(2) [Password, TOTP Code, Security Answer]
(3a) Password Key Material = PasswordConstruction(Password)
(3b) TOTP Key Material = TOTPConstruction(TOTP Code)
(3c) Security Question Key Material = SecurityQuestionConstruction(Security Answer)
(4) [PasswordShare, TOTPShare, SQShare] = SSS(Key, 2, 3)
(5a) PasswordPad = PasswordShare ⊕ Password Key Material
(5b) TOTPPad = TOTPShare ⊕ TOTP Key Material
(5c) SQPad = SQShare ⊕ Security Question Key Material (6)  PasswordPad: "26b9...5fe8"
     TOTPPad: "838b...88a67"
     SQPad: "8543...2c2d"

User
110

Authentication Service
240

(1) Key = GenerateKey()

(2) [Factors]

(3) [Factor Key Material] = [Factor Constructions] ○ [Factors]

(4) [Factor Shares] = SSS(Key, k, n)

(5) [Factor Pads] = [Factor Shares] ⊕ [Factor Key Material]

User

110

(6)    [Factor Pads]

Authentication Service

Figure 48:
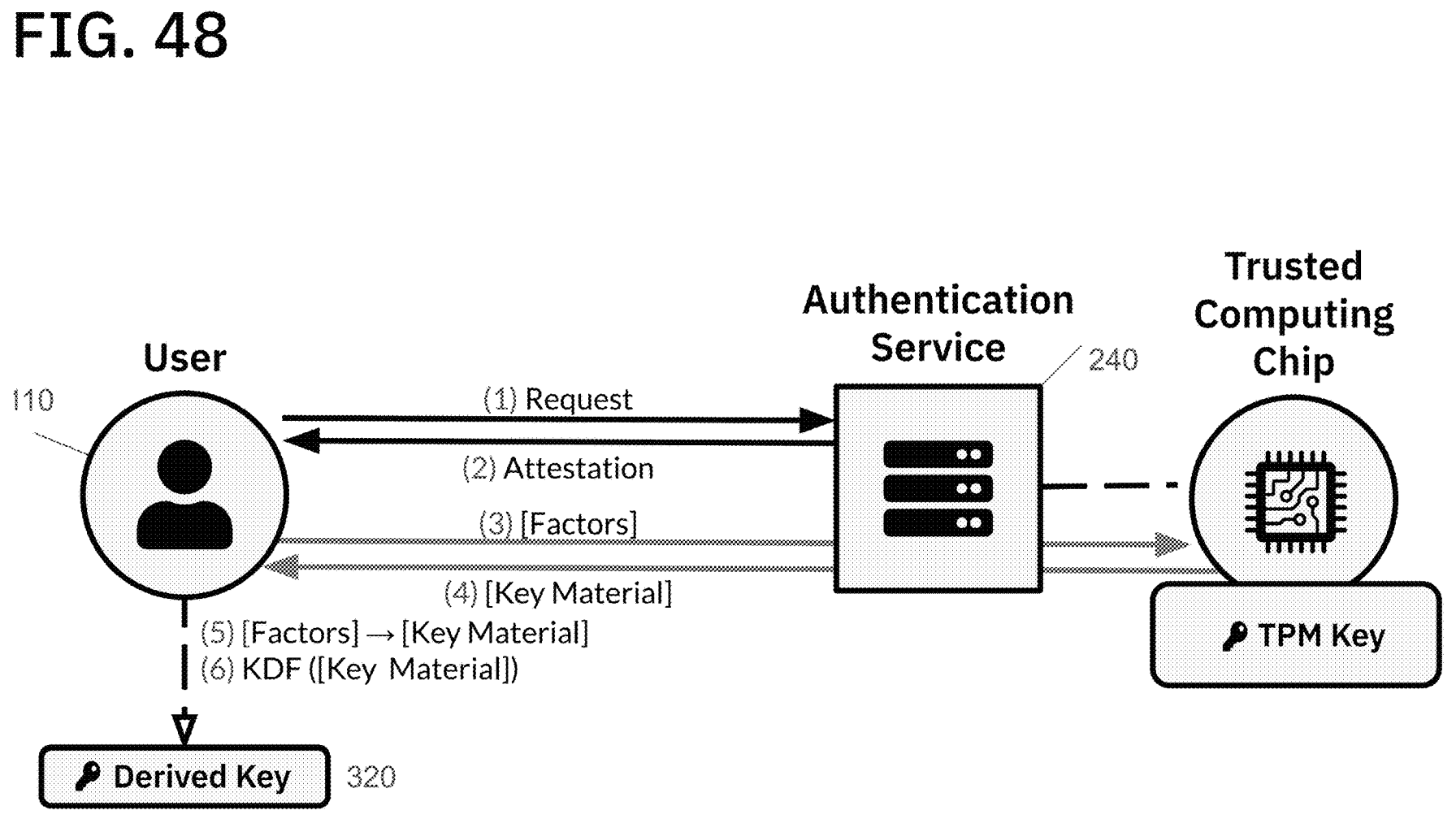

Trusted Computing Chip

TPM Key

Authentication Service 240

(1) Request (2) Attestation (3) [Factors]

(4) [Key Material]

(5) [Factors] → [Key Material]

(6) KDF ([Key Material])

User 110

Derived Key 320

SYSTEM AND METHOD FOR
MULTI-FACTOR KEY DERIVATION

CROSS-REFERENCE TO RELATED
APPLICATION

This application claims priority to and is a non-provisional of U.S. Patent Application Ser. No. 63/266,610 filed on Jan. 10, 2022 for a System and Method for Multi-factor Key Derivation, the contents of which are incorporated herein by reference in its entirety.

FIELD

This disclosure relates to the field of information security. More particularly, this disclosure relates to systems and methods for cryptographic key derivation.

BACKGROUND

A secure data storage system or secure database 230 is principally concerned with ensuring that sensitive information is made available to authorized users while being completely inaccessible by all entities lacking proper authorization. FIG. 1 illustrates a simple data storage system in which an authorized user 110 sends an authenticated request to a database 230 to retrieve a sensitive data object 120. An authenticated request may be produced using digital signatures, message authentication codes, or by using an authentication protocol to retrieve an authentication token. FIG. 2 illustrates the use of an authentication service 240 to produce an authentication token in response to an authentication request presenting an authentication factor such as a password. The authentication token can in turn be used to authenticate a request to a database 230 and retrieve a sensitive data object 120. The authentication service 240 may in practice be co-located with the data storage service (database 230) or provided separately by an authentication server. FIG. 3 illustrates that if a secure authentication scheme is used, an unauthorized user will not be able to produce a valid authenticated request and will therefore not be able to retrieve a sensitive data object 120. Therefore, if the data storage system is not compromised, it theoretically succeeds at ensuring that sensitive information is made available exclusively to authorized users.

Systems like those shown in FIGS. 1-3 rely on the correct operation of the system components to protect sensitive data. If an error exists in the design or implementation of the system, an adversary 150 may attempt to exploit the flaw to obtain sensitive data without proper authorization as shown in FIG. 4. Relying on a flawless and perfectly secure implementation for enforcement of a data access policy may not be considered practical or ideal in the design of secure systems. By contrast, encryption provides strong security guarantees for data based on mathematical properties of the underlying cryptographic algorithms.

FIG. 5 illustrates a secure data storage system which uses encryption to protect data at rest. When presented with a valid authenticated request, the database 230 decrypts an encrypted data object 121 using a stored encryption key prior to returning the decrypted data object 120 to the entity issuing the request. Even if an implementation flaw allows data to be leaked to an adversary, such data will be unusable to unauthorized parties if the encryption algorithm used is well designed and implemented, as shown in FIG. 6. Since encryption algorithms are typically standardized and used across numerous different systems, their design and implementation is usually much more thoroughly scrutinized than that of an individual system. The potential attack surface of such a system is thus significantly reduced while security guarantees of the system are strengthened. However, just as system vulnerabilities may allow an adversary 150 to obtain an encrypted data object 121 without proper authorization, vulnerabilities may similarly allow an adversary 150 to obtain an encryption key without authorization, particularly if it is stored in the same location as the data. This would allow the adversary 150 to once again obtain the sensitive data object 120 without authorization by decrypting it using the obtained key, as shown in FIG. 7. Using encryption to protect data is not as effective if the encrypted data and encryption key are stored in the same location. Therefore, user encryption keys are used to store encrypted data.

FIG. 8 illustrates a secure data storage system where a user key is used to encrypt data stored in the system. When an authorized user 110 presents a valid authenticated request, the database 230 returns the encrypted data object 121 which it is storing (as it does not possess the key to decrypt the object). The user 110 then uses the user key in its possession to decrypt the data object 120. Now, even if an implementation flaw allows data to be leaked to an adversary, such data will be encrypted using the user key and thus unusable to the adversary, as shown in FIG. 9. Furthermore, because the encryption key is not stored in the database 230, it cannot be easily stolen by the adversary 150 via the same flaw used to obtain the encrypted data. Therefore, the system once again succeeds at ensuring that sensitive information is made available exclusively to authorized users. However, unlike authentication factors such as passwords, encryption keys are too complicated to be remembered by users. Storage of encryption keys on user devices risks rendering the encrypted data objects completely inaccessible in the event that the user devices are lost or damaged. Therefore, a password-based key derivation function is used to derive the user key from the user's password when it is needed.

Figure 10:
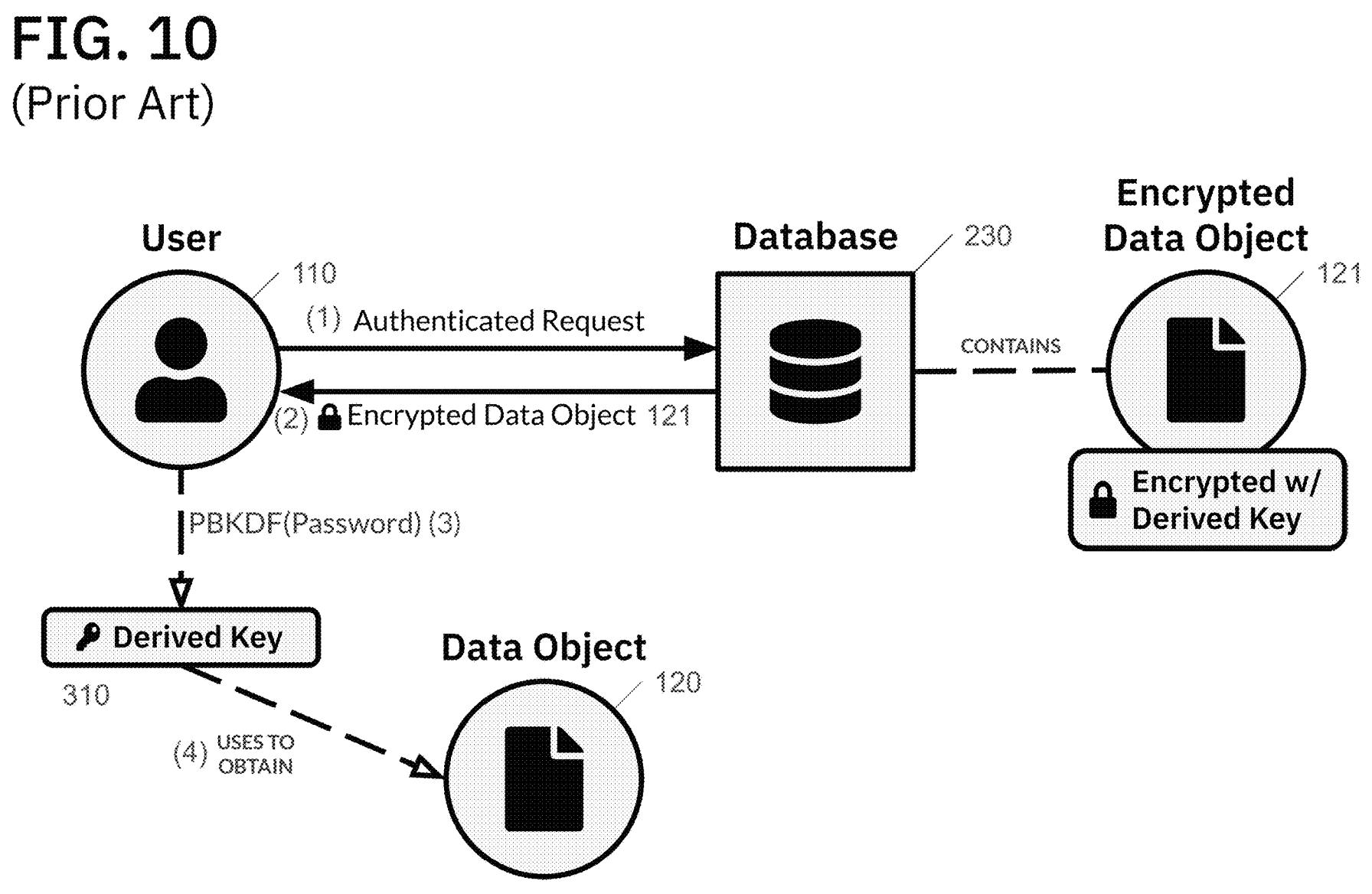

FIG. 10 illustrates a secure data storage system in which data is encrypted at rest using a password-derived key 310. An authorized user 110 sends an authenticated request to a database 230 which responds with an encrypted data object 121. The user 110 then uses a password-based key derivation function to derive a user key which can then be used to decrypt the data object 120. As before, if the adversary 150 compromises the database 230, they will only be able to obtain an encrypted version of the sensitive data object 120 (FIG. 9). Furthermore, if the adversary 150 is unaware of the user's password, they will not be able to derive the user's key and decrypt the data. The system once again succeeds at ensuring that sensitive information is made available exclusively to authorized users if the user's password is not known to the adversary 150. However, single-factor authentication based solely on user passwords is known to be insecure. FIG. 11 shows a plausible attack on the system in FIG. 10 whereby an adversary 150 uses a stolen password to obtain a fraudulent authentication token which in turn is used to obtain an encrypted data object 121 which can further be decrypted by deriving the user's key using the same stolen password. The use of insecure or reused passwords makes the obtaining or guessing of user passwords by an adversary 150 feasible via methods such as credential stuffing, password spraying, and brute-forcing. Therefore, multi-factor authentication is used to reduce reliance on passwords as a sole authentication factor.

Figure 12:
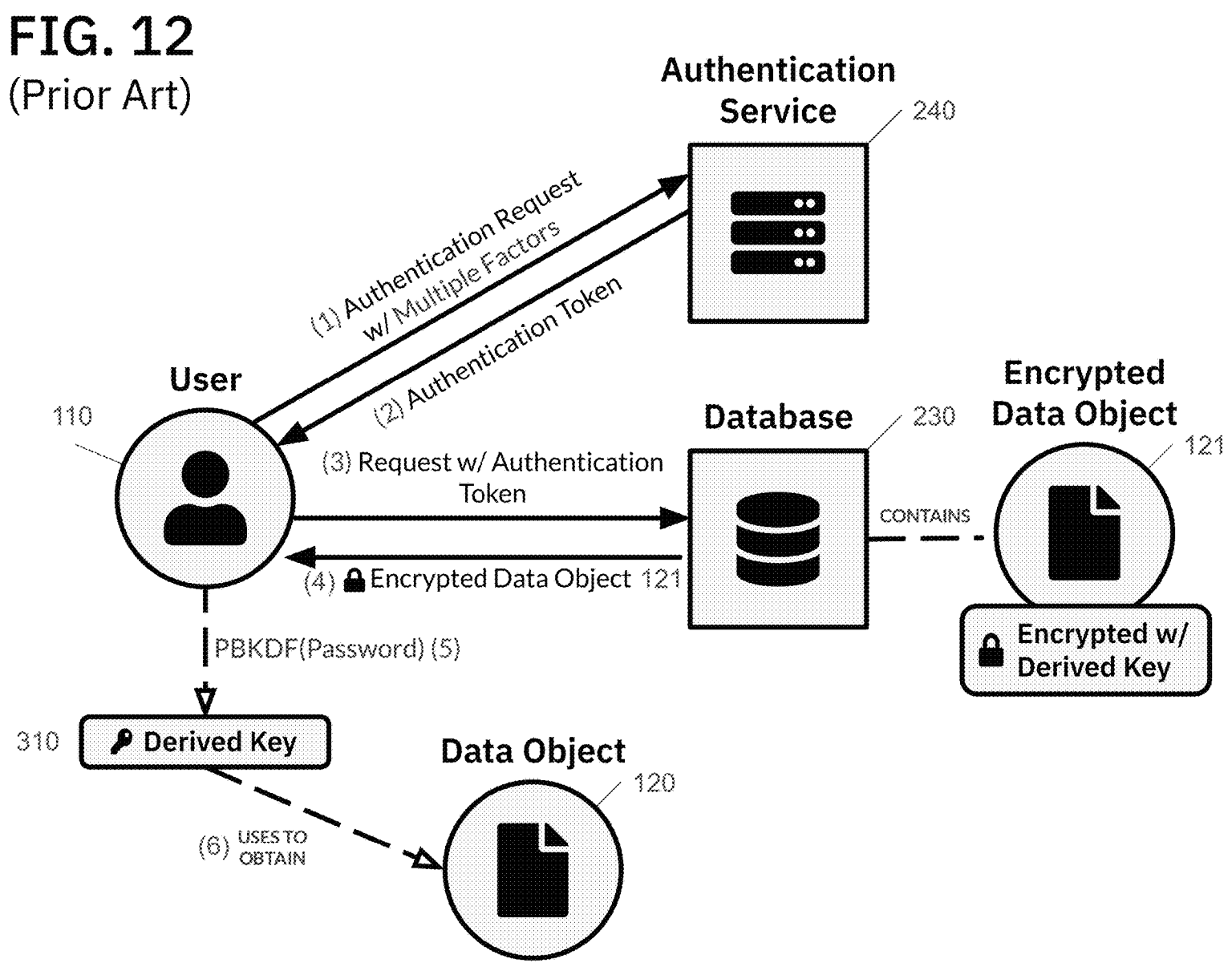

FIG. 12 illustrates a secure data storage system in which data is encrypted at rest using a password-derived key 310 and where multi-factor authentication is used to authenticate requests. A user 110 performs a multi-factor authentication process with an authentication service 240 (for example, using both a password and a HOTP/TOTP code) to obtain an authentication token, which is then used to obtain an encrypted data object 121 which can be decrypted using a password-derived key 310. Even an adversary 150 which has stolen a user's password will be unable to obtain a valid authentication token and will thus not be able to create a valid request to the database 230, as shown in FIG. 13. However, using multi-factor authentication to authenticate users on a system that encrypts data with password-based keys does not fully address the threat of passwords being insecure. Consider the threat of an adversary 150 which does not present a valid authenticated request but rather exploits a vulnerability in the data storage system to obtain stored data directly, which was the original motivation for using encryption at rest and in particular encryption using a password-derived key 310. If data is stored using a password-derived key 310, the stolen password remains sufficient to decrypt the data, as shown in FIG. 14. Addressing this threat requires the advantages and protections of multi-factor authentication to be realized within the key derivation process itself, making a stolen password insufficient for deriving a user's key and decrypting their data. What is needed, therefore, is a system and method for multi-factor key derivation.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

Figure 2:
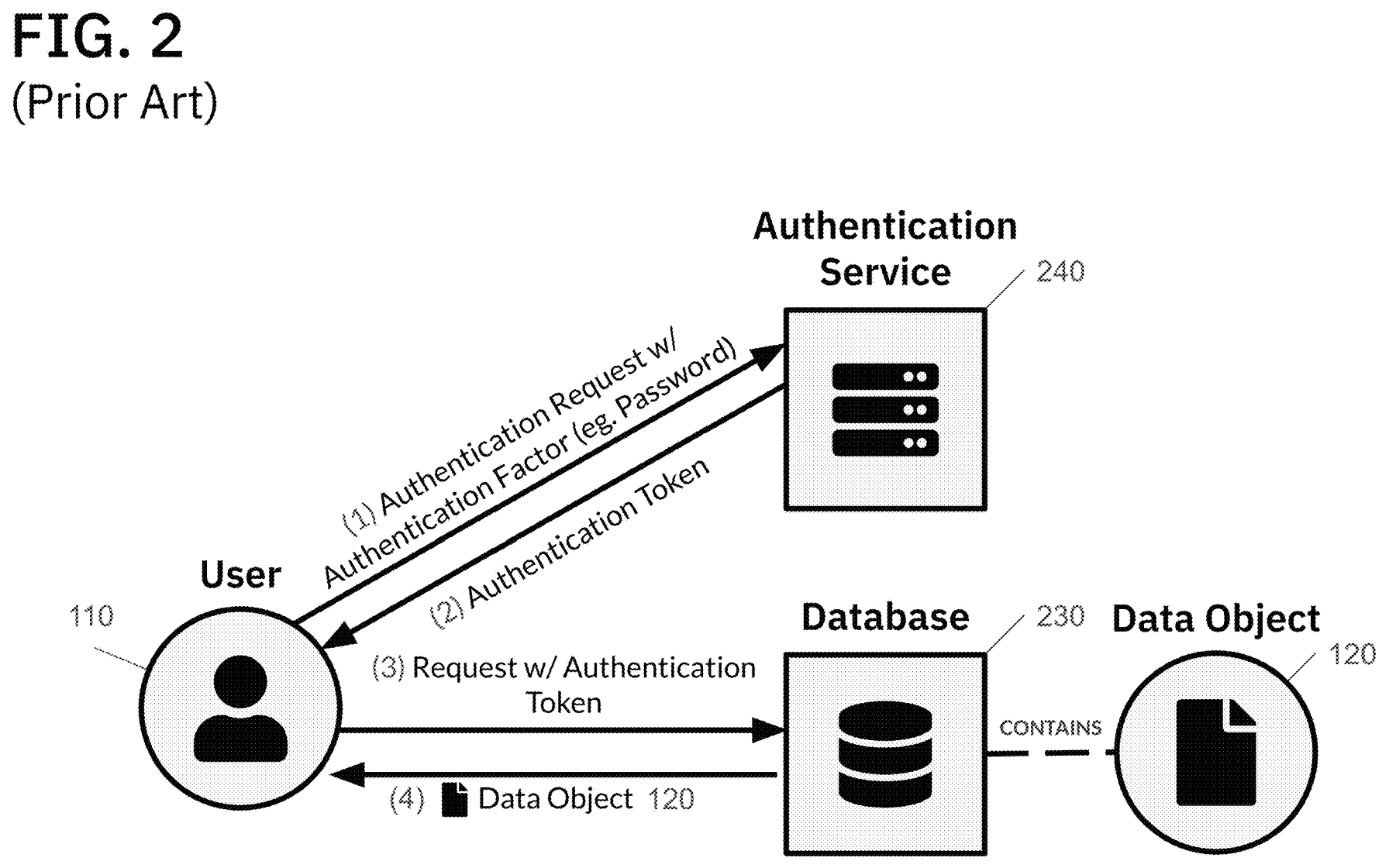

FIG. 2 shows a process of a user retrieving a data object from a data storage system using an authentication token;

FIG. 8 shows a process of a user retrieving a data object from a data storage system which uses encryption at rest based on a user key;

Figure 9:
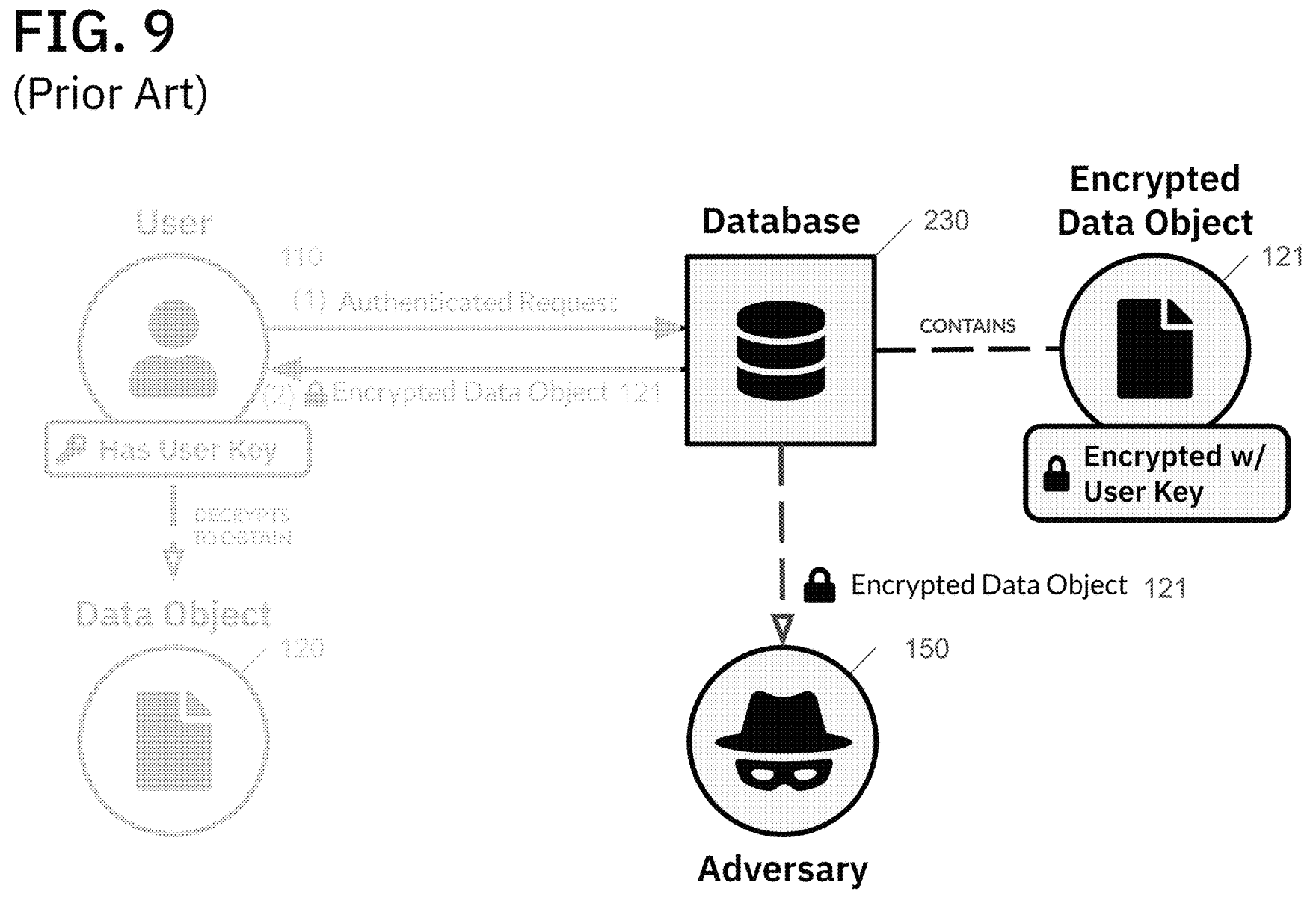

FIG. 9 shows a process of an adversary retrieving an encrypted data object from a data storage system which uses encryption at rest based on a user key;

FIG. 10 shows a process of a user retrieving a data object from a data storage system which uses encryption at rest based on a password-derived key;

FIG. 11 shows a process of an adversary retrieving an data object from a data storage system which uses encryption at rest based on a password-derived key by using a stolen password;

FIG. 12 shows a process of a user retrieving a data object from a data storage system which uses multi-factor authentication and encryption at rest based on a password-derived key;

FIG. 13 shows a process of an adversary failing to retrieve a data object from a data storage system which uses multi-factor authentication and encryption at rest based on a password-derived key by using a stolen password;

FIGS. 21-27 show a process of a user establishing and deriving a key using a threshold-based a system and method for multi-factor key derivation according to one embodiment of the present disclosure;

FIG. 48 shows a process of a user deriving a key using a system and method for multi-factor key derivation with a trusted hardware based factor according to one embodiment of the present disclosure;

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Embodiments of a system and method for multi-factor key derivation described herein may be implemented using various components such as one or more computers, computer readable storage mediums, and computer networks for storing and transmitting data as described in greater detail below. The system and method for multi-factor key derivation is operable across multiple components using network connectivity, servers, database 230, and devices such as smartphones or personal computers to receive and transmit data between components.

Figure 1:
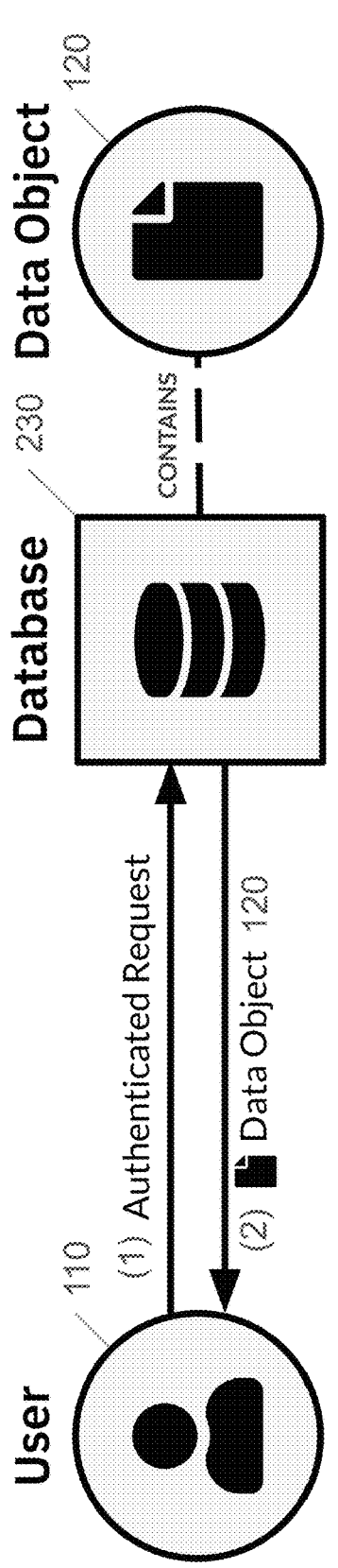
FIG. 1 shows a process of a user retrieving a data object from a data storage system.
Figure 3:
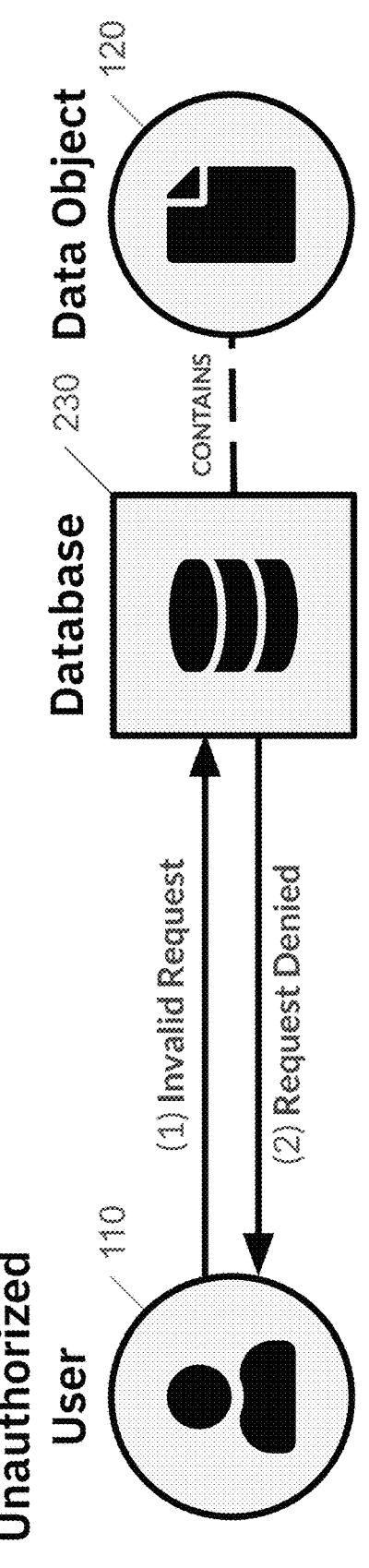
FIG. 3 shows a process of an unauthorized user failing to retrieving a data object from a data storage system.
Figure 4:
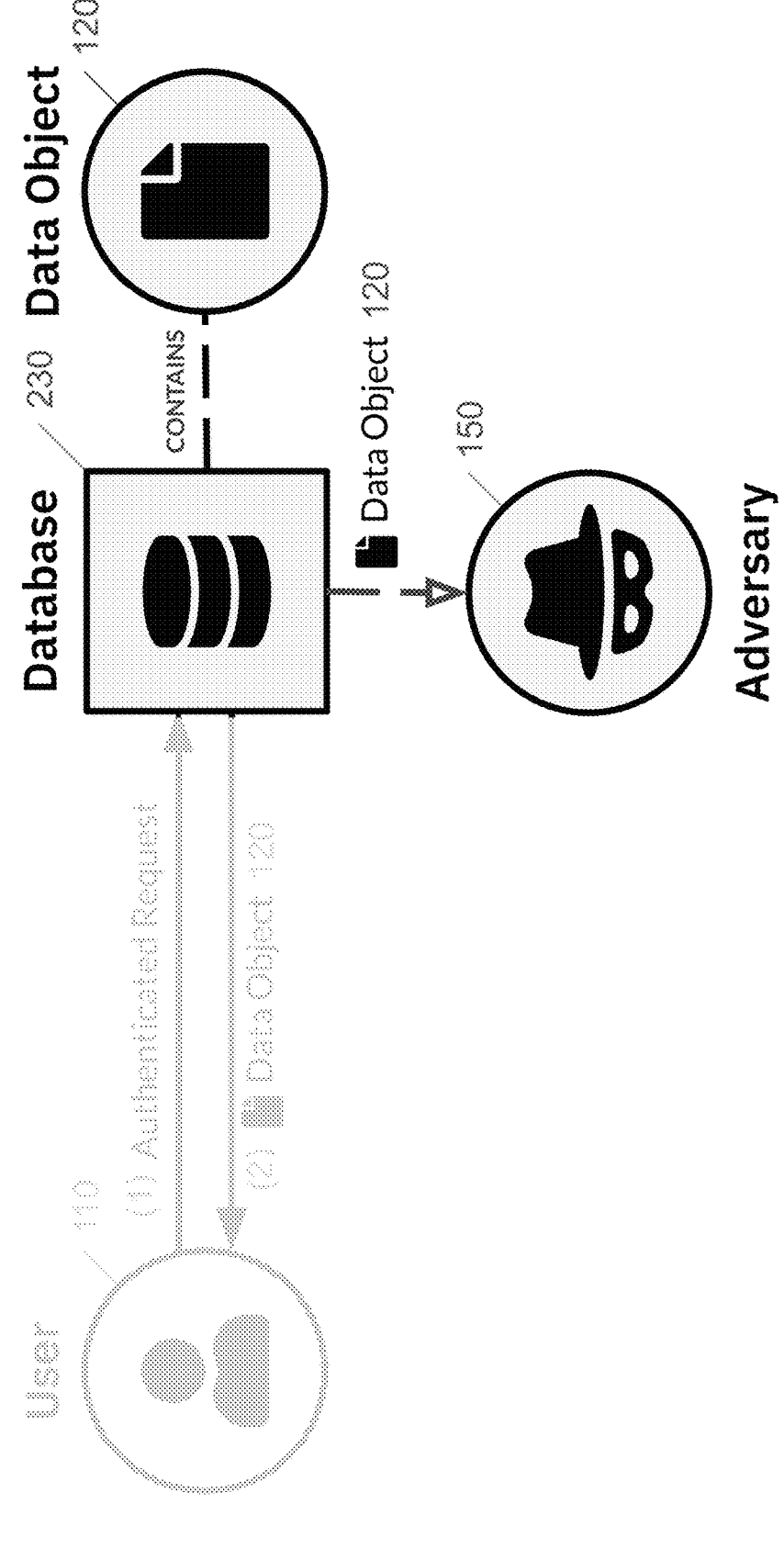
FIG. 4 shows a process of an adversary retrieving a data object from a data storage system by exploiting a vulnerability.
Figure 5:
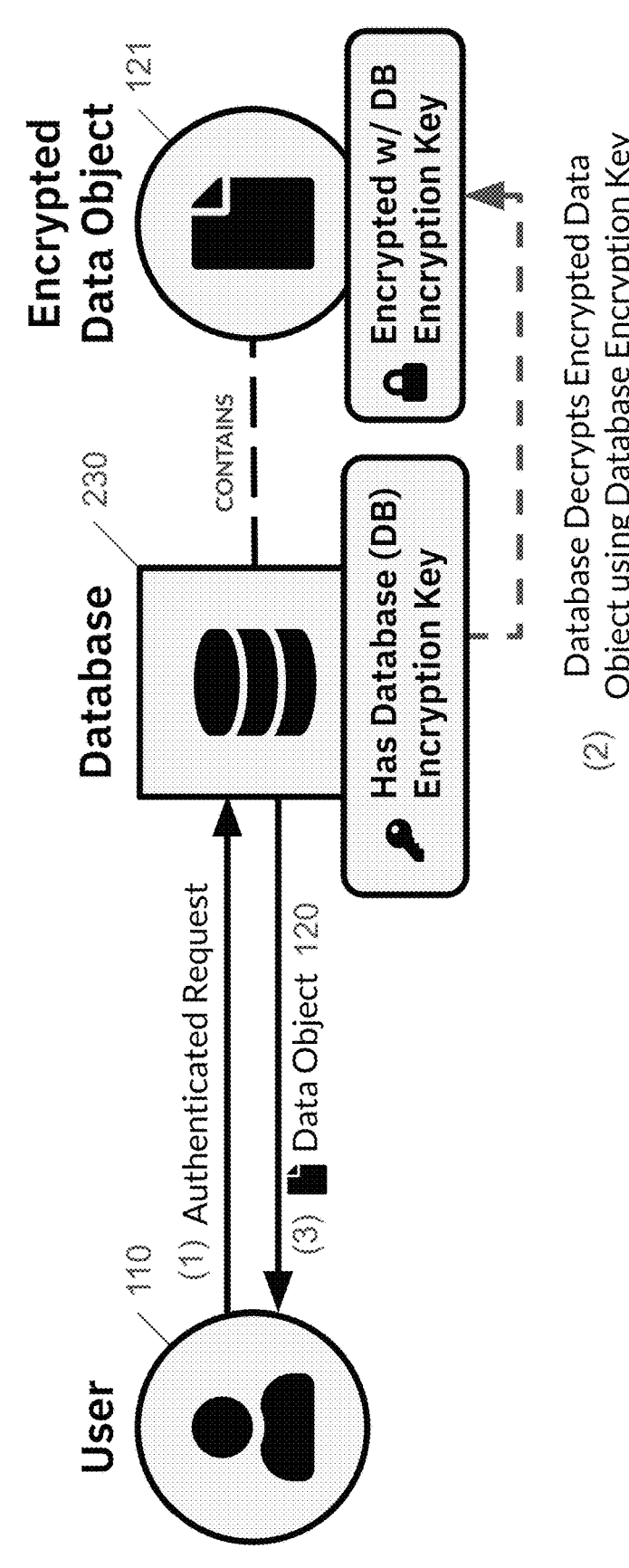
FIG. 5 shows a process of a user retrieving a data object from a data storage system which uses encryption at rest.
Figure 6:
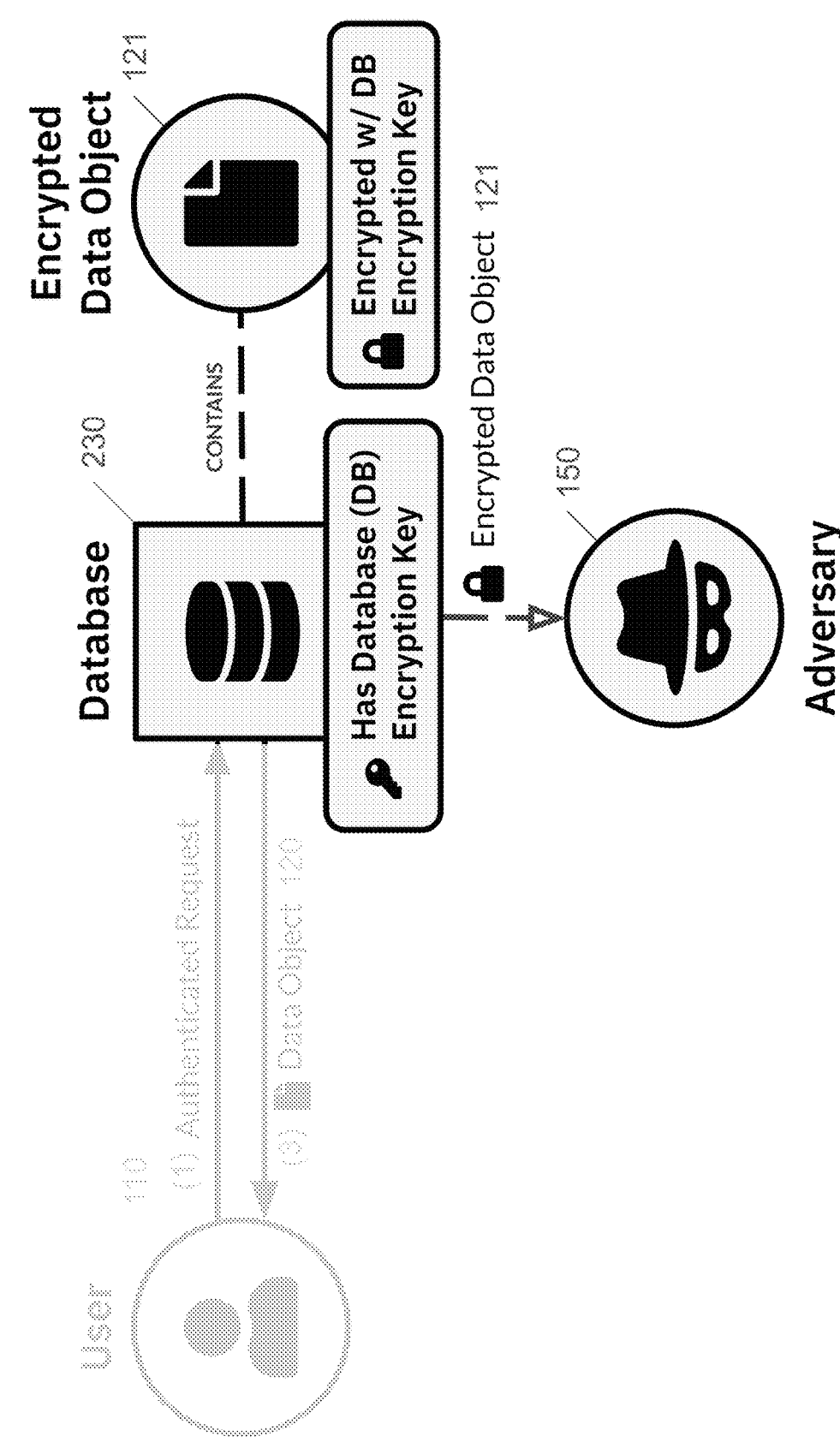
FIG. 6 shows a process of an adversary retrieving an encrypted data object from a data storage system which uses encryption at rest by exploiting a vulnerability.
Figure 7:
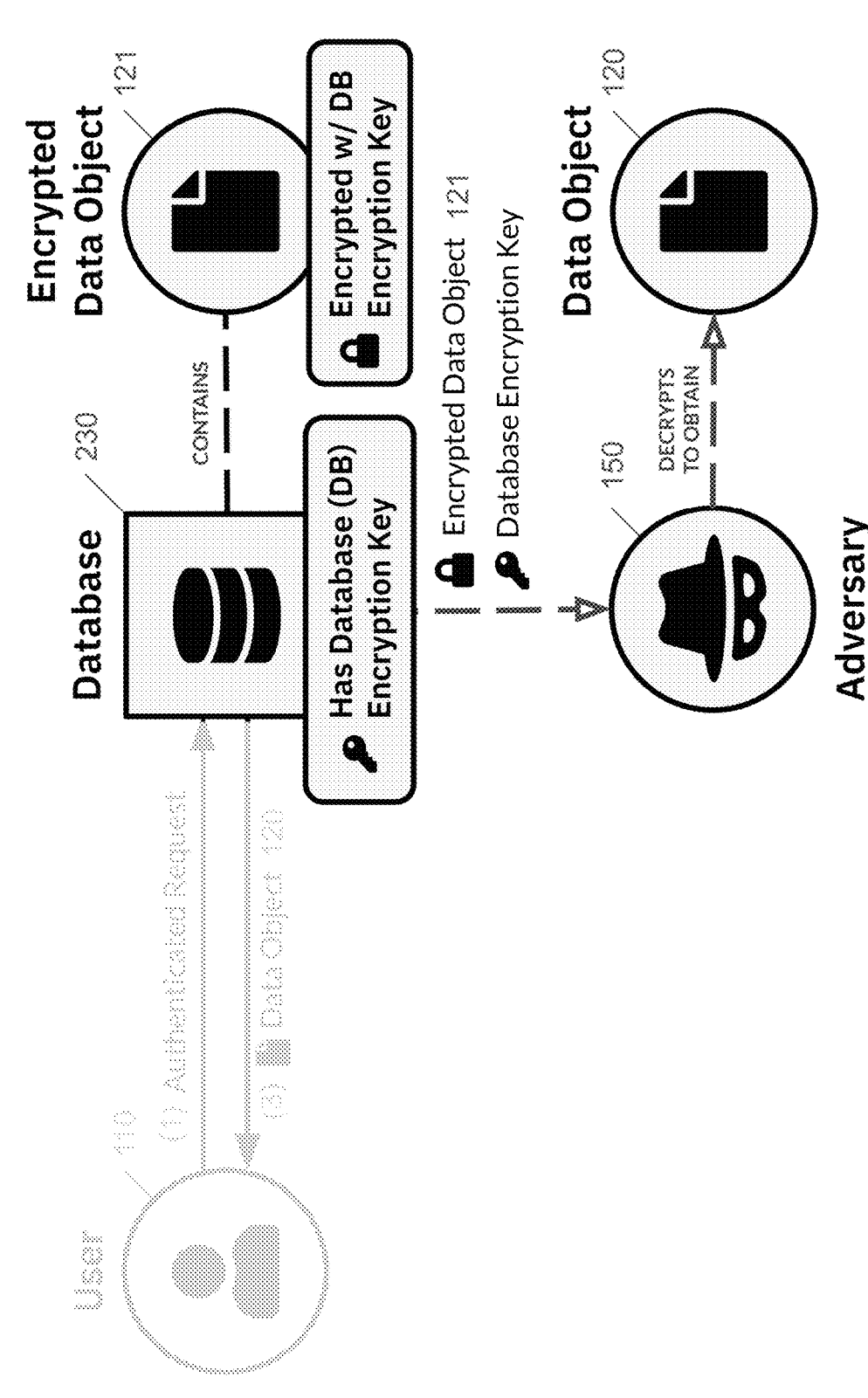
FIG. 7 shows a process of an adversary retrieving a data object from a data storage system which uses encryption at rest by exploiting a vulnerability.
Figure 14:
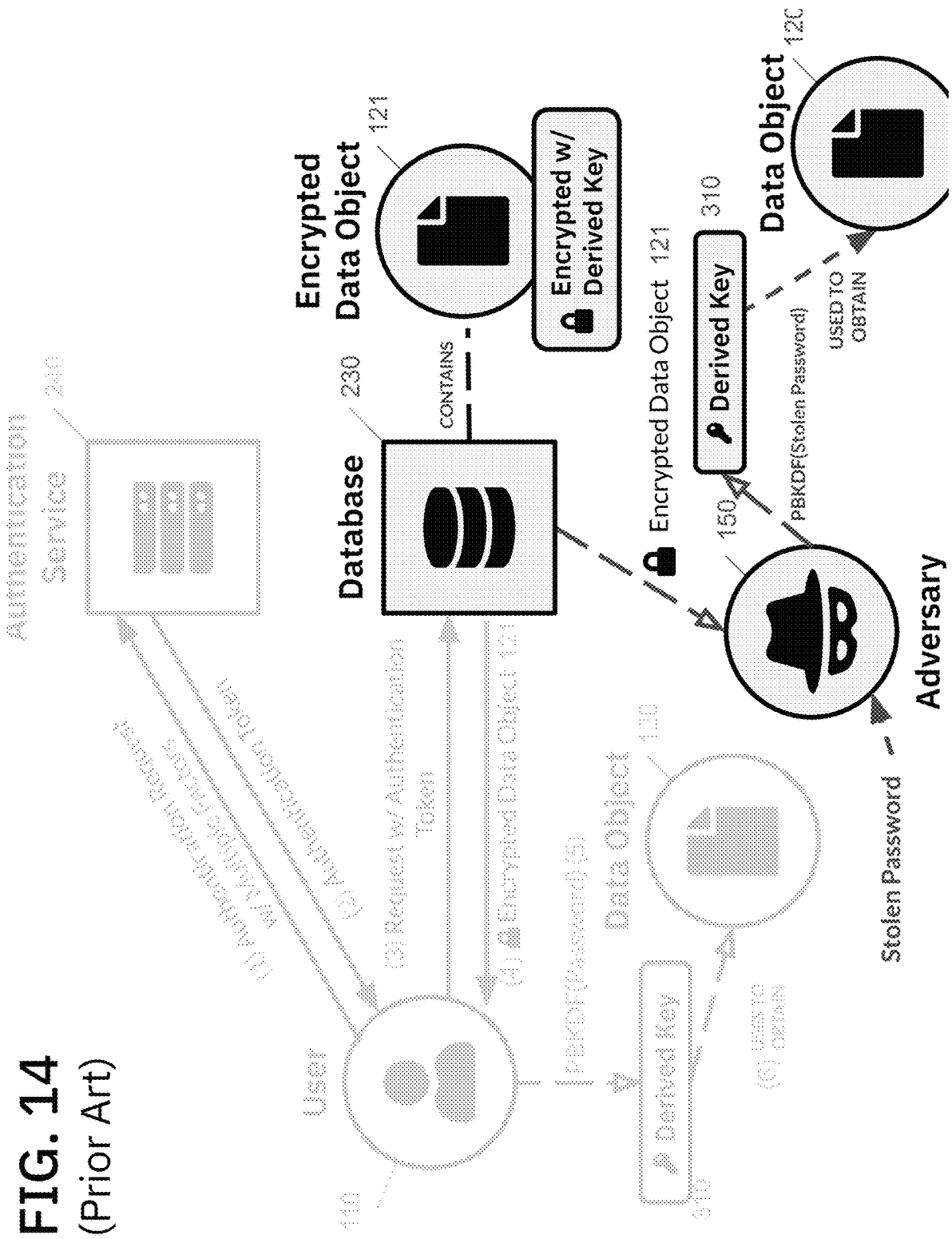
FIG. 14 shows a process of an adversary retrieving a data object from a data storage system which uses multi-factor authentication and encryption at rest based on a password-derived key by using a stolen password and exploiting a vulnerability.
Figure 15:
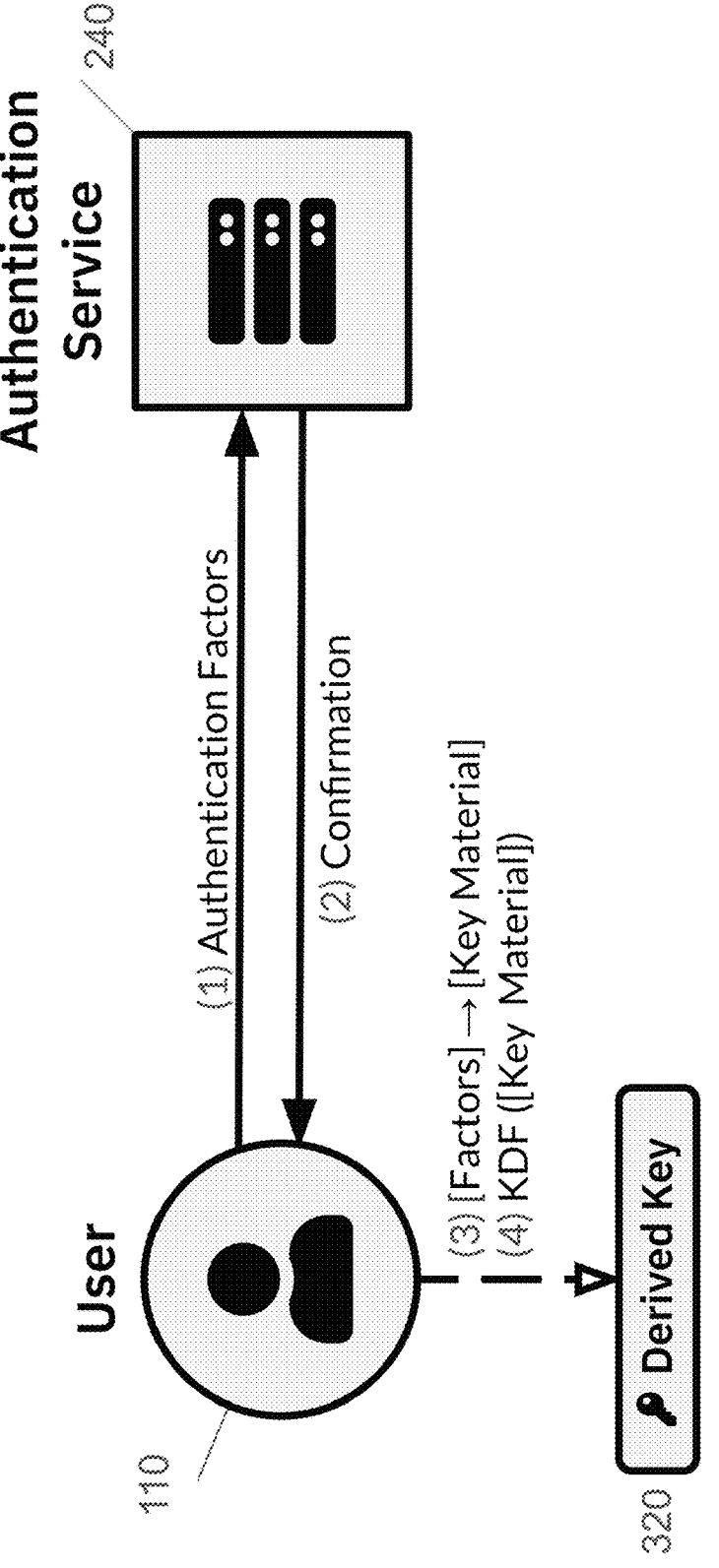
FIG. 15 shows a process of a user deriving a key using a system and method for multi-factor key derivation according to one embodiment of the present disclosure.

FIG. 15 shows a basic embodiment of a system and method for multi-factor key derivation consisting of a user 110 and an authentication service 240. The user 110 first authenticates with the authentication service 240 using multiple authentication factors. The authentication service 240 presents the user 110 with a confirmation that the authentication was successful. The user 110 then uses factor-specific derivation functions on multiple authentication factors to produce key material for each factor. Finally, the key material is combined and used as input to a key derivation function to produce a derived key. A variety of authentication factors can be used as a factor in a multi-factor derived key 320 by constructing a factor-specific derivation function to produce deterministic key material from a correct presentation of that factor. Factor derivation functions for a number of common authentication factors are described below.

In one embodiment, the key material from each factor is combined using a bitwise XOR before being used as input to the key derivation function. In another embodiment, the key material from each factor is concatenated before being used as input to the key derivation function. In a third embodiment, a cryptographic hash function is used to combine key material from several factor-specific derivation functions. In a fourth embodiment, a cryptographic hash function is used in parallel with concatenation or bitwise XOR to combine the key material from each factor.

In one embodiment, a standard key derivation function is used on the combined factor key material to produce the final derived key. For example, HMAC-based key derivation function (HKDF), or ISO standard key derivation functions (KDF1, KDF2, KDF3 & KDF4) may be used to serve this purpose. In another embodiment, a password-based key derivation function (such as PBKDF1, PBKDF2, bcrypt, scrypt, or argon2) may be modified to serve this purpose by supplying the combined factor key material as input rather than a password. A password-based key derivation function to produce the final derived key may be used to make brute-force attacks harder by increasing the computational difficulty of computing the key derivation function. In one embodiment, if a derived key is required to be of a particular size (for example, because it is to be used in an encryption algorithm which requires keys of a specific size), a key stretching function can be used to stretch the derived key to the required size. In another embodiment, a key stretching function is used on factor key material prior to inputting it into a key derivation function to standardize length of the key material from the various factors.

Figure 16:
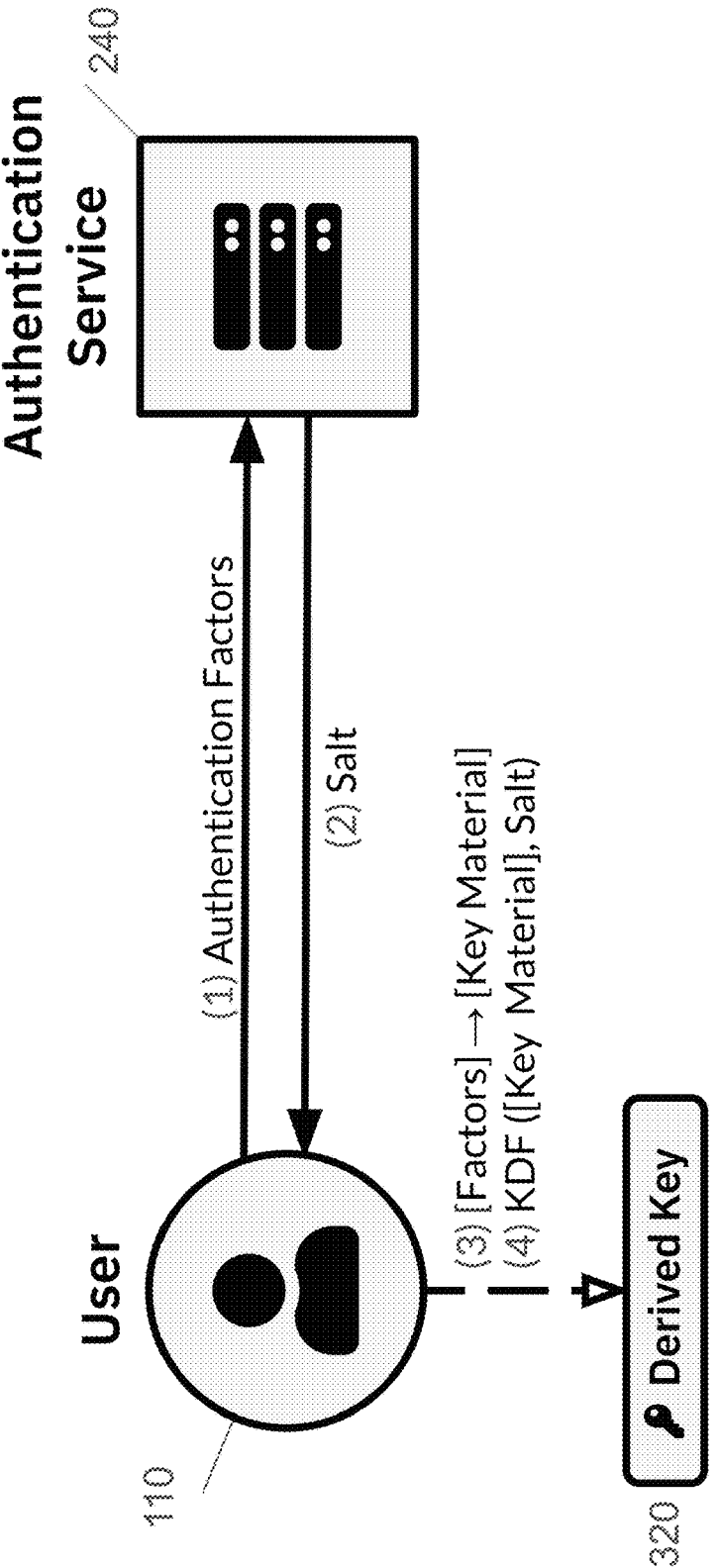
FIG. 16 shows a process of a user deriving a key using a system and method for multi-factor key derivation with a salt according to one embodiment of the present disclosure.
Figure 17:
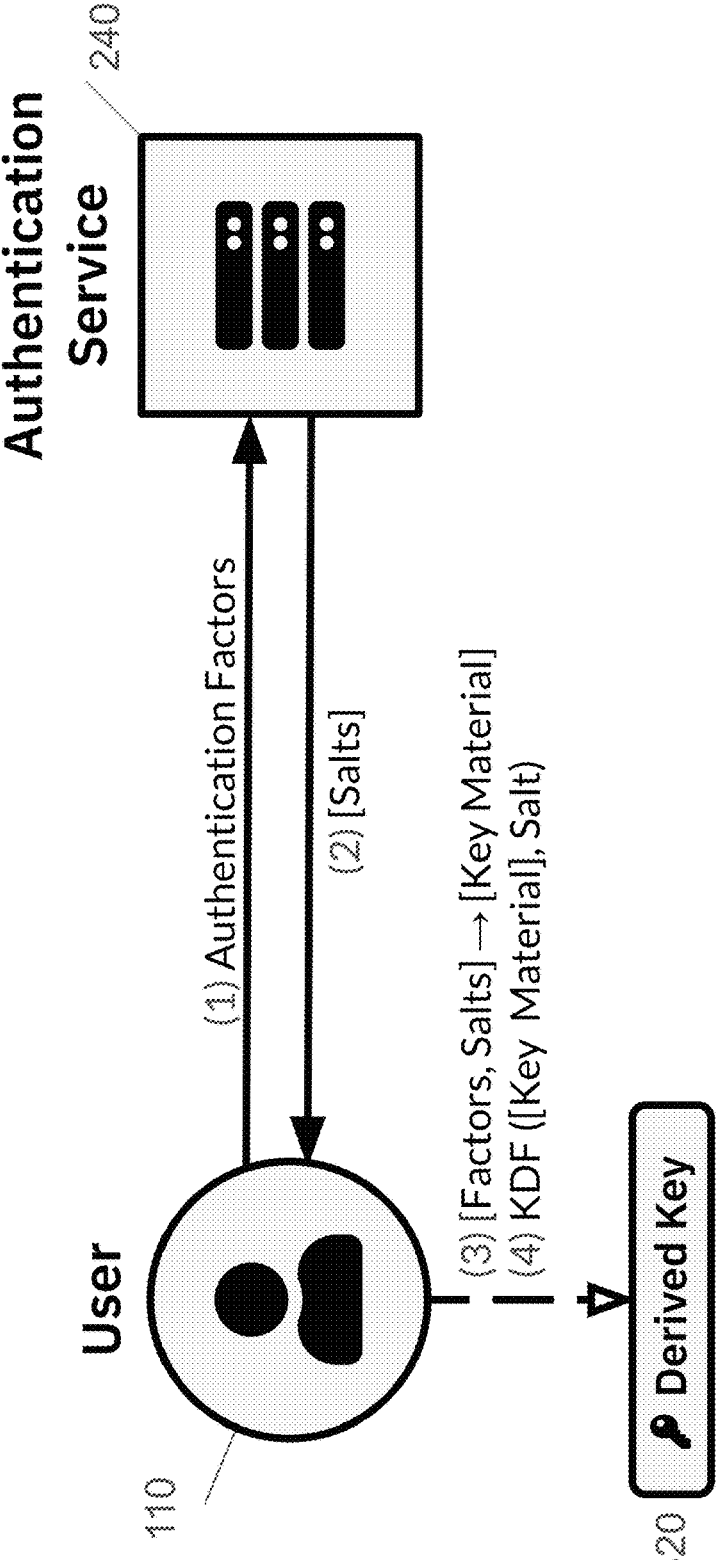
FIG. 17 shows a process of a user deriving a key using a system and method for multi-factor key derivation with factor-specific salts according to one embodiment of the present disclosure.

In one embodiment, the authentication service 240 returns a fixed, user-specific value or "salt" upon successful authentication, as shown in FIG. 16. This salt is then used as a component of the key derivation function by supplying it as a "salt" input to the final key derivation function if the KDF used supports this input type, or by combining it with the factors or factor-derived key material via one or more of the combination strategies described herein prior to supplying the combined value of the KDF. In another embodiment, salts are provided corresponding to one or more of the individual factors and are used as inputs to the factor derivation functions to generate the factor-specific key material, as shown in FIG. 17. This serves the same fundamental purpose in thwarting brute-force attacks.

Figure 18:
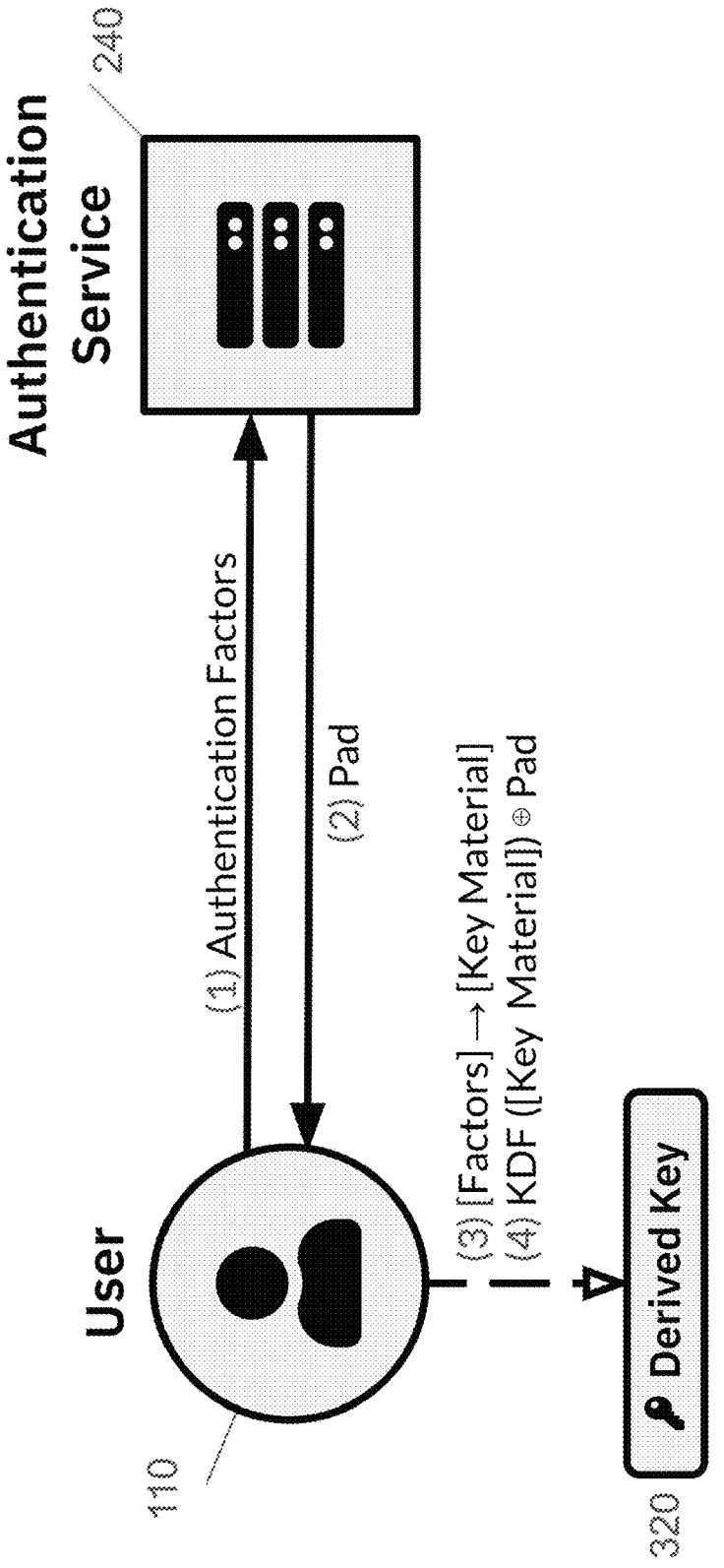
FIG. 18 shows a process of a user deriving a key using a system and method for multi-factor key derivation with a pad according to one embodiment of the present disclosure.
Figure 19:
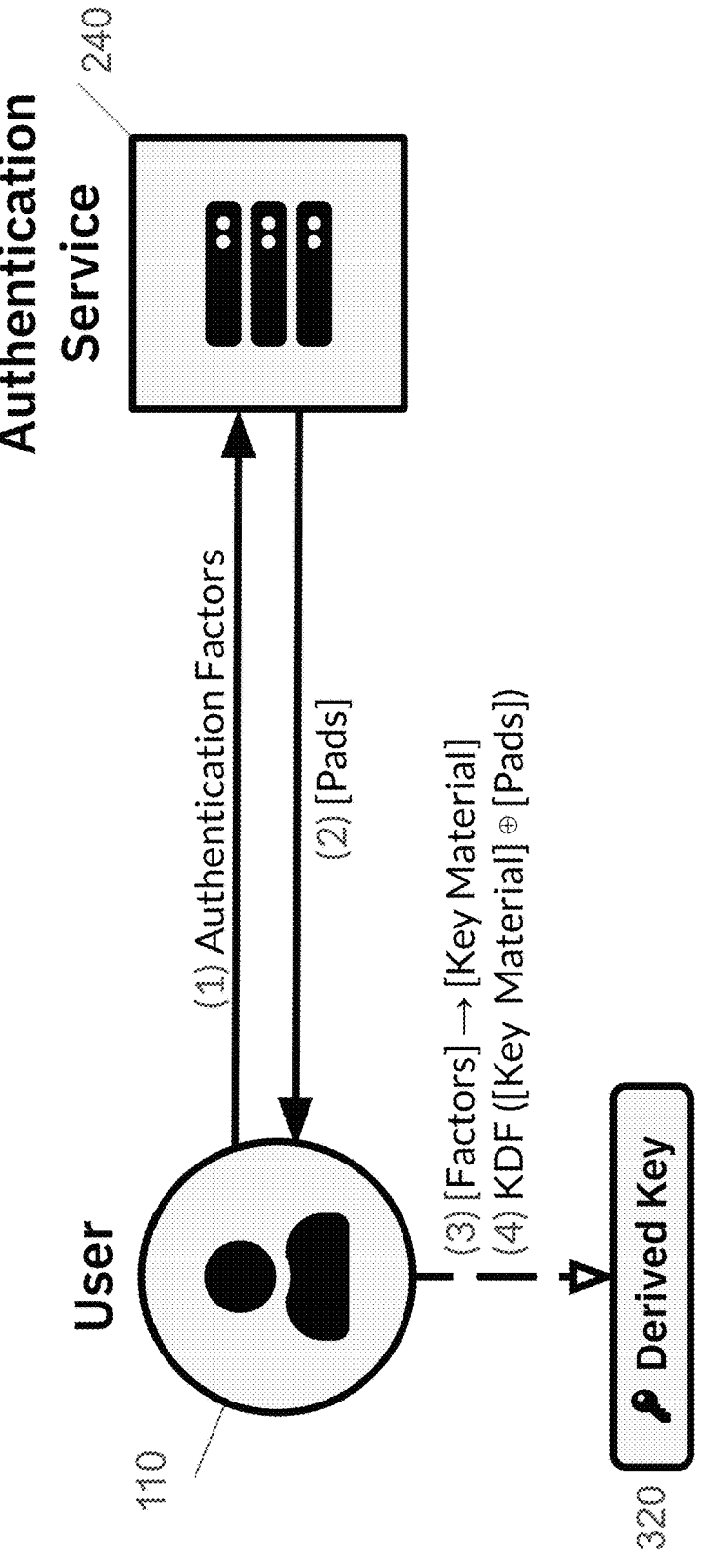
FIG. 19 shows a process of a user deriving a key using a system and method for multi-factor key derivation with factor-specific pads according to one embodiment of the present disclosure.

In one embodiment, the authentication service 240 returns a "pad" value which is combined with the KDF output (namely via a bitwise XOR or modular addition) to produce the final derived key, as shown in FIG. 18. The purpose of using a "pad" value is that should any of the user's authentication factors change, the pad value can correspondingly be updated to ensure that the final derived key remains the same. In another embodiment, pads are provided corresponding to one or more of the individual factors and are combined with the factor-specific key material prior to input to the KDF, as shown in FIG. 19. This serves the same fundamental purpose of allowing the final derived key to remain the same even if one or more factors change by updating the corresponding factor pads to ensure that the factor key material, after being combined with the factor pad, remains constant.

Figure 20:
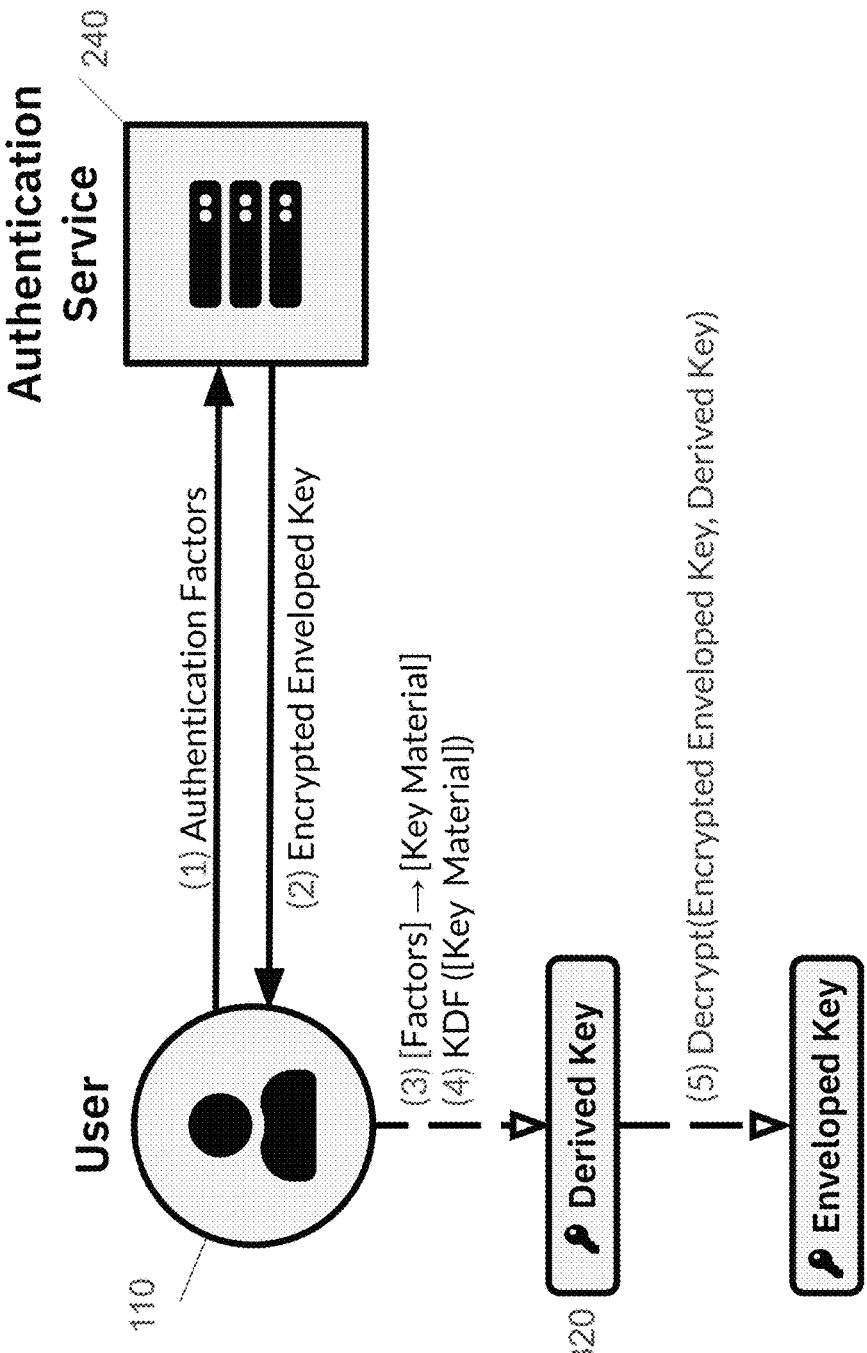
FIG. 20 shows a process of a user obtaining an enveloped key using a system and method for multi-factor key derivation according to one embodiment of the present disclosure.

In one embodiment, the authentication service 240 returns a secondary key, which has been encrypted using a derived key (also known as the "enveloped key"), to the user 110 in response to their successful authentication request, as shown in FIG. 20. After using the multi-factor key derivation process to produce the derived key, the user 110 can subsequently decrypt the enveloped key using the derived key and then use the enveloped key for further operations. In one embodiment, the enveloped key is stored encrypted with multiple separate keys to facilitate key recovery. In this context, the initially derived key may be referred to as the "key encryption key" while the enveloped key may be referred to as the "data encryption key." If the data encryption key, used to encrypt sensitive data, is also stored encrypted under a separate "master key," then even if the authentication factors used to derive the key encryption key are lost, the master key may be used to decrypt the key data encryption key and recover the data. In another embodiment, the enveloped key is formatted to the specifications of a different cryptosystem than the derived key. For example, the derived key may be a key for a symmetric cryptosystem such as AES, while the enveloped key may be a key for an asymmetric cryptosystem such as RSA, enabling the user 110 to perform asymmetric cryptographic operations using a key that is still ultimately derived from their authentication factors. In another embodiment, a derived key is directly transformed into another key, which may be formatted to the specifications of a different cryptosystem, for example by providing the derived key as the "seed" input to a pseudo-random function which is used to generate the target key.

In one embodiment, only a threshold number of authentication factors are required to derive a key instead of all established factors being required. For example, in a "2-of-3" multi-factor key derivation setup, shown in FIGS. 21-25, three authentication factors are established, and later, successful presentation of any two of these factors is sufficient for successfully deriving the user's key. The advantages of threshold-based multi-factor secret sharing include increased flexibility for the user 110 and potentially allowing some authentication factors to be lost or forgotten without total loss of the derived key, as demonstrated in FIGS. 21-25.

FIG. 21 demonstrates the establishment of a 2-of-3 multi-factor derived key 320 using three authentication factors, namely, a password, a TOTP code, and a response to a security question. In step 1, a random key is generated which will later be derived from the user's authentication factors. In step 2, the user 110 successfully presents all three authentication factors necessary to establish the key. In steps 3a-3c, each authentication factor is transformed into corresponding key material using their factor-specific derivation functions as before. In step 4, a secret sharing scheme, such as Shamir's Secret Sharing, is used to divide the key generated in step 1 into a number of "shares," some threshold of which are required to retrieve the key. Following the provided example, three shares are generated corresponding to the three authentication factors presented, with a threshold value of 2 meaning that any 2 shares will later be enough to derive the key. In steps 5a-5c, the key material corresponding to each factor generated in steps 3a-3c is combined using a bitwise XOR (or, alternatively, modular arithmetic could also be used) with the key shares corresponding to each factor generated in step 4 to produce a "pad" corresponding to each factor. In step 6, the pad values are sent to the authentication service 240 and stored in association with the user 110. The authentication service 240 therefore stores sufficient information for the user 110 to later derive the key upon successful presentation of any 2 of the 3 aforementioned authentication factors while eliminating the possibility of the key being obtained by any party not presenting at least 2 of the 3 factors.

Figure 22:
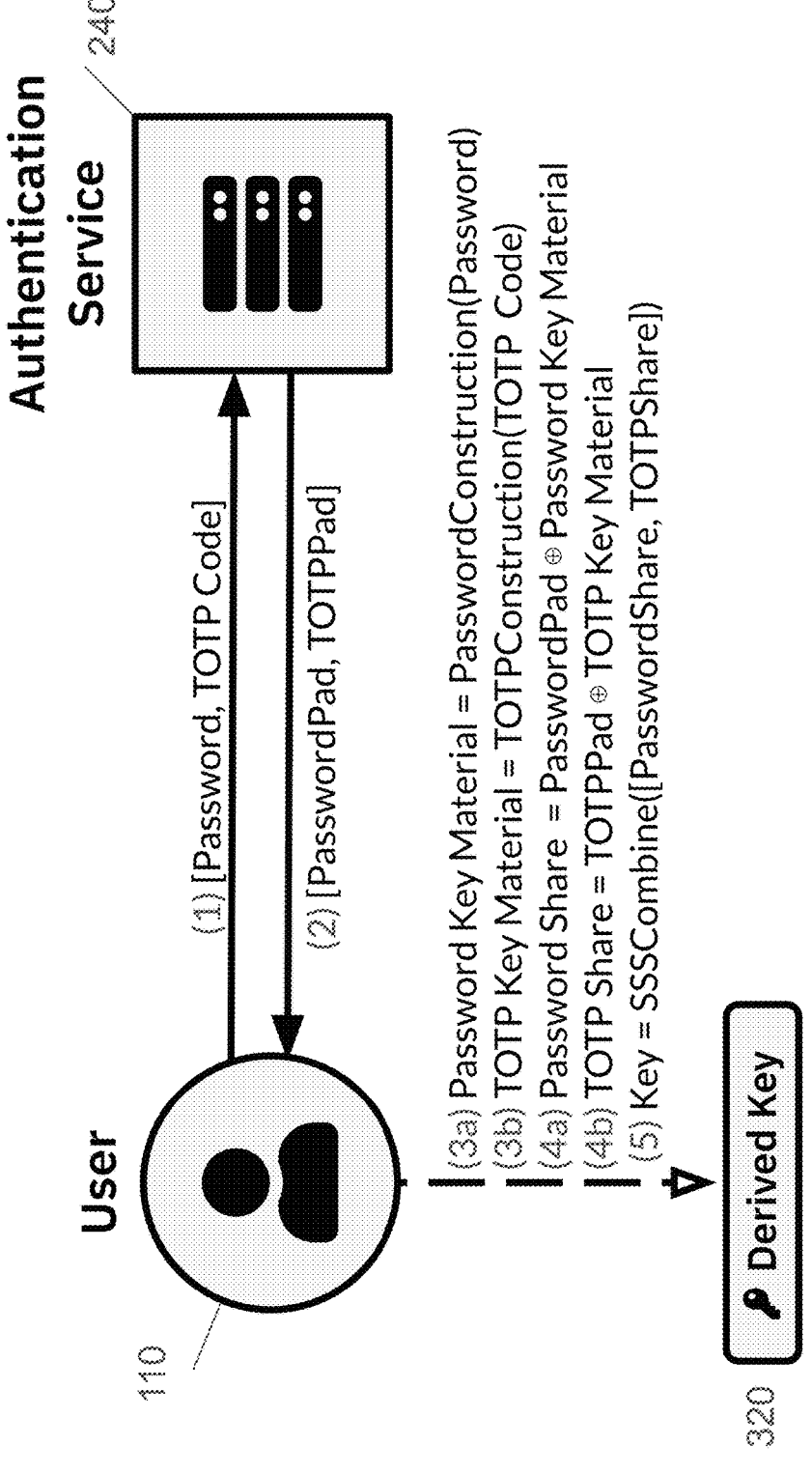
Figure 23:
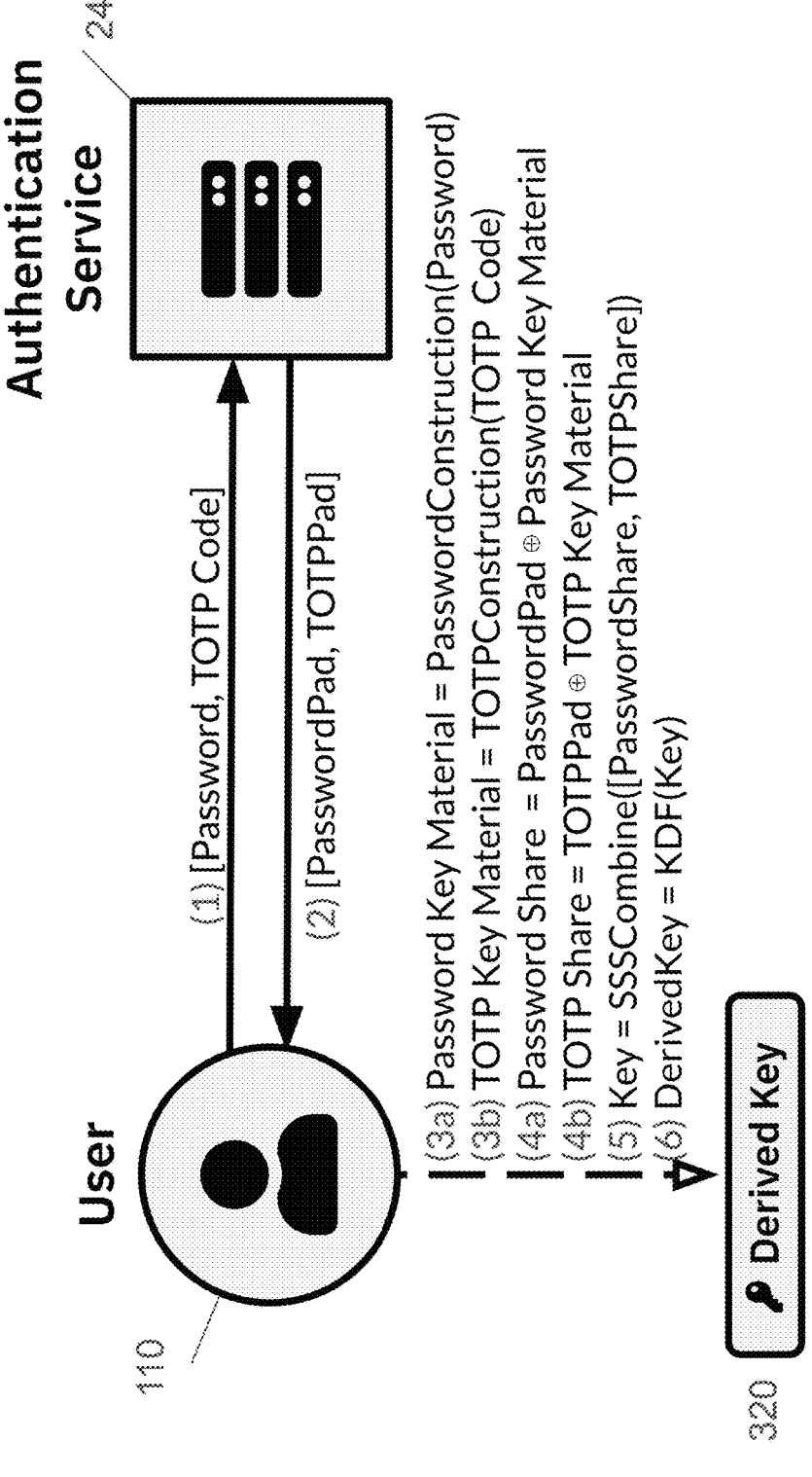

FIG. 22 illustrates the derivation of the multi-factor derived key 320 established in FIG. 21 using two authentication factors, namely, a password, and a TOTP code, during a "normal" login process. In step 1, the user 110 correctly presents their password and TOTP code to the authentication service 240, thereby successfully completing the normal two-factor authentication process. In step 2, the service returns the Password Pad and TOTP Pad established during the setup process in FIG. 21. In steps 3a and 3b, the password and TOTP code are transformed into corresponding key material using their factor-specific derivation functions as before. In steps 4a and 4b, the factor key material is recombined with the factor pads (e.g. via a bitwise XOR) to retrieve the underlying factor shares. In step 5, the obtained factor shares are recombined per the original secret sharing scheme's specification (eg. Shamir's Secret Sharing) to obtain the derived key. In one embodiment, shown in FIG. 23, an additional KDF or PBKDF is applied to the result obtained in step 5 to produce the final key (for purposes of increasing brute-force resistance). In other embodiments, the previously-described techniques such as salting and key enveloping are used in combination with threshold-based multi-factor key derivation.

Figure 24:
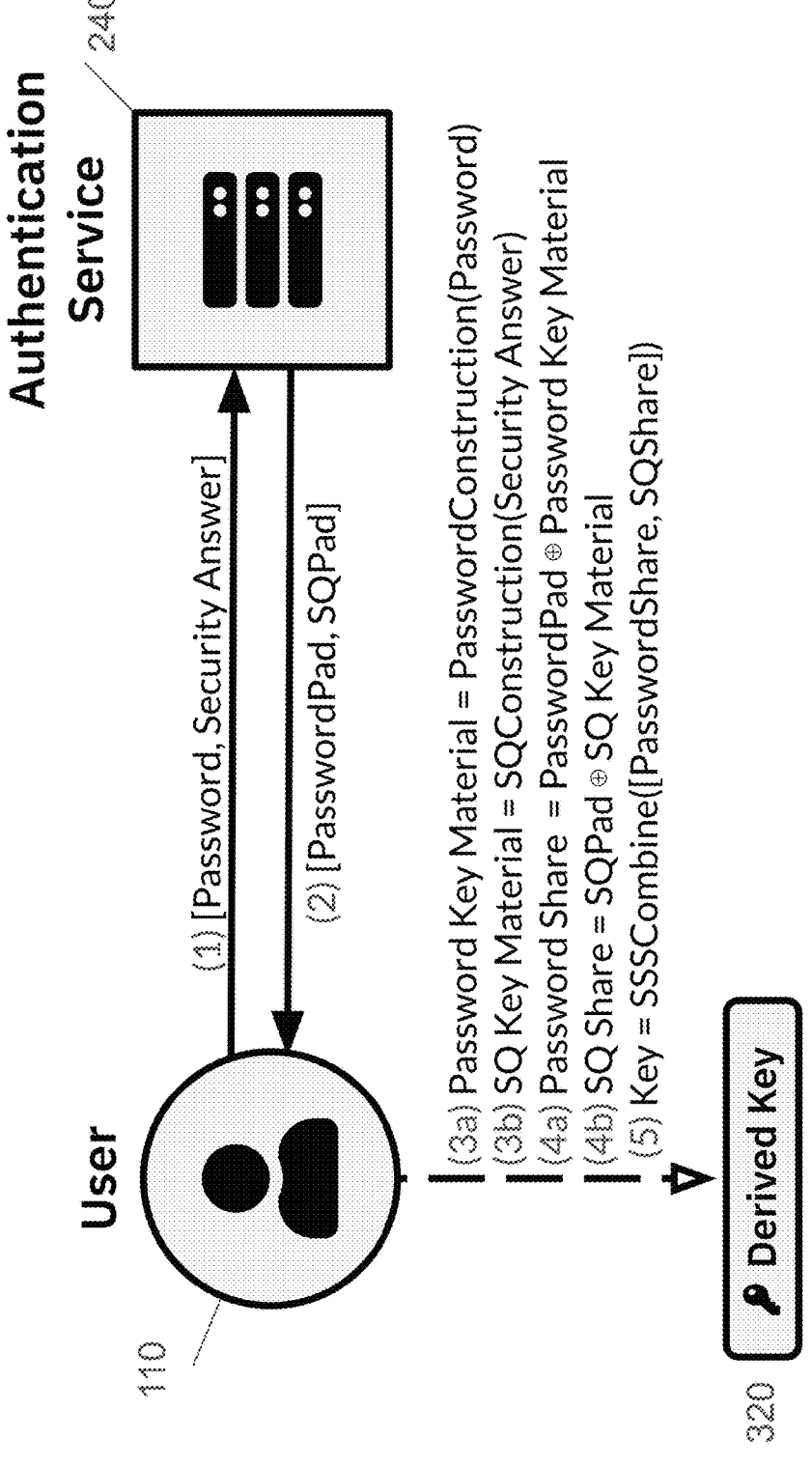

FIG. 24 illustrates the derivation of the multi-factor derived key 320 established in FIG. 21 using two authentication factors, namely, a password, and a security question answer. In step 1, the user 110 correctly presents their password and security question answer to the authentication service 240. In step 2, the service returns the Password Pad and Security Question Pad established during the setup process in FIG. 21. In steps 3a and 3b, the password and security question answer are transformed into corresponding key material using their factor-specific derivation functions. In steps 4a and 4b, the factor key material is recombined with the factor pads to retrieve the underlying factor shares.

In step 5, the obtained factor shares are recombined using the secret sharing scheme to obtain the derived key. The ability to derive the key using the password and security answer may be helpful in an account recovery process whereby the user's TOTP device has been lost but the user 110 retains access to their password and security answer, thereby preventing the user 110 from losing their derived key (and thus any data encrypted under it).

Figure 25:
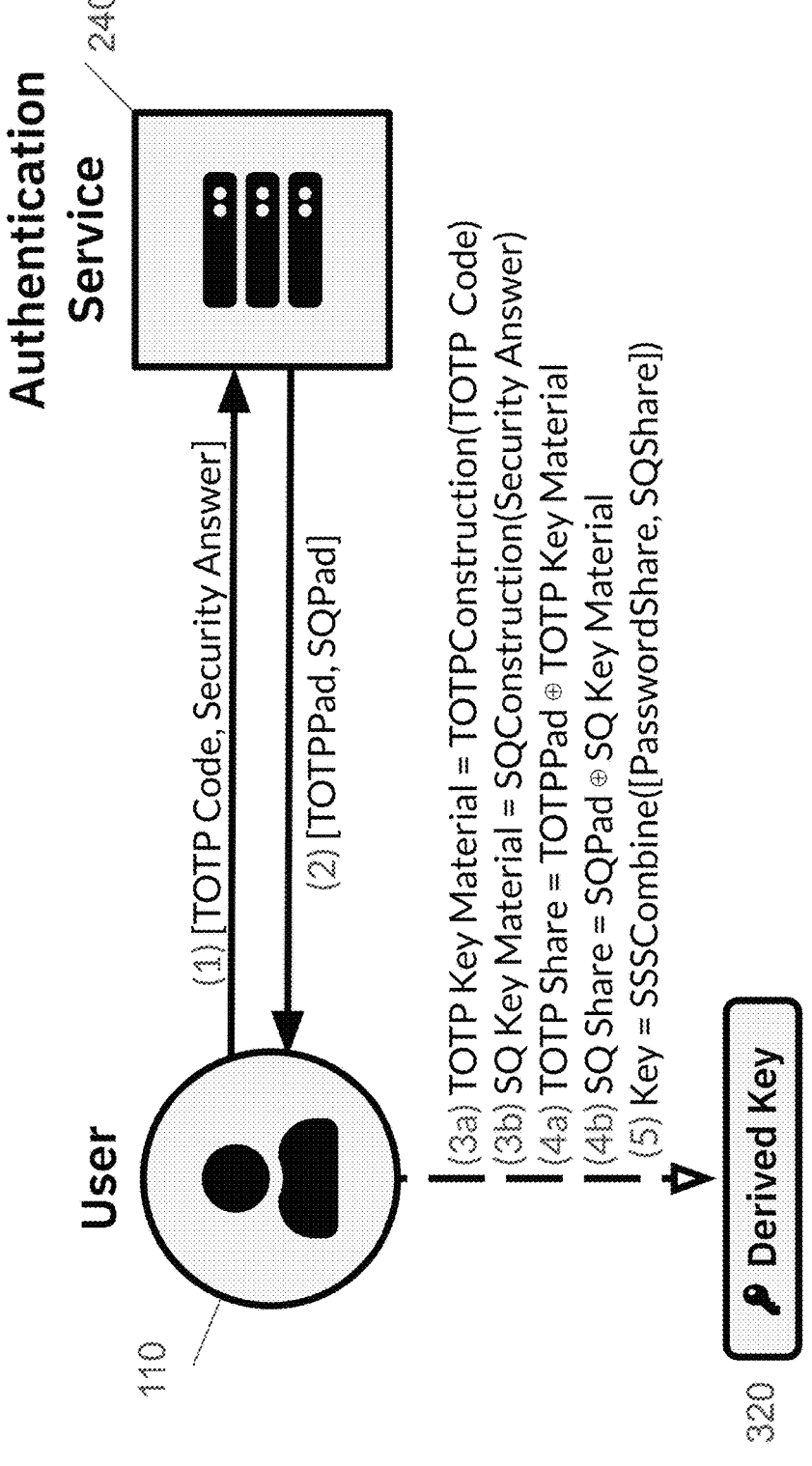

FIG. 25 illustrates the derivation of the multi-factor derived key 320 established in FIG. 21 using two authentication factors, namely, a TOTP code, and a security question answer. In step 1, the user 110 correctly presents their TOTP code and security question answer to the authentication service 240. In step 2, the service returns the TOTP Pad and Security Question Pad established during the setup process in FIG. 21. In steps 3*a* and 3*b*, the TOTP code and security question answer are transformed into corresponding key material using their factor-specific derivation functions. In steps 4*a* and 4*b*, the factor key material is recombined with the factor pads to retrieve the underlying factor shares. In step 5, the obtained factor shares are recombined using the secret sharing scheme to obtain the derived key. The ability to derive the key using the TOTP code and security answer may be helpful in a password recovery process whereby the user's password has been forgotten but the user 110 retains access to their TOTP device and security answer, thereby preventing the user 110 from losing their derived key (and thus any data encrypted under it).

FIGS. 22, 24, and 25 illustrate that in a "2-of-3" multi-factor key derivation setup, although 3 factors are used to establish a derived key, any 2 of those factors can later be used to derive the key. FIG. 22 illustrates how the established key might be derived during a normal login process, while FIGS. 24 and 25 illustrate how the established key might be recovered using a third factor if one of the other factors is lost, thus demonstrating a core advantage of the threshold-based multi-factor key derivation approach (and of the proposed system and method for multi-factor key derivation in general).

Figure 26:
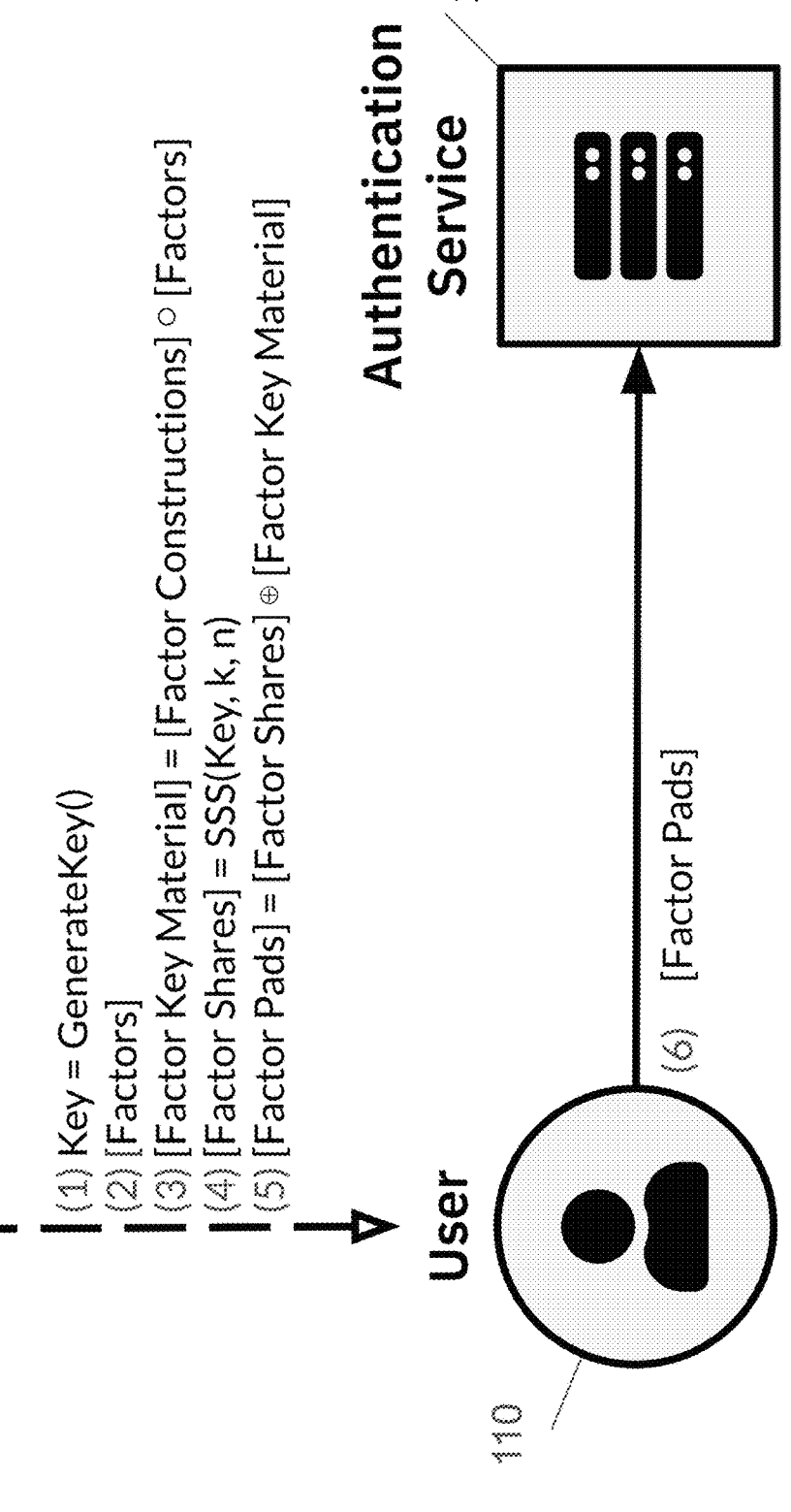

FIG. 26 illustrates the general process of establishing "k-of-n" threshold-based multi-factor key derivation, whereby n factors are used to establish a multi-factor derived key 320, any k of which can later be used to derive the same key. In step 1, a random key is generated. In step 2, the user 110 successfully presents all n authentication factors necessary to establish the key. In step 3, each authentication factor is transformed into corresponding key material using their factor-specific derivation functions. In step 4, a secret sharing scheme is used to divide the key into n shares, k of which are required to retrieve the key. In steps 5, the key material corresponding to each factor is combined with the key shares corresponding to each factor to produce a "pad" corresponding to each factor. In step 6, the pad values are sent to the authentication service 240 and stored in association with the user 110.

Figure 27:
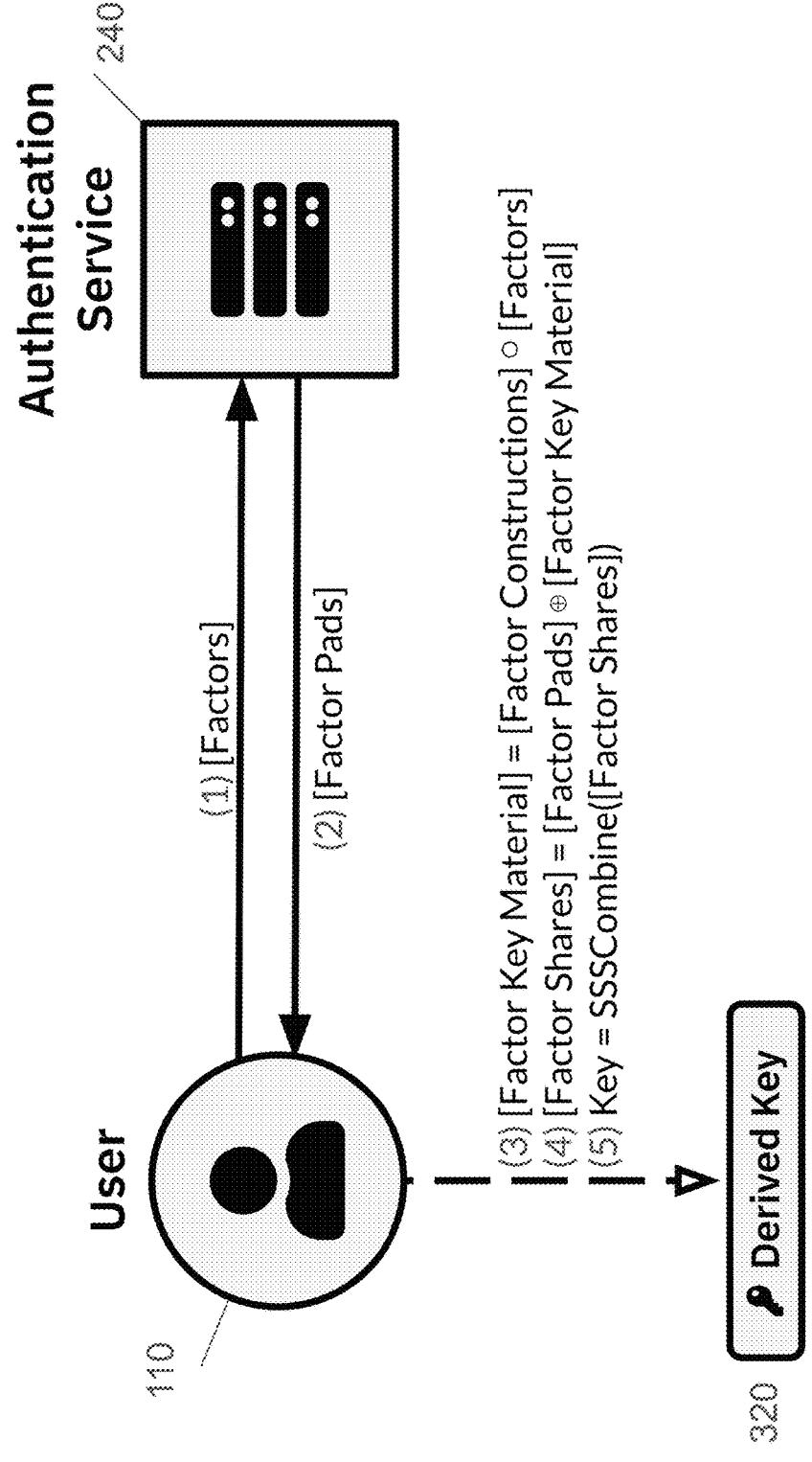

FIG. 27 illustrates the general process of deriving a "k-of-n" threshold-based multi-factor derived key 320 using k of the n authentication factors. In step 1, the user 110 correctly presents k authentication factors to the authentication service 240. In step 2, the service returns the pads corresponding to the presented factors. In step 3, the factors are transformed into corresponding key material using their factor-specific derivation functions. In steps 4, the factor key material is recombined with the factor pads to retrieve the underlying factor shares. In step 5, the obtained factor shares are recombined using the secret sharing scheme to obtain the derived key.

Figure 28:
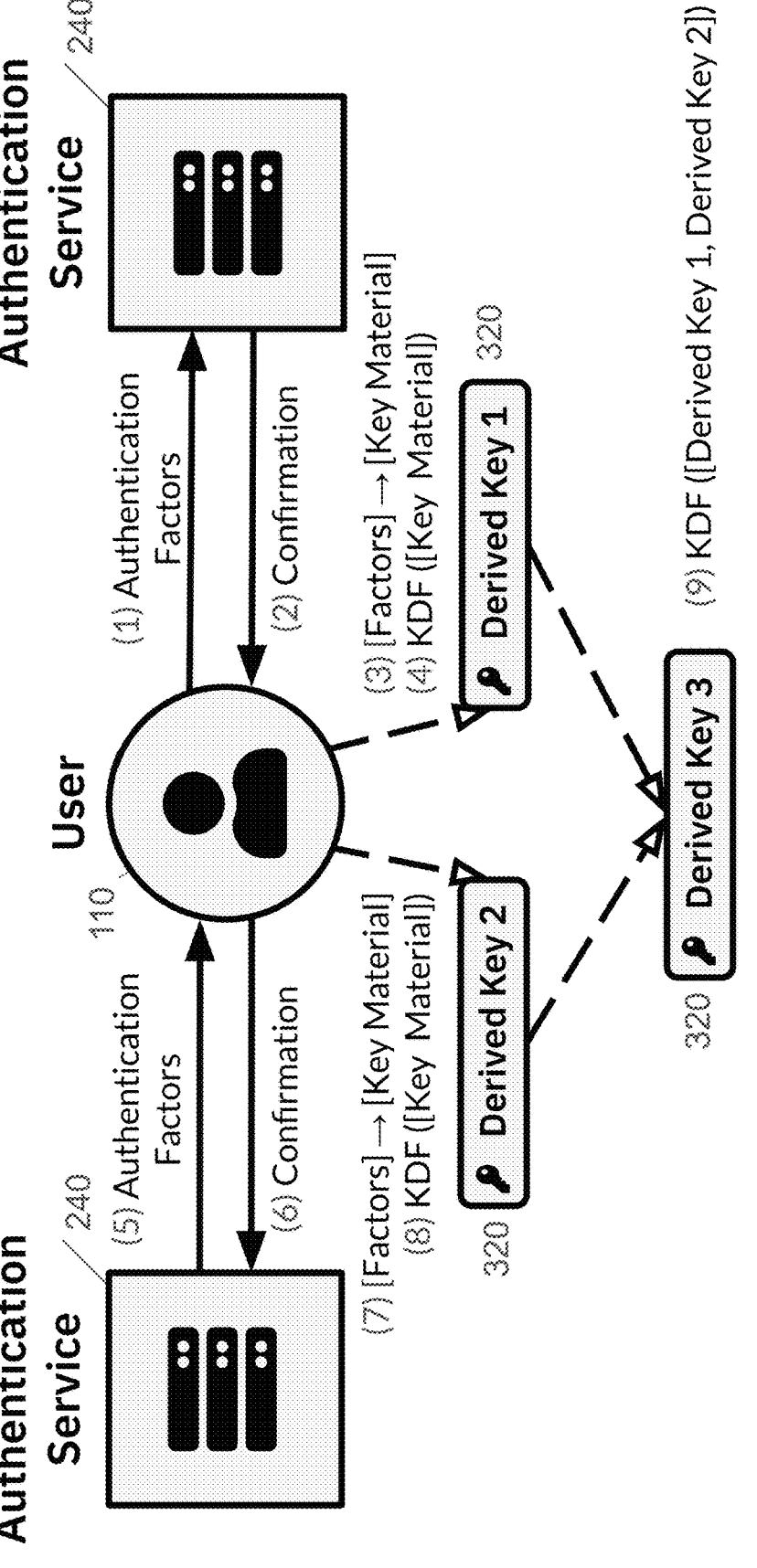
FIGS. 28-29 show a process of a user deriving a key using a system and method for multi-factor key derivation with key stacking according to one embodiment of the present disclosure.
Figure 29:
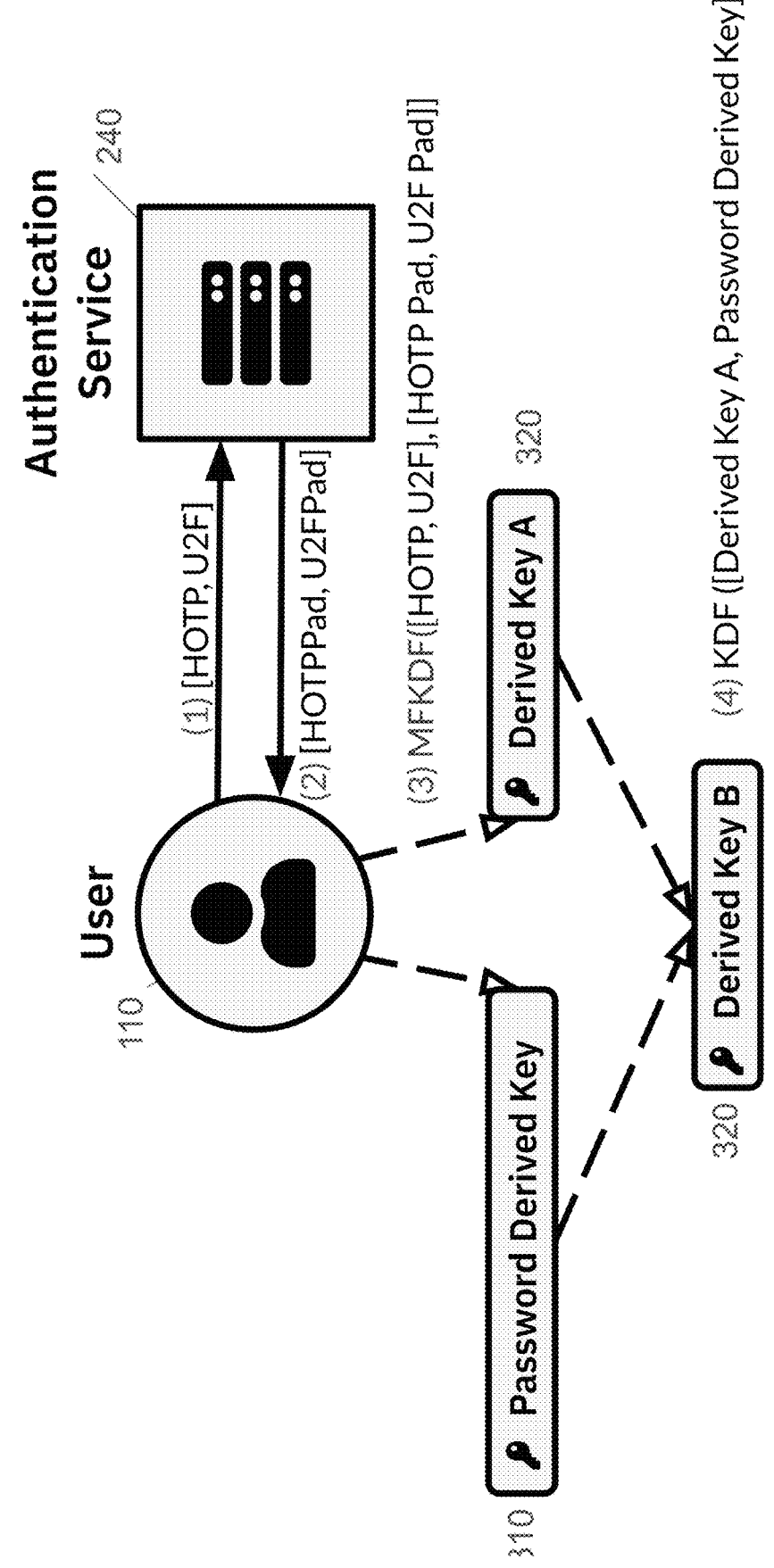

In one embodiment, multiple derived keys, obtained separately or together, are combined into a further derived key, as shown in FIG. 28. In steps 1-4, the multi-factor key derivation method is used to obtain a first derived key. In steps 5-8, the multi-factor key derivation method is repeated to obtain a second derived key. In step 9, the derived keys are used now as "factors" to obtain a third derived key using a key derivation function (such as HKDF or KDF1-4). In another embodiment, multiple keys are combined using a password-based key derivation function (such as PBKDF2, bcrypt, scrypt, argon2, etc.) by supplying the keys as an input to the function in place of a password. In another embodiment, the multiple keys are combined using a bitwise XOR (or modular arithmetic) to obtain a derived key. In a third embodiment, the multiple keys are combined using concatenation to obtain a derived key. The technique of obtaining a derived key from multiple other derived keys is termed "key stacking." A key advantage of this technique is shown in FIG. 29. Consider a key derivation policy that requires a password, and two or more of a HOTP code, a U2F response, or a recovery code. This policy can be accomplished by key stacking a password-derived key 310 with a 2-of-3 threshold-based multi-factor derived key 320 based on the HOTP code, U2F response, and recovery code; for example, a password, HOTP code, and U2F response could then be used to derive the key, as shown in FIG. 29. Note that a 3-of-4 threshold-based multi-factor derived key 320 based on the password, HOTP code, U2F response, and recovery code would not correctly implement this policy as the key could then be derived without the password using the HOTP code, U2F response, and recovery code in violation of the policy. Therefore, one advantage of key stacking is that it enables unique factor combination requirements that cannot necessarily be accomplished with threshold-based multi-factor key derivation alone. In one embodiment, key stacking is accomplished using multiple encryptions with several keys; for example, data may be encrypted with a password-derived key 310 and then further encrypted with an HOTP-derived key, therefore requiring both the password-derived key 310 and the HOTP-derived key to obtain the data. This achieves the effect of protecting data with keys derived from multiple authentication factors without directly combining the keys and is thus effectively equivalent to multi-factor key derivation.

Figure 30:
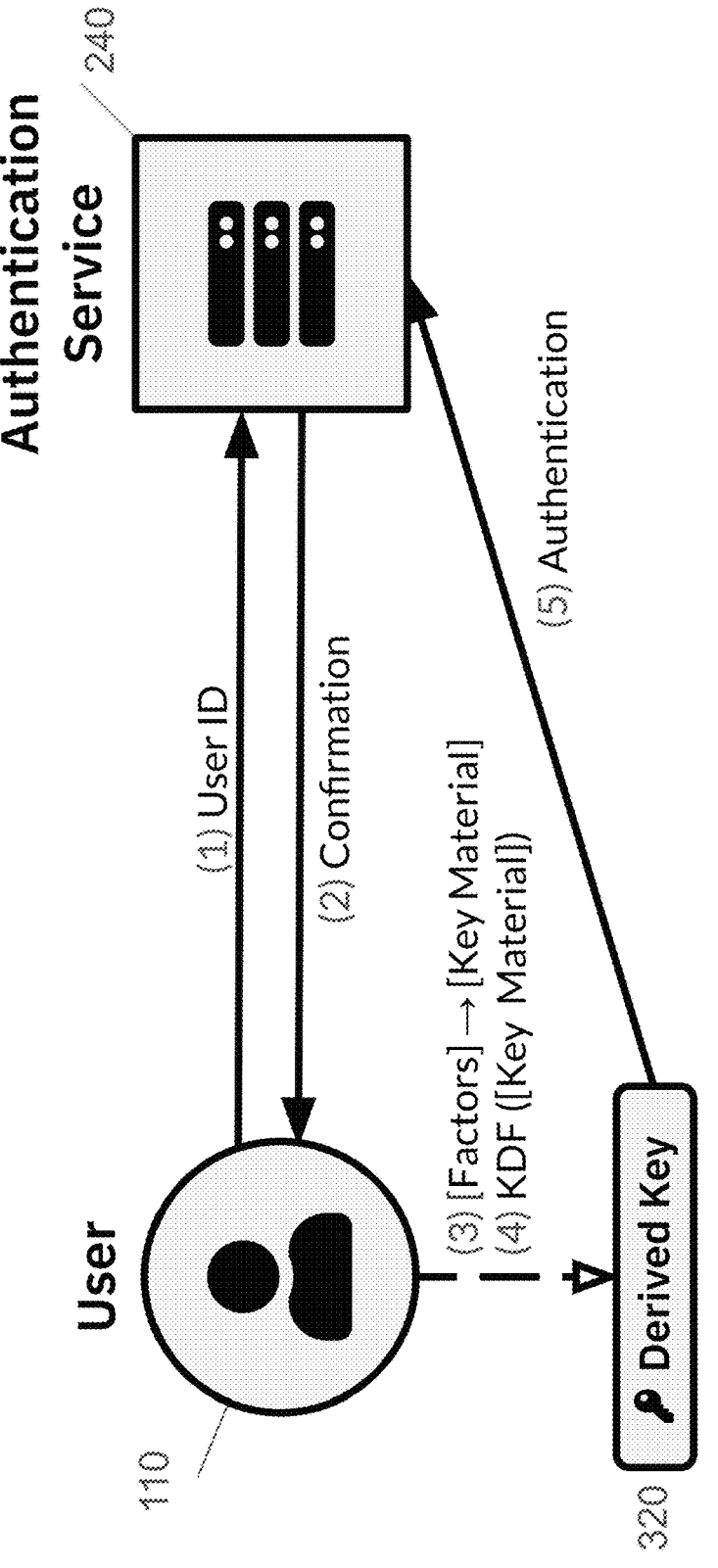
FIGS. 30-31 show a process of a user authenticating with an authentication service using a multi-factor derived key according to one embodiment of the present disclosure.
Figure 31:
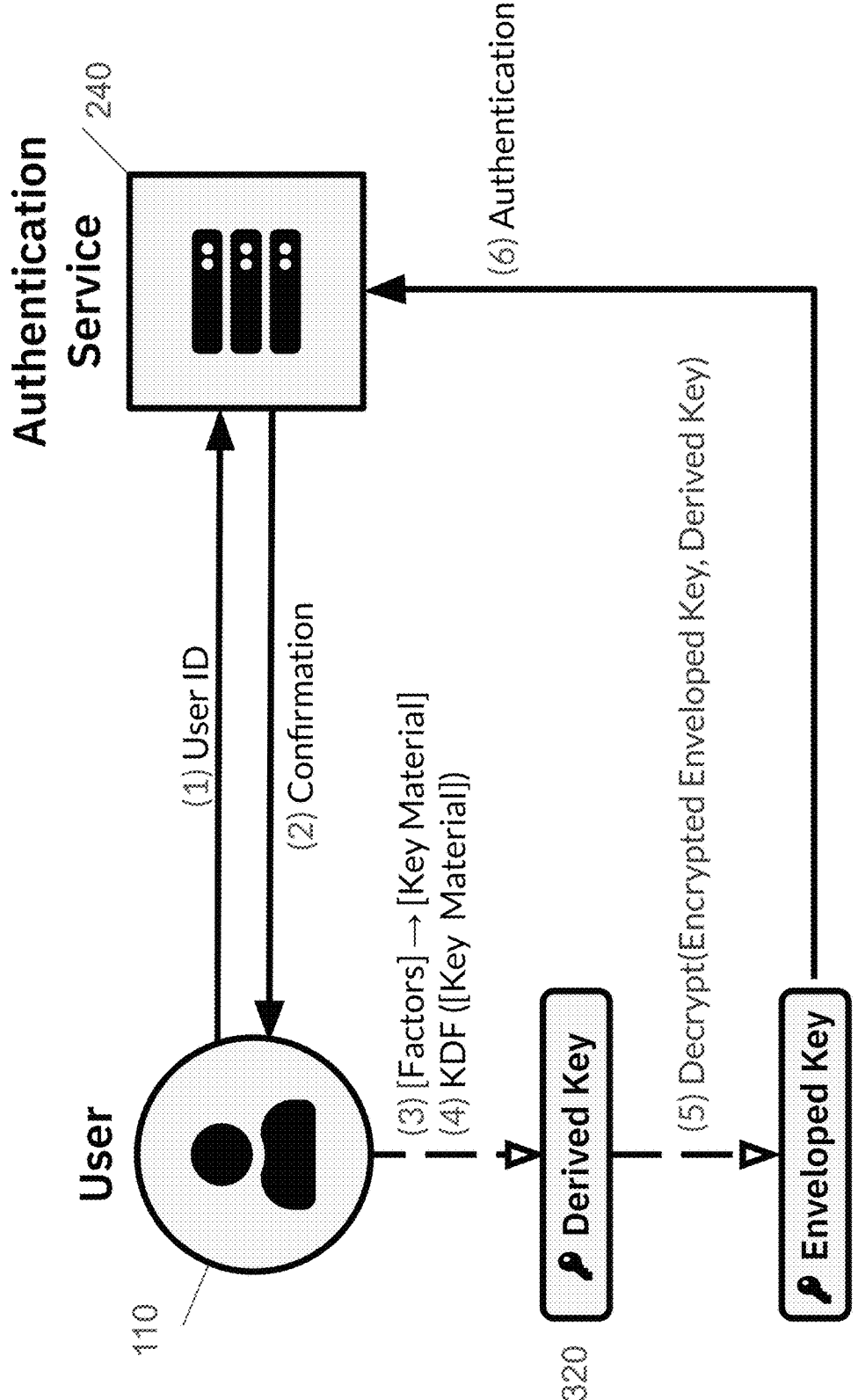

In one embodiment, the user 110 does not authenticate with the authentication service 240 prior to deriving a key; instead, they derive a key using their authentication factors, and then use the derived key to authenticate with the authentication service 240, as shown in FIG. 30. A derived symmetric key can be used to authenticate with the authentication service 240 for example using a timestamp (e.g. ISO 1-Pass Unilateral Authentication) or challenge-response protocol (eg. ISO 2-Pass Unilateral Authentication). Alternatively, an asymmetric key can be derived from the authentication factors (e.g. using the previously described key envelope approach), which can then be used to authenticate the user 110 (e.g. via ISO Public Key 1-Pass Unilateral Authentication or ISO Public Key 2-Pass Unilateral Authentication) as shown in FIG. 31. Since possession of a derived key implicitly proves knowledge of the authentication factors used to derive the key (or at least a threshold number of factors in the case of threshold-based multi-factor key derivation), this is a reasonable way to authenticate a user and is an indirect application of multi-factor authentication.

Figure 32:
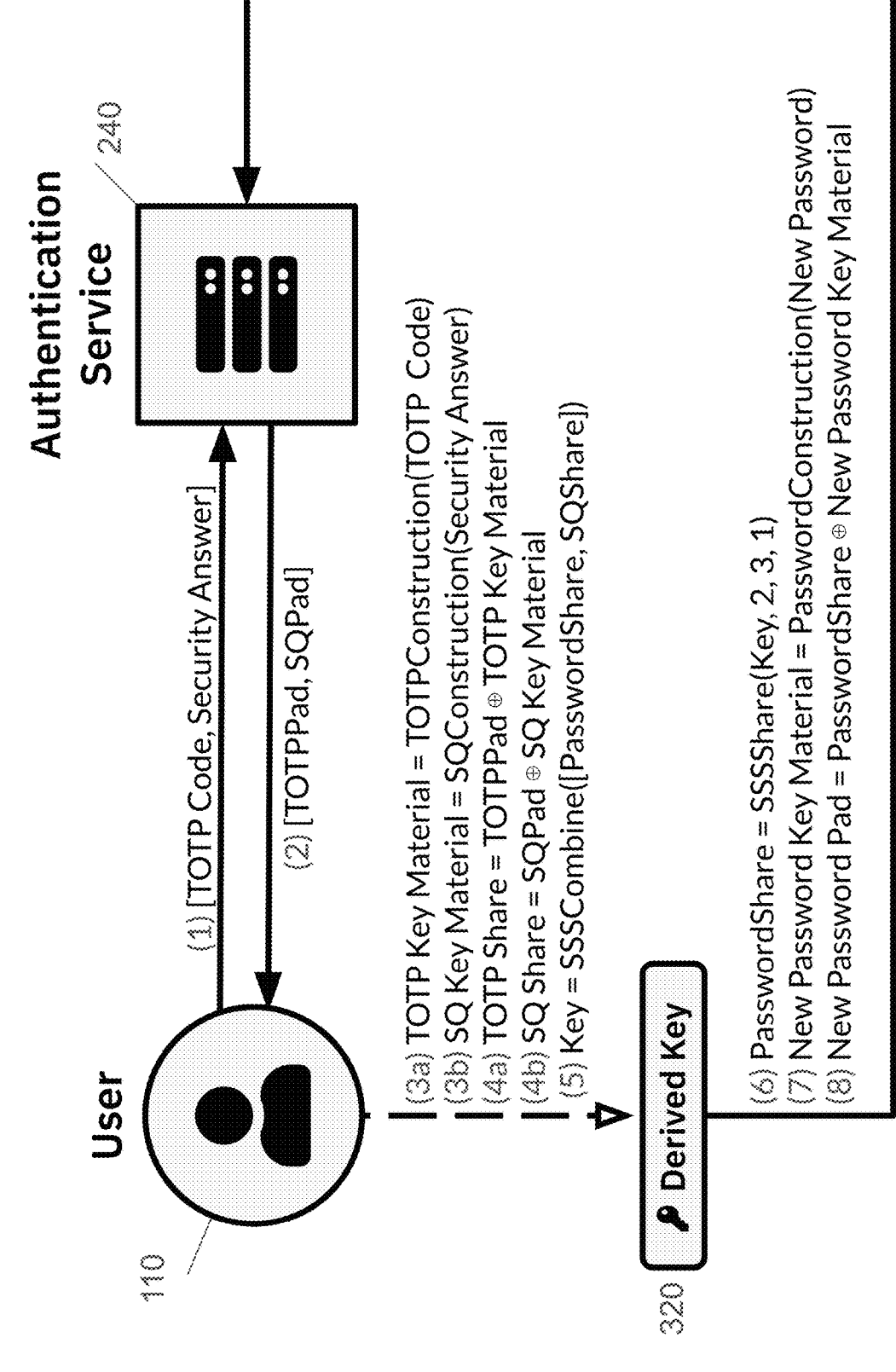
FIG. 32 shows a process of a user updating a password used to derive a key using a system and method for multi-factor key derivation according to one embodiment of the present disclosure.

In one embodiment, the factors comprising a multi-factor derived key 320 may be changed to add, remove, or modify the factors used to derive a key without changing the value of the derived key itself. FIG. 32 illustrates the process of modifying the 2-of-3 threshold-based multi-factor derived key 320 established in FIG. 21 to change the password factor to a new password without requiring knowledge of the original password (for example because the original password was forgotten). First, the key is derived using the other two factors (the TOTP Code and the Security Answer) as in FIG. 25. Next, the password share is re-computed from the derived key using the secret sharing scheme. Then, the new password key material is computed using the password derivation function and the new password. Finally, the new password pad is computed using the password share and new password key material, which is then sent to the authentication service 240 and stored in place of the old password pad. In effect, the same key can now be derived with the new password instead of the old password. In general, this procedure can be used to update any factor of a multi-factor derived key 320 (including to another type of factor entirely) as long as the key itself is known or can be derived from known factors.

Figure 33:
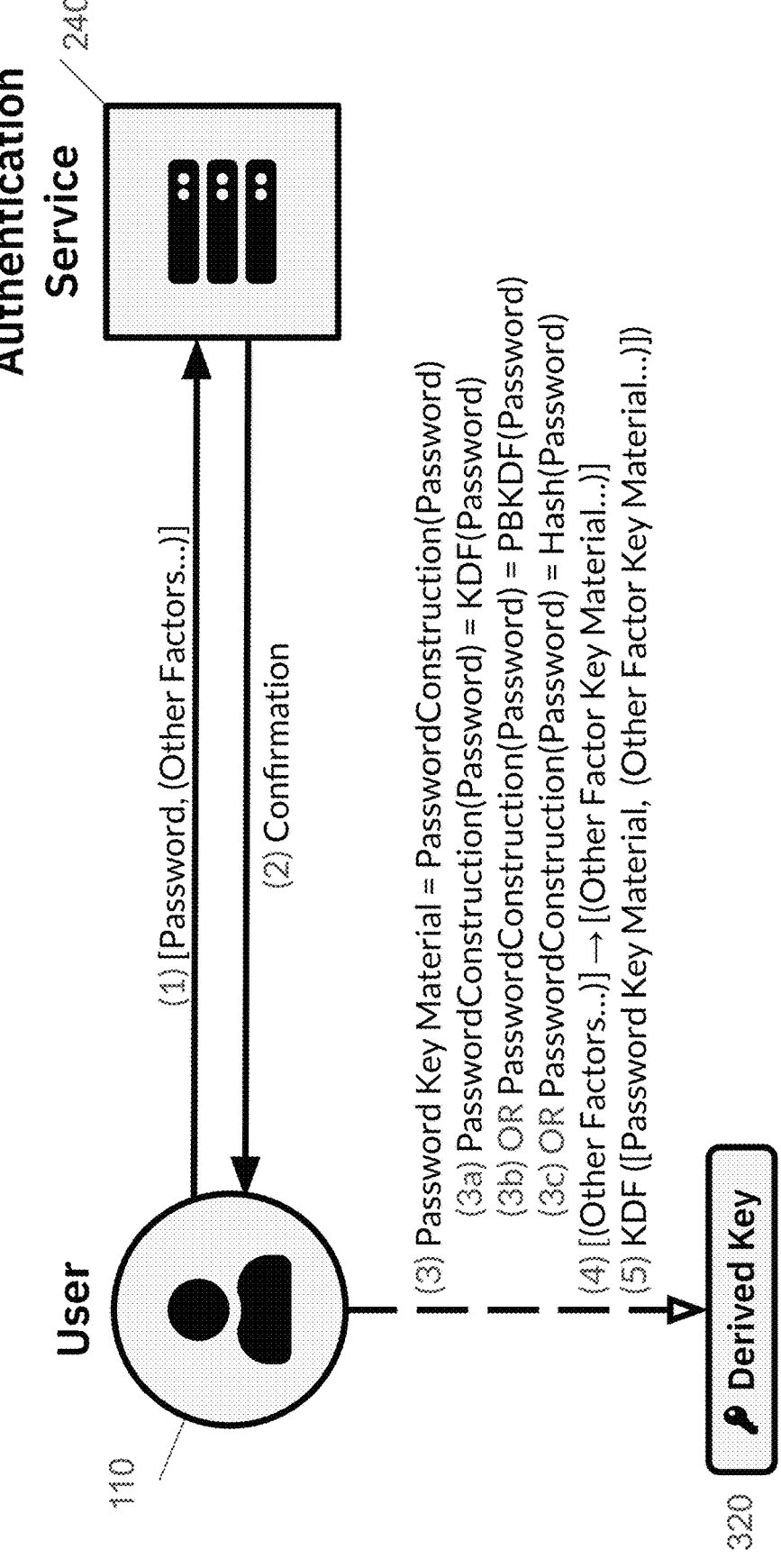
FIG. 33 shows a process of a user deriving a key using a system and method for multi-factor key derivation with a password factor according to one embodiment of the present disclosure.

In one embodiment, a password is used as one or more of the factors comprising a multi-factor derived key 320, as shown in FIG. 33. Password key material can of course be derived using a password-based key derivation function (PBKDF), but a standard key derivation function (KDF) or even simply a cryptographic hash function would also suffice for this purpose, as the brute-force attack resistance provided by a password-based key derivation function is not necessary when the password key material is simply used as one of several component in a multi-factor key derivation function, the multi-factor key derivation function itself using a KDF or PBKDF which may provide brute-force attack resistance. The advantages to providing this resistance on the multi-factor key derivation function rather than on the factor constructions is described below.

Figure 34:
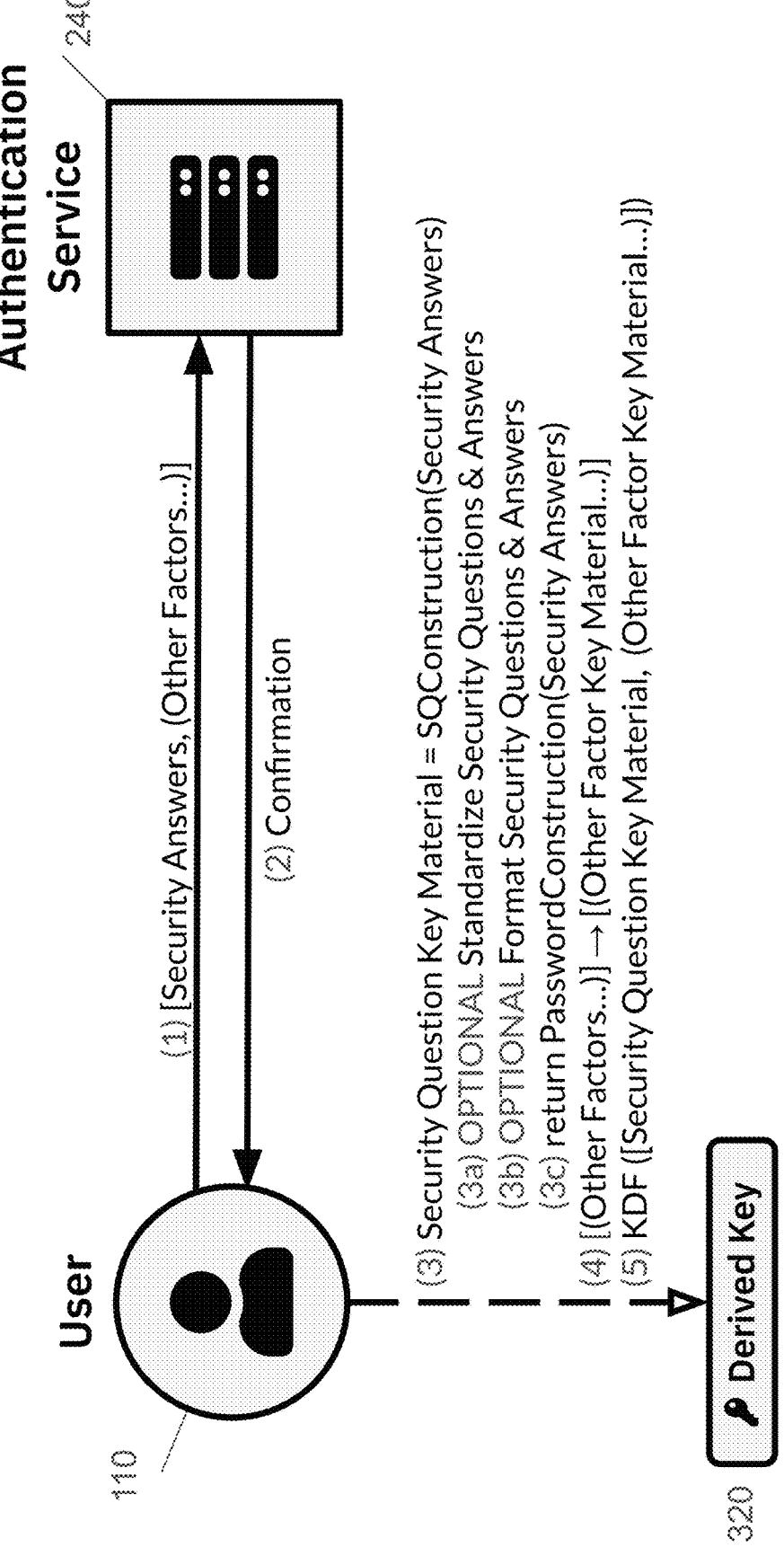
FIG. 34 shows a process of a user deriving a key using a system and method for multi-factor key derivation with a security questions factor according to one embodiment of the present disclosure.

In one embodiment, a set of security questions and answers is used as one or more of the factors comprising a multi-factor derived key 320, as shown in FIG. 34. Security question key material can be derived from security question and answer pairs or from security answers alone. A suggested process of deriving key material from security answers or question and answer pairs is as follows: In a first optional step (3a), security questions and answers are standardized, such as by removing non-alphanumeric characters, converting letters to a uniform case, and sorting responses by question name; for example, {'First-Pet': 'Max', 'Birth-City': 'Jacksonville', 'Mother's Maiden Name': 'Smith'} may be converted to {'birth-city': 'jacksonville', 'first-pet': 'max', 'mothers-maiden-name': 'smith'}. The intention of this step is to make it easier for users to present the correct security question response by not requiring them to remember the exact casing or punctuation used in their previous response, with the further goal of allowing for deterministic derivation in the case where different users have selected different security questions. In a second optional step (3b), security questions and answers are reformatted; for example, {'birth-city': 'jacksonville', 'first-pet': 'max', 'mothers-maiden-name': 'smith'} may be converted to "birth-city: jacksonville; first-pet: max; mothers-maiden-name: smith" in this step. The intention of this step is to convert the questions and answers into a format that is more easily digestible by a KDF or PBKDF in the next step. In a third step (3c), the formatted question and answer data is treated as a password, and a process resembling the password-based key material construction is used; namely, a KDF, PBKDF, or cryptographic hash function is used to convert the question and answer data into key material. The prototypical use case for a security questions factor is as one of the recovery factors comprising a threshold-based multi-factor derived key 320; for example, a 2-of-3 threshold-based multi-factor derived key 320 based on a password, TOTP code, and security question factor would allow security questions to be used to recover from either the password or TOTP code being lost. In one embodiment, the secret-sharing system described in the context of threshold-based multi-factor key derivation is used in the security question key material construction to enable a k-of-n security questions factor; in this setting, n security questions & answers are established, and later k of these security questions must be correctly answered to derive the security question key material.

Figure 35:
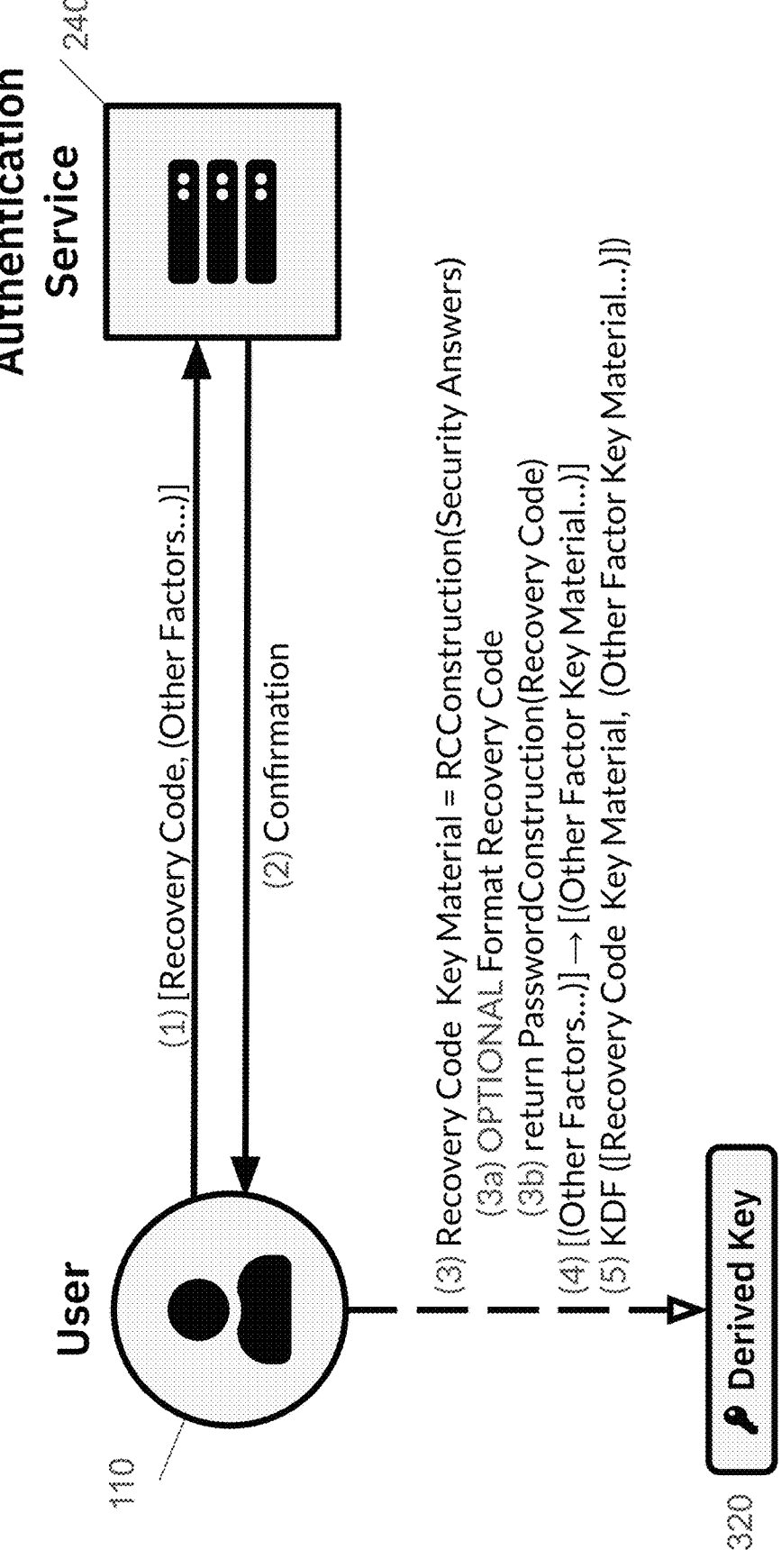
FIG. 35 shows a process of a user deriving a key using a system and method for multi-factor key derivation with a recovery code factor according to one embodiment of the present disclosure.

In one embodiment, a recovery code is used as one or more of the factors comprising a multi-factor derived key 320, as shown in FIG. 35. A recovery code is typically generated upon initial user 110 registration and is presented to the user 110 in a standardized format such as UUIDv4 format (eg. "11bf5b37-e0b8-42e0-8dcf-dc8c4aefc000") to simplify storage and input of recovery codes. A suggested process of deriving key material from a recovery code is as follows: In a first optional step (3a), recovery codes are reformatted to obtain their raw byte content; for example, the hyphens would be removed from the above UUIDv4 code and any checksum or formatting bytes would be discarded. The intention of this step is to remove data that does not contribute entropy to the key derivation process and to convert the recovery codes into a format that is more easily digestible by a KDF or PBKDF in the next step. In a second step (3c), the formatted recovery code data is treated as a password, and a process resembling the password-based key material construction is used; namely, a KDF, PBKDF, or cryptographic hash function is used to convert the question and answer data into key material. The prototypical use case for a recovery code factor is as one of the factors comprising a threshold-based multi-factor derived key 320; for example, a 2-of-3 threshold-based multi-factor derived key 320 based on a password, TOTP code, and recovery code factor would allow a recovery code to be used to recover the key if either the password or TOTP code were lost.

Figure 36:
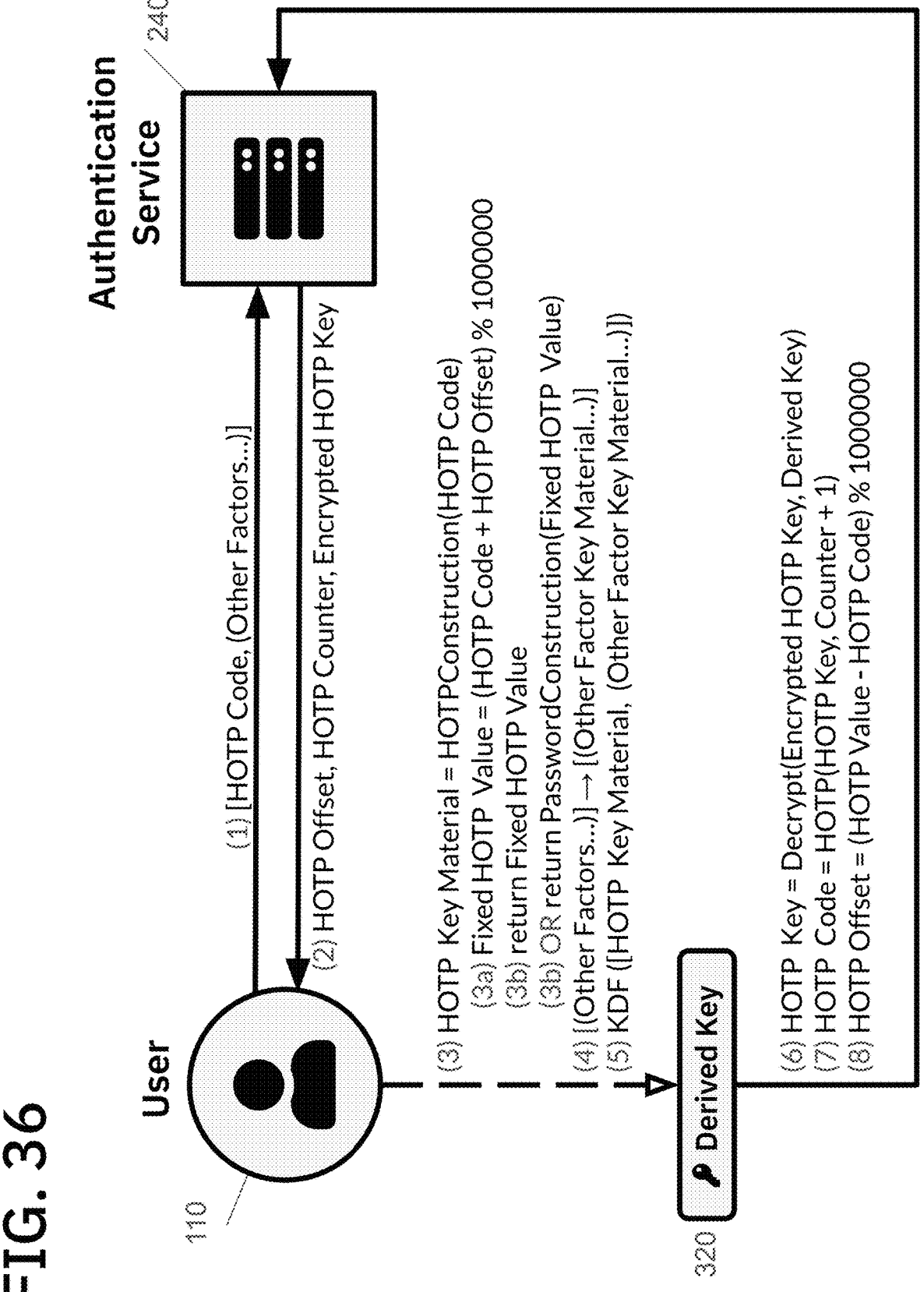
FIG. 36 shows a process of a user deriving a key using a system and method for multi-factor key derivation with an HOTP factor according to one embodiment of the present disclosure.

In one embodiment, an HMAC-based One-Time Password (HOTP) code is used as one or more of the factors comprising a multi-factor derived key 320, as shown in FIG. 36. An HOTP code is often one of the primary factors comprising a multi-factor authentication system and thus is a desirable factor to include in deriving a multi-factor derived key 320. However, unlike the previously described factors, the constantly-changing nature of an HOTP code makes deterministically deriving key material from HOTP difficult. One recommended way of deriving key material from an HOTP code is as follows: during a setup process, a fixed HOTP value such as "777777" is determined for an account. The HOTP key is determined, is encrypted with the derived key, and is then stored with the authentication service 240. The difference between the next valid HOTP code and the fixed HOTP value (modulo maximum HOTP code value plus one) is also determined and stored; for example, if the next HOTP value is "123456," then the offset "654321" is stored because 123456+654321 (mod 1000000) =777777. During a later key derivation process, in step 1, a user 110 computes the HOTP code during the normal multi-factor authentication process. In step 2, the authentication service 240 returns the HOTP offset and encrypted HOTP key established during the setup process. In step 3a, the fixed HOTP value is retrieved by combining the HOTP code with the HOTP offset (modulo maximum HOTP code value plus one). This value can be used directly as the HOTP key material, or, in one embodiment, a KDF, PBKDF, or cryptographic hash function is used to convert the fixed HOTP value into key material. In step 4, any other factors are converted into key material, and in step 5, the key material from the various factors is used to derive a multi-factor derived key 320. In step 6, the HOTP key is retrieved by decrypting the encrypted HOTP key using the multi-factor derived key 320. In step 7, the next valid HOTP code is computed using the HOTP key and HOTP counter value (which may be included in the authentication service 240 response in plaintext or encrypted form). In step 8, the next HOTP offset is computed using the fixed HOTP value and the next HOTP code. The new HOTP offset is then stored in the authentication service 240 to be used for the next key derivation. Updating the HOTP offset upon each key derivation ensures that even while the HOTP code changes upon each login, constant key material (and thus a fixed multi-factor derived key 320) is obtained. In one embodiment, multiple HOTP offsets corresponding to the next several valid HOTP codes are stored in the authentication service 240 (and updated upon each successful key derivation), allowing for a "window" of valid HOTP responses and thereby enabling a few failed attempts to be made before the HOTP factor can no longer be used.

Figure 37:
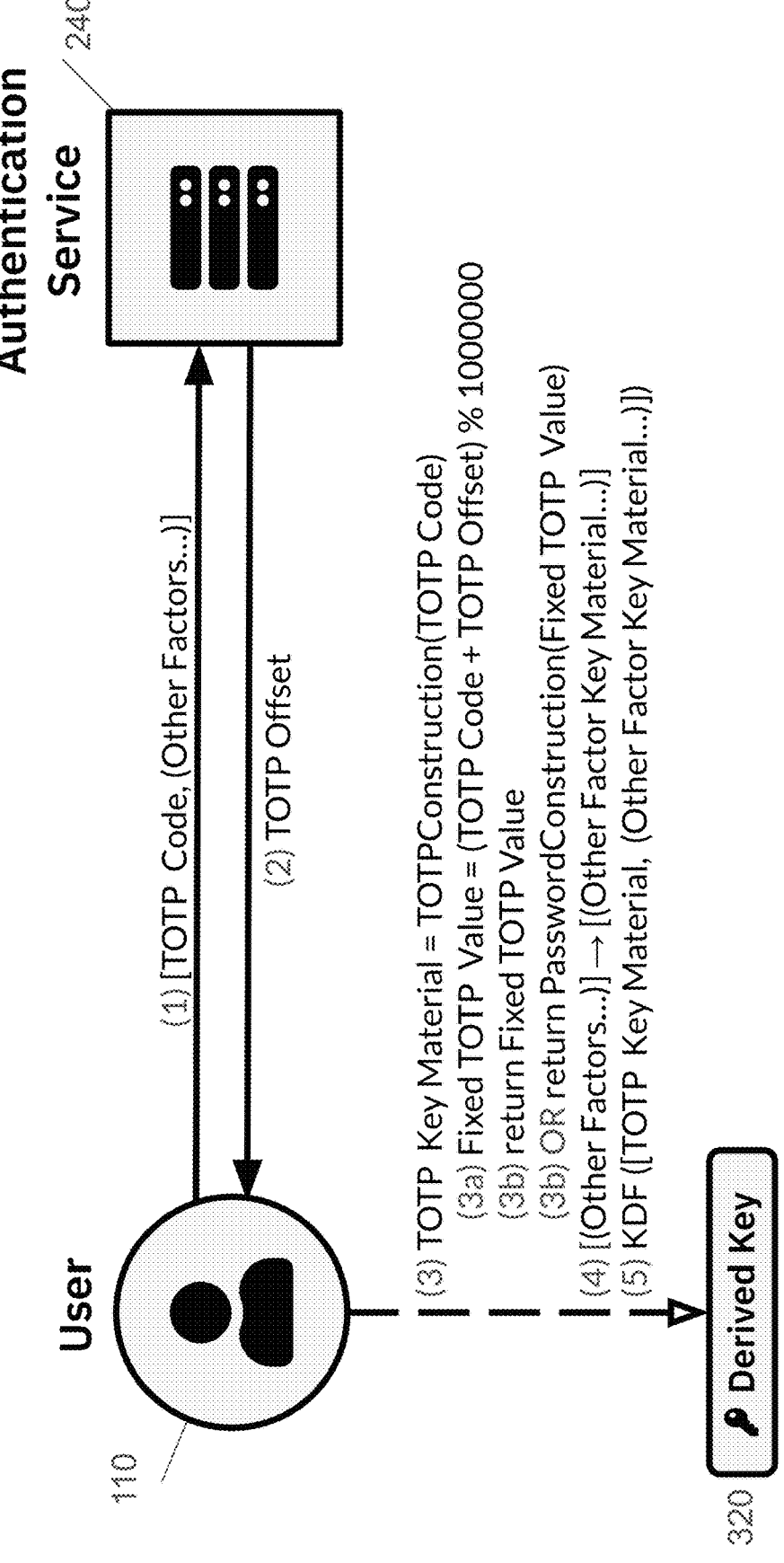
FIG. 37 shows a process of a user deriving a key using a system and method for multi-factor key derivation with a TOTP factor according to one embodiment of the present disclosure.

In one embodiment, a Time-based One-time Password (TOTP) code is used as one or more of the factors comprising a multi-factor derived key 320, as shown in FIG. 37. As with HOTP, the commonality of TOTP makes it a desirable factor in a multi-factor derived key 320, but its constantly-changing nature complicates the deterministic derivation of TOTP-based key material. Furthermore, unlike HOTP, the next TOTP code cannot be determined upon successful key-derivation because it is time-dependent. One recommended way of deriving key material from a TOTP code is as follows: during a setup process, a fixed TOTP value such as "777777" is determined for an account. During a later key derivation process, in step 1, a user 110 computes the TOTP code during the normal multi-factor authentication process. In step 2, the difference between the current valid TOTP code and the fixed TOTP value (modulo maximum TOTP code value plus one) is also determined and returned to the user 110; for example, if the next TOTP value is "123456," then the offset "654321" is stored because 123456+654321 (mod 1000000)=777777. In step 3a, the fixed TOTP value is retrieved by combining the TOTP code with the TOTP offset (modulo maximum TOTP code value plus one). This value can be used directly as the TOTP key material, or, in one embodiment, a KDF, PBKDF, or cryptographic hash function is used to convert the fixed TOTP value into key material. In step 4, any other factors are converted into key material, and in step 5, the key material from the various factors is used to derive a multi-factor derived key 320. In one embodiment, multiple TOTP offsets corresponding to the next several valid TOTP codes are returned by the authentication service 240 in step 2, allowing for a "window" of valid TOTP responses.

Figure 38:
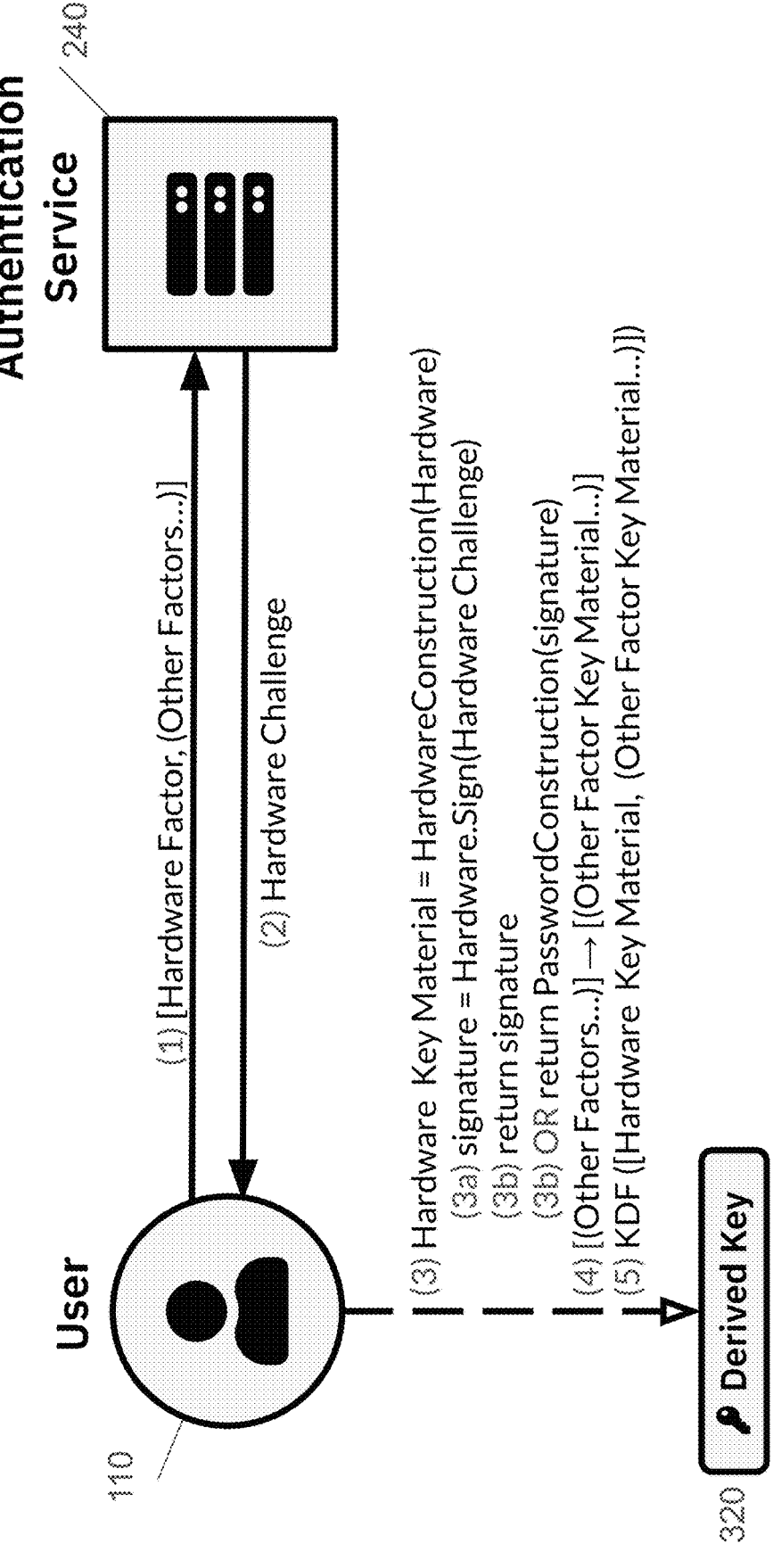
FIG. 38 shows a process of a user deriving a key using a system and method for multi-factor key derivation with a hard token factor according to one embodiment of the present disclosure.

In one embodiment, a response from a hardware security device such as a smart card or a Universal 2nd Factor (U2F) device (also known as a "hard token") is used as one or more of the factors comprising a multi-factor derived key 320, as shown in FIG. 38. One recommended way of deriving key material from a hardware security device is as follows: during a setup process, a fixed challenge value is determined for an account and stored with the authentication service 240. During a later key derivation process, in step 1, a user 110 performs a multi-factor authentication process. In step 2, the fixed challenge value is sent to the user 110 by the authentication service 240. In step 3a, the fixed challenge value is sent to the hardware device to produce a signature or "response" value. This response can be used directly as the key material, or, in one embodiment, a KDF, PBKDF, or cryptographic hash function is used to convert the fixed response value into key material. In step 4, any other factors are converted into key material, and in step 5, the key material from the various factors is used to derive a multi-factor derived key 320.

Figure 39:
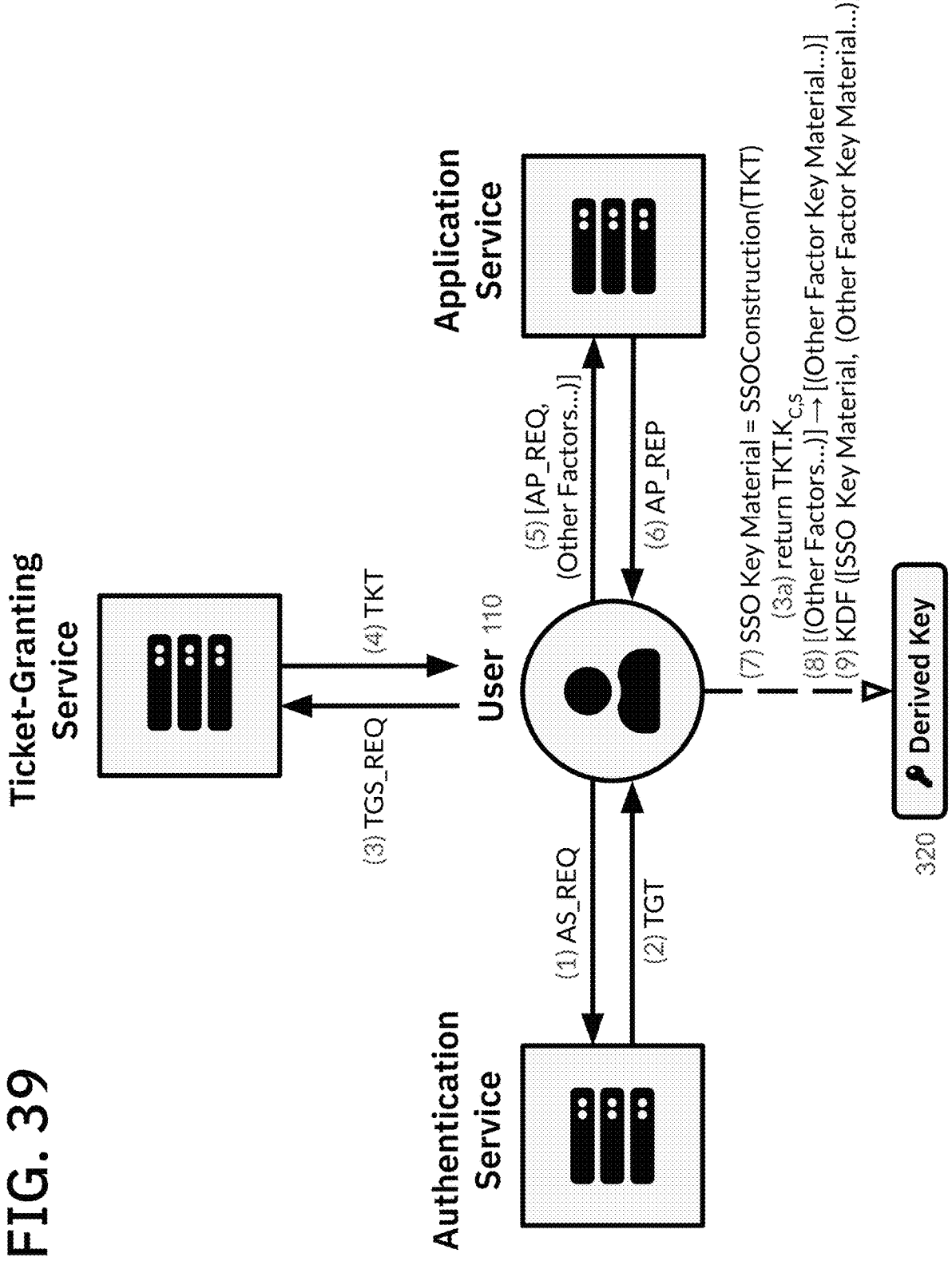
FIG. 39 shows a process of a user deriving a key using a system and method for multi-factor key derivation with an SSO factor according to one embodiment of the present disclosure.

In one embodiment, a Single Sign-On (SSO) technology such as Kerberos, Shibboleth, OAuth, OAuth, SAML, Active Directory, etc. is used as one or more of the factors comprising a multi-factor derived key 320, as shown in FIG. 39. The example of deriving key material from SSO authentication of FIG. 39 is based on the Kerberos protocol but can be adapted for use with other SSO protocols. In steps 1-6, the standard Kerberos authentication protocol is followed between an authentication service 240 (AS), a Ticket-Granting Service (TGS), and an Application Service(S). In step 7, SSO key material is derived from the Ticket (TKT) provided by the TGS in step 4; specifically the shared client and application service key ($K_{C,S}$) contained in the TKT is used as key material (or is used to derive key material via a KDF or hash function). In step 8, any other factors are converted into key material, and in step 9, the key material from the various factors is used to derive a multi-factor derived key 320. The envisioned use case for an SSO-based factor in a multi-factor key derivation process is in enabling services which require multi-factor derived key 320s for their secure operation to offer SSO capabilities.

Figure 40:
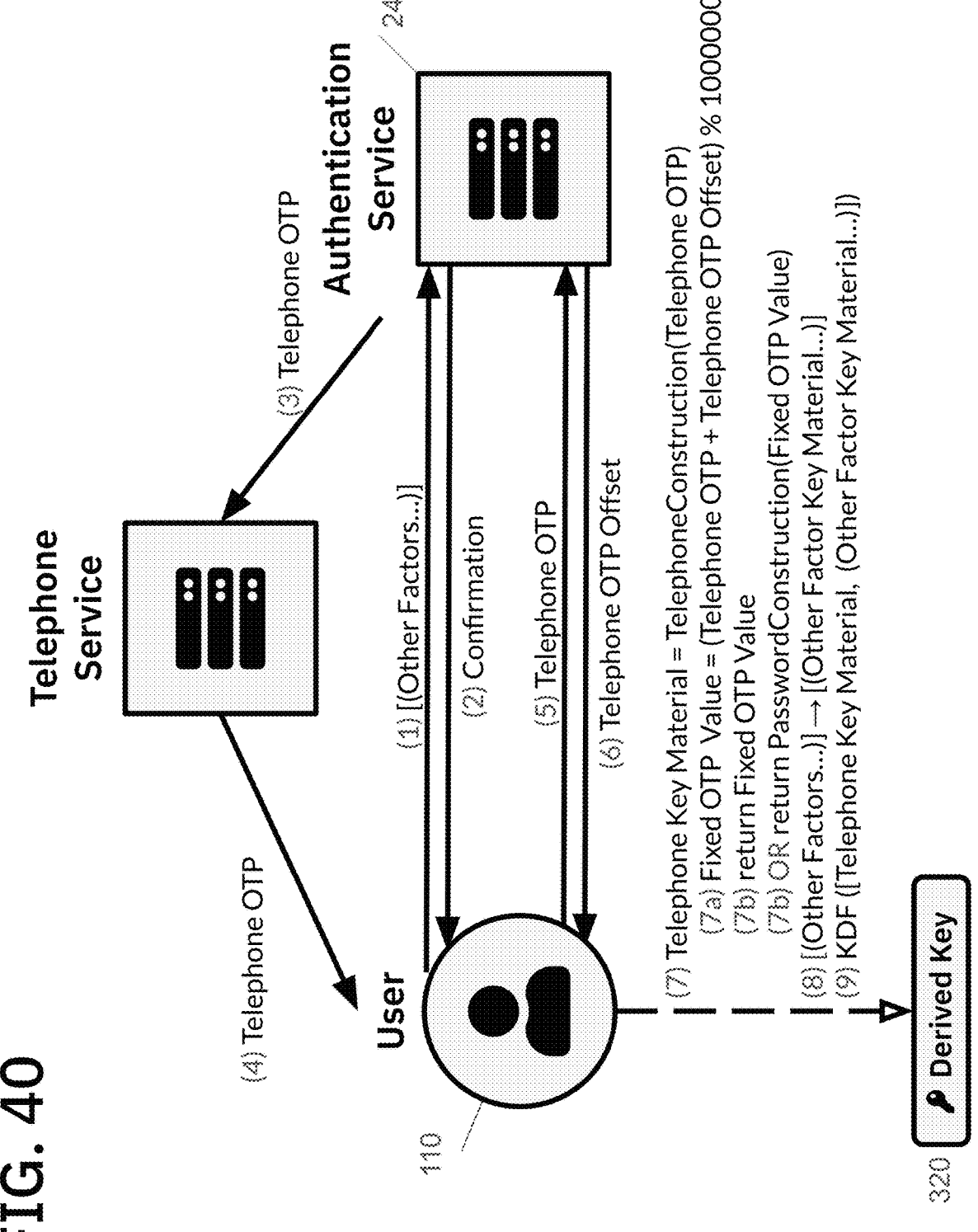
FIG. 40 shows a process of a user deriving a key using a system and method for multi-factor key derivation with a telephone factor according to one embodiment of the present disclosure.

In one embodiment, mobile phone-based authentication (namely, SMS or voice call based authentication) is used as one or more of the factors comprising a multi-factor derived key 320, as shown in FIG. 40. SMS remains one of the most popular 2FA methods in the world, and thus an SMS-based OTP is a desirable component of a multi-factor derived key 320. One recommended way of deriving key material from a One-Time Password (OTP) code sent via SMS or phone call is as follows: during a setup process, a fixed OTP value such as "777777" is determined for an account. During a later key derivation process, in step 1, a user 110 initiates a login process using other authentication factors. In step 2, the authentication service 240 confirms the login request and prompts the user 110 for a telephone OTP code. In step 3, the authentication service 240 sends a telephone OTP code to a telephone service (eg. via one or more telephone communication APIs), which is delivered to the user 110 via SMS or voice call in step 4. In step 5, the user 110 sends the received telephone OTP to the service; the multi-factor authentication process is now complete. In step 6, the OTP is validated and the difference between the current telephone OTP code and the fixed OTP value (modulo maximum OTP value plus one) is also determined and returned to the user 110; for example, if the telephone OTP value is "123456," then the offset "654321" is returned because 123456+654321 (mod 1000000)=777777. In step 7a, the fixed OTP value is retrieved by combining the telephone OTP code with the telephone OTP offset (modulo maximum OTP value plus one). This value can be used directly as the telephone key material, or, in one embodiment, a KDF, PBKDF, or cryptographic hash function is used to convert the fixed OTP value into key material. In step 8, any other factors are converted into key material, and in step 9, the key material from the various factors is used to derive a multi-factor derived key 320.

15

16

Figure 41:
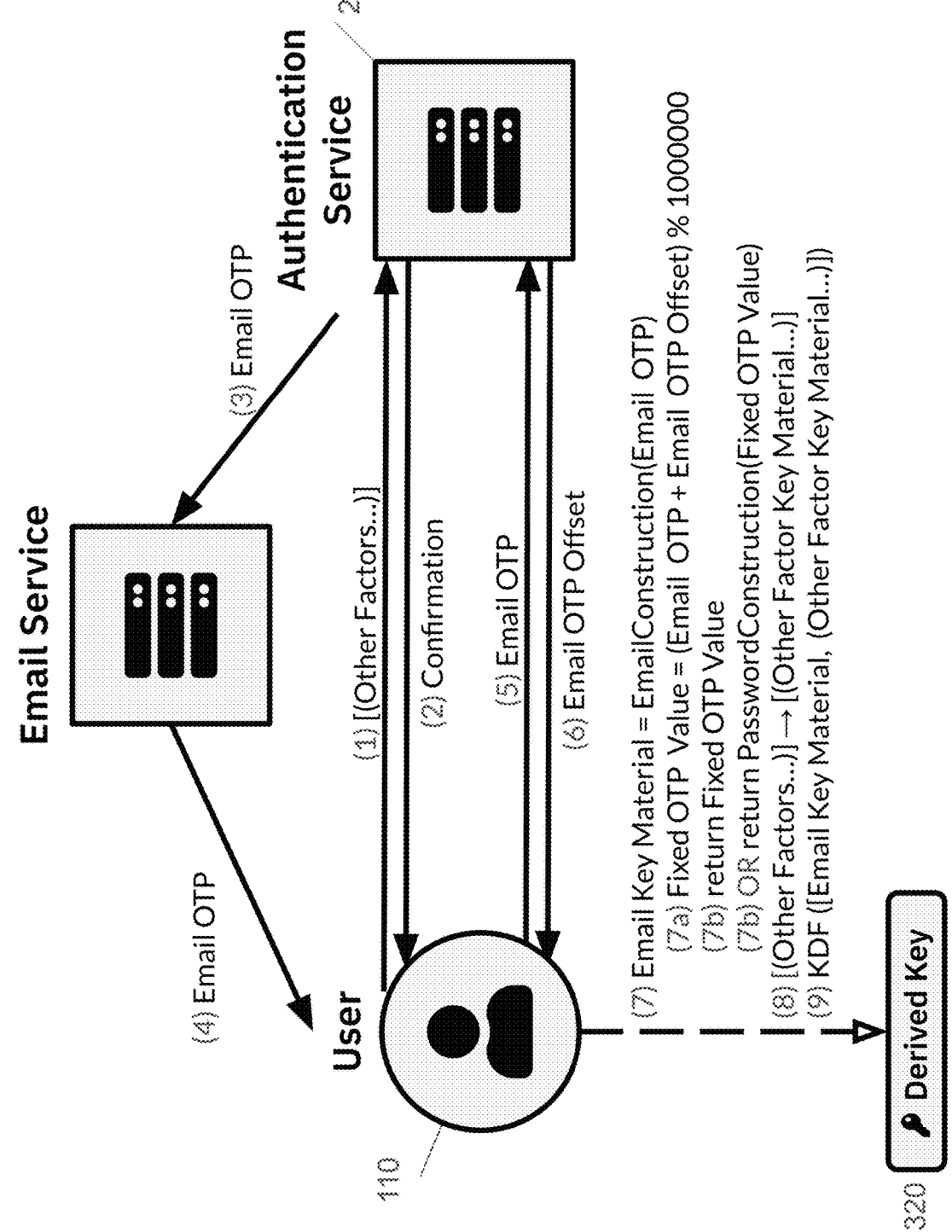
FIG. 41 shows a process of a user deriving a key using a system and method for multi-factor key derivation with a email factor according to one embodiment of the present disclosure.

In one embodiment, email authentication is used as one or more of the factors comprising a multi-factor derived key 320, as shown in FIG. 41. An OTP sent via an email message remains in popular use both for primary authentication and for account recovery. A suggested way of deriving key material from a OTP code sent via email is to use a similar process as when sending an OTP code via SMS (as described above), however substituting the telephone service in step 3 with an email service, and delivering the OTP as an email message in step 4 rather than as an SMS message. Email and telephone are both examples of "out of band" factors where an independent communication channel such as a telephone network is used to deliver a code which is later used as part of the authentication and multi-factor key derivation process. Further out of band factors may be constructed by replacing the telephone and email services in FIGS. 40 and 41 respectively with other out of band communication networks.

Figure 42:
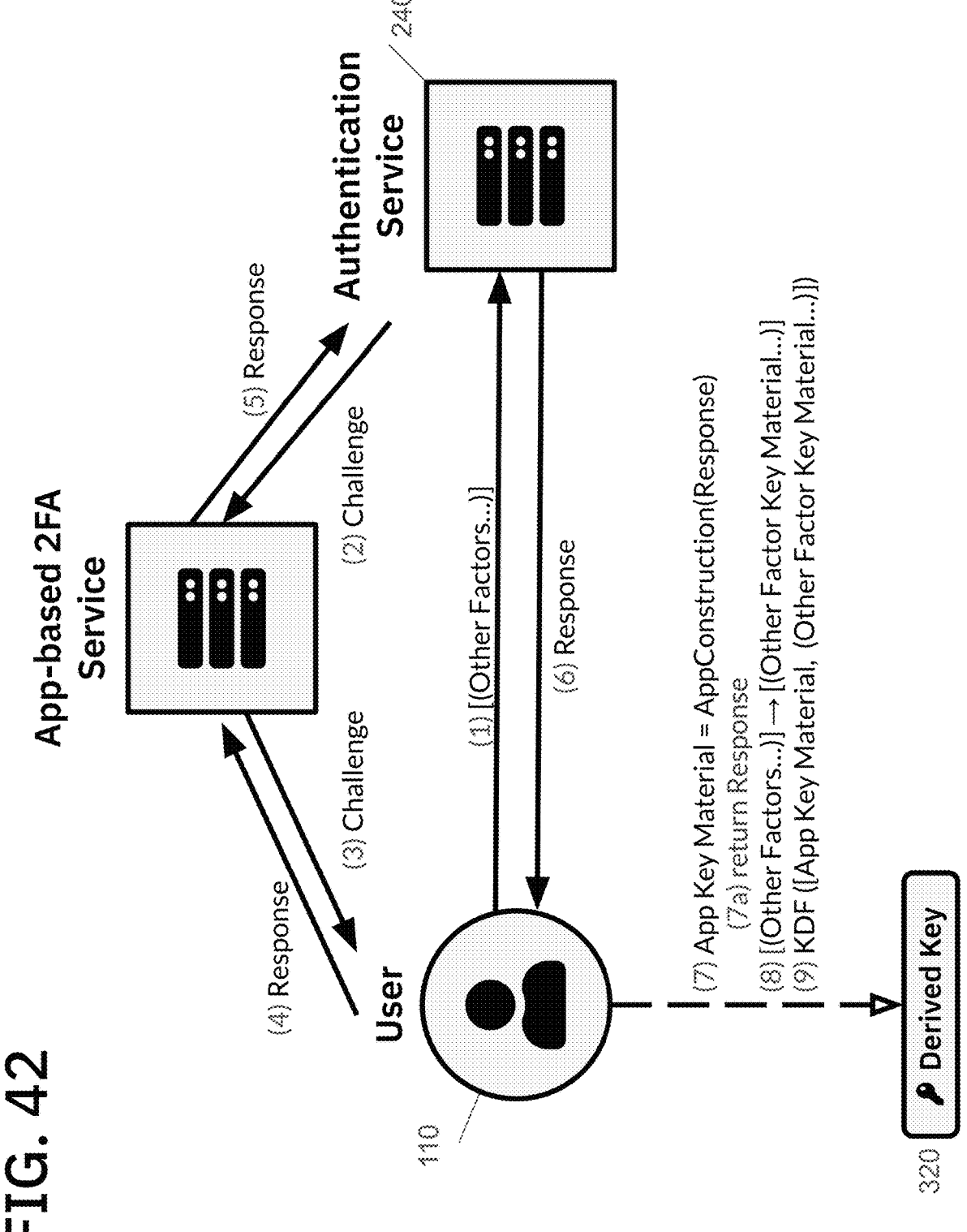
FIG. 42 shows a process of a user deriving a key using a system and method for multi-factor key derivation with a soft token factor according to one embodiment of the present disclosure.

In one embodiment, authentication based on a mobile application (such as authentication based on a push notification or based on scanning a QR code), also known as a "soft token," is used as one or more of the factors comprising a multi-factor derived key 320, as shown in FIG. 42. A suggested way of deriving key material from a soft token is to use a similar process as when deriving key material from a hard token. In step 1, the user 110 initiates the authentication process using one or more other authentication factors. In steps 2-3, the authentication service 240 issues a challenge to the user's soft token through an API. The user 110 may then be required to take some action to approve the request, such as by tapping on a push notification or by scanning a QR code, thereby generating a response. In steps 4-5, the response is returned to the authentication service 240 through the API. In step 6, the authentication service 240 returns the response to the user 110. In step 7, key material is derived from the authentication response. Key material may be derived directly from the response if a fixed challenge is used in steps 2-3 and a response constitutes a deterministic digital signature of the fixed challenge. In step 8, any other factors are converted into key material, and in step 9, the key material from the various factors is used to derive a multi-factor derived key 320.

Figure 43:
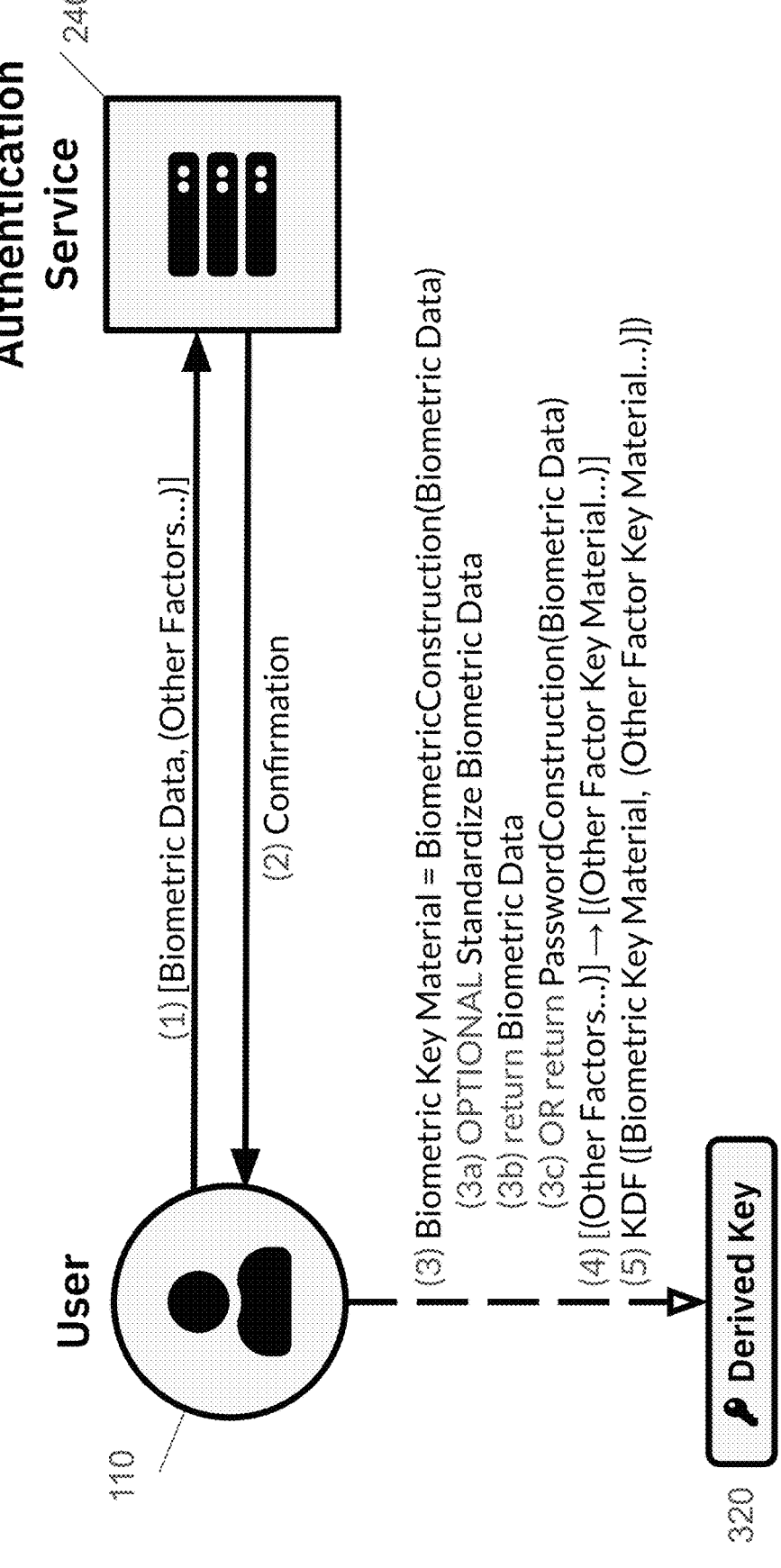
FIG. 43 shows a process of a user deriving a key using a system and method for multi-factor key derivation with a biometric factor according to one embodiment of the present disclosure.

In one embodiment, biometric data is used as one or more of the factors comprising a multi-factor derived key 320, as shown in FIG. 43. A suggested process of deriving key material from biometric data (such as measurements of particular biological features of the user) is as follows: In a first optional step (3*a*), the biometric data is standardized, such as by rounding biometric measurement values to a predetermined degree of precision. The intention of this step is to make it easier for a fixed biometric "image" to be constructed despite biometric measurements varying slightly over time even for the same user 110. This value can be used directly as the biometric key material, or, in one embodiment, a KDF, PBKDF, or cryptographic hash function is used to convert the standardized biometric data into key material.

Figure 44:
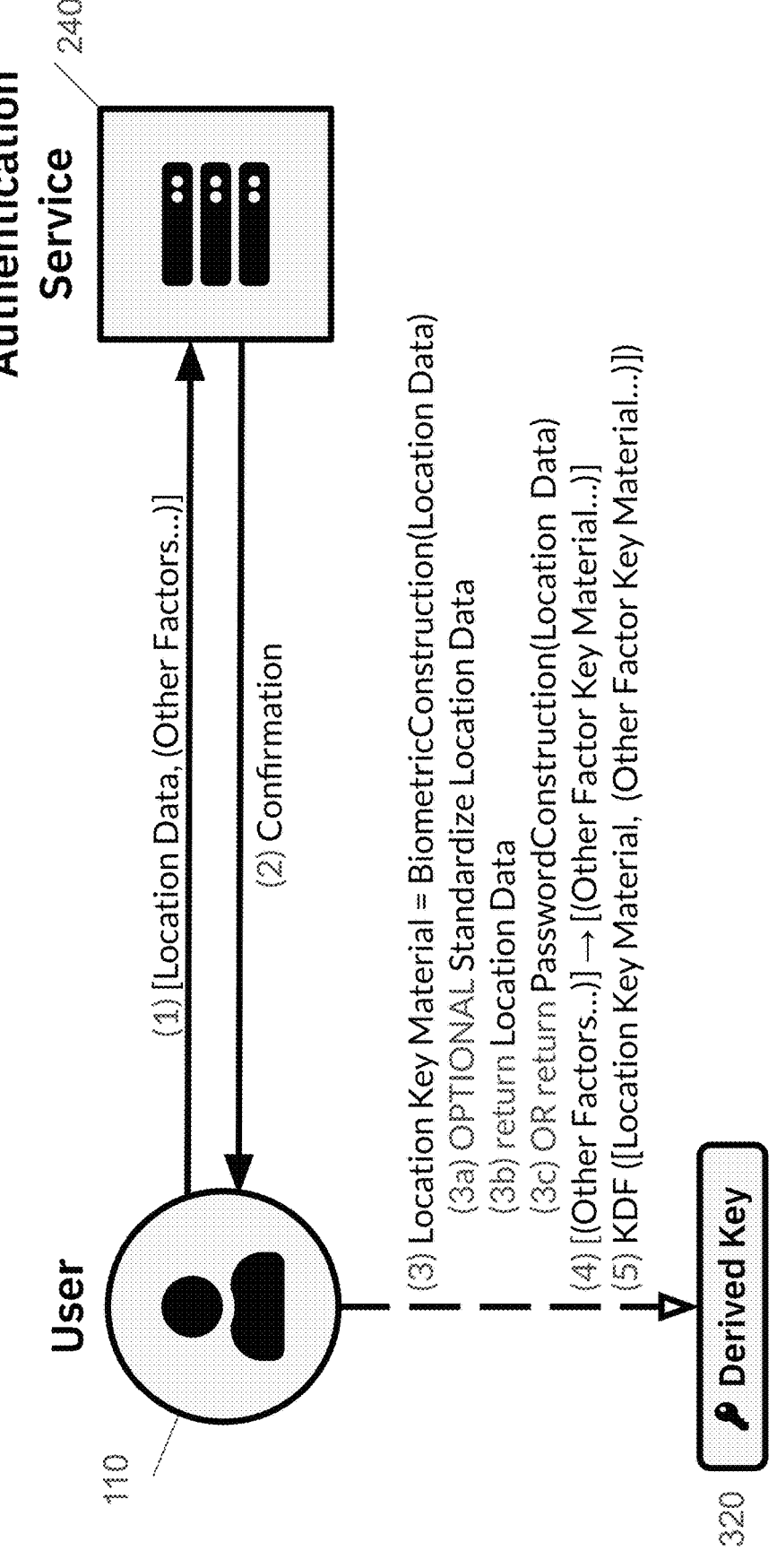
FIG. 44 shows a process of a user deriving a key using a system and method for multi-factor key derivation with a location factor according to one embodiment of the present disclosure.

In one embodiment, location data is used as one or more of the factors comprising a multi-factor derived key 320, as shown in FIG. 44. A suggested process of deriving key material from location data (such as the user's latitude and longitude) is as follows: In a first optional step (3*a*), the location data is standardized, such as by rounding the geo coordinates to a predetermined degree of precision. The intention of this step is to account for a potential margin of error when measuring a user's location. Various degrees of rounding can be used to establish a "zone" in which a user's key can be derived; for example, a low degree of rounding may allow a key to be derived from any geo coordinates within the user's home address, while a high degree of rounding may allow a key to be derived from any geo coordinates within the user's home city. This value can be used directly as the location key material, or, in one embodiment, a KDF, PBKDF, or cryptographic hash function is used to convert the standardized location data into key material. The prototypical use case for a location factor is as means of simplifying the authentication process when the user 110 is in a trusted location; for example, a 2-of-3 threshold-based multi-factor derived key 320 based on a password, TOTP code, and a location factor would allow password authentication (in combination with the location factor) to be sufficient for deriving the key when the user 110 is in a safe location (such as within an office building), while the password and TOTP code must both be used when the user 110 is not in the safe location (as the location factor now cannot be used to derive the key).

Figure 45:
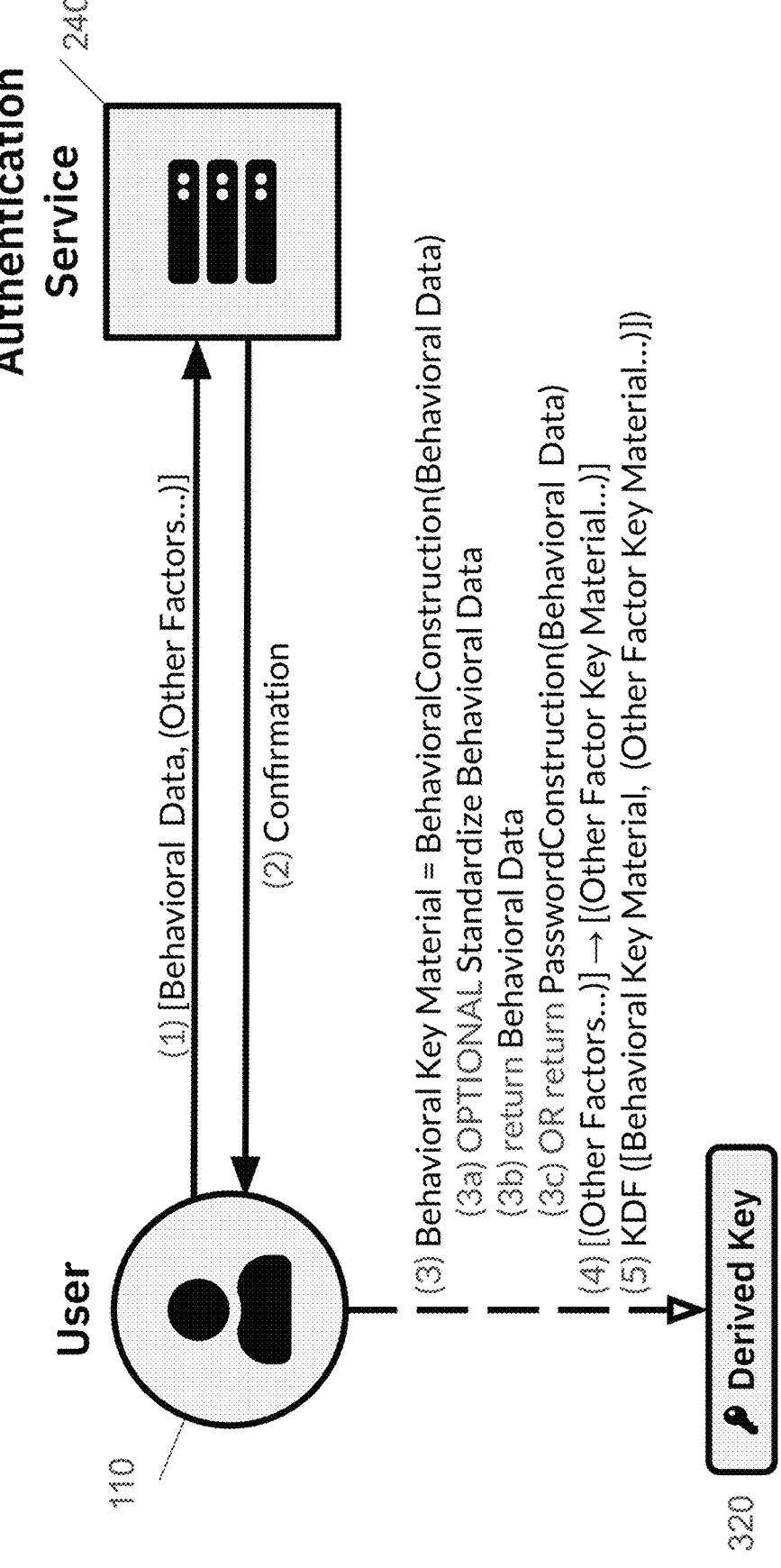
FIG. 45 shows a process of a user deriving a key using a system and method for multi-factor key derivation with a behavioral factor according to one embodiment of the present disclosure.

In one embodiment, behavioral data (such as typing speed or patterns) may be used as one or more of the factors comprising a multi-factor derived key 320, as shown in FIG. 45. The suggested process for deriving key material from behavioral data is similar to the suggested process for deriving key material from biometric data and is often referred to as "behavioral biometrics." In one embodiment, the secret-sharing system described in the context of threshold-based multi-factor key derivation is used in the behavioral data key material construction to enable a k-of-n behavioral data factor; in this setting, n behavioral metrics are established, and later k of these metrics must match the observed behavior to derive the behavioral key material. This is useful because unlike biometric data based on physical characteristics (such as fingerprints), behavioral data is highly variable and may not always match the observations even for the same user 110. The prototypical use case for a behavioral factor is as means of deploying additional safeguards when unusual behavior is detected; for example, a 2-of-3 threshold-based multi-factor derived key 320 based on a password, email OTP code, and a behavioral factor would allow password authentication (in combination with the behavior factor) to be sufficient for deriving the key when the user 110 is behaving normally, while the password must be combined with an email OTP when abnormal behavior is detected (as the behavioral factor now cannot be used to derive the key).

Figure 46:
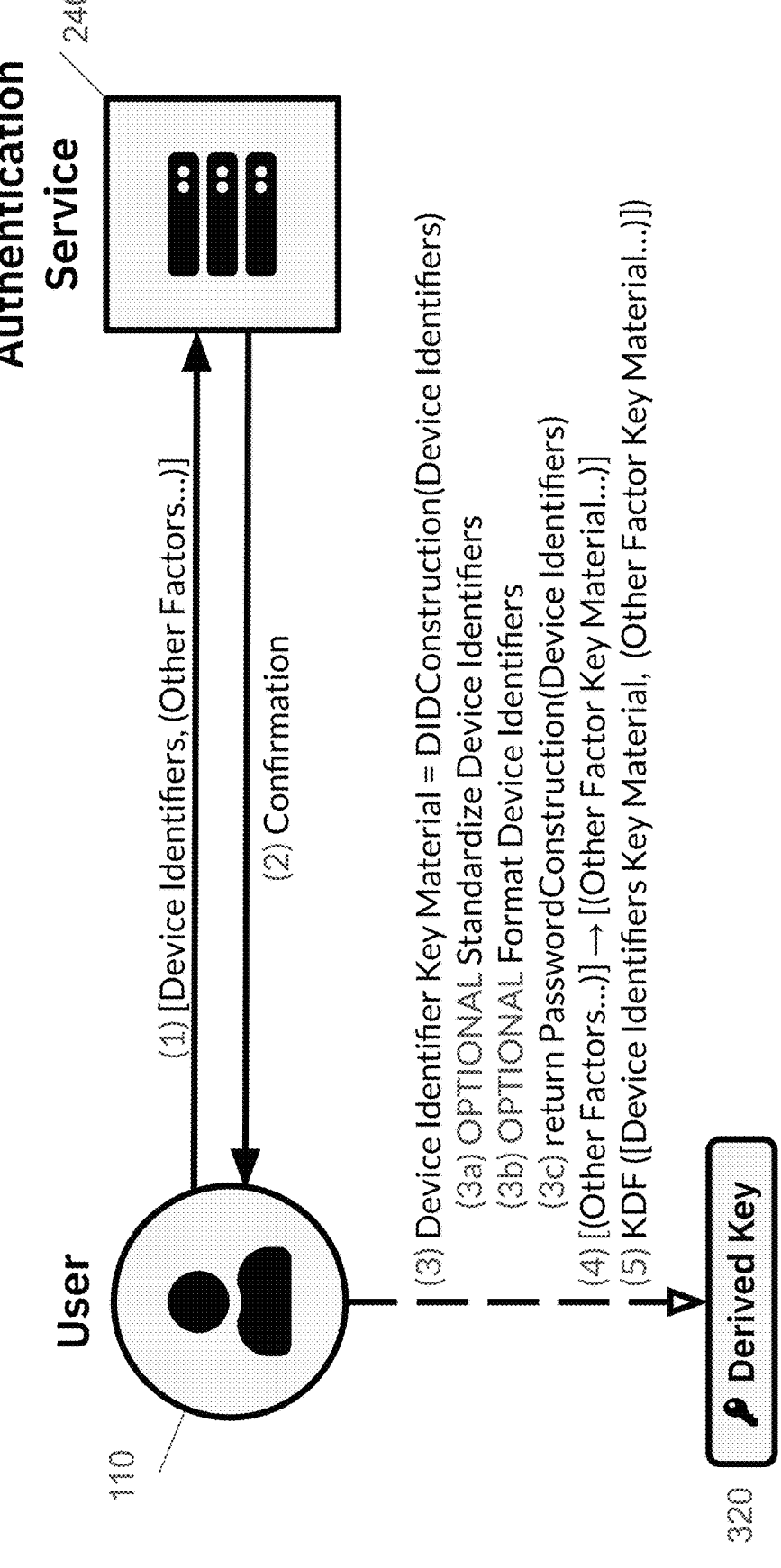
FIG. 46 shows a process of a user deriving a key using a system and method for multi-factor key derivation with a device identifier factor according to one embodiment of the present disclosure.

In one embodiment, device identifiers (such as Serial Number, ESN, MEID, IMEI, MSN, UUID, IP address, MAC address, etc.) may be used as one or more of the factors comprising a multi-factor derived key 320, as shown in FIG. 46. The suggested process for deriving key material from device identifiers is similar to the suggested process for deriving key material from security questions, whereby device identifiers are treated as the answers to security questions. A suggested process for deriving key material from device identifiers or device identifier name and value pairs is as follows: In a first optional step (3*a*), the device identifier names and values are standardized; for example, {'UDID': '0000-1111-2222-3333', 'IP Address': '123.1.123.2'} may be converted to {'ipv4': '123001123002', 'udid': '0000111122223333'}. In a second optional step (3*b*), device identifiers are reformatted; for example, {'ipv4': '123001123002', 'udid': '0000111122223333'} may be converted to "ipv4: 123001123002; udid: 0000111122223333" in this step. In a third step (3*c*), the formatted string may be returned directly as key material, or, a KDF, PBKDF, or cryptographic hash function is used to convert the string into key material. The prototypical use case for a device identifier factor is as means of deploying additional safeguards when an unusual device is used; for example, a 2-of-3 threshold-based multi-factor derived key 320 based on a password, email OTP code, and a device identifier factor would allow password authentication (in combination with the device identifier factor) to be sufficient for deriving the key when the user 110 is behaving normally, while the password must be combined with an email OTP when an unusual device is used (as the device identifier factor now cannot be used to derive the key). In one embodiment, the secret-sharing system described in the context of threshold-based multi-factor key derivation is used in the device identifier key material construction to enable a k-of-n device identifiers factor; in this setting, n device identifiers are established, and later k of these device identifiers must be correct to derive the key material. This is useful if, for example, it is desirable that either having the correct IP address (being on the correct network) or having the correct device identifier (being on the correct device) should on its own be sufficient for deriving the device identifier key material.

Figure 47:
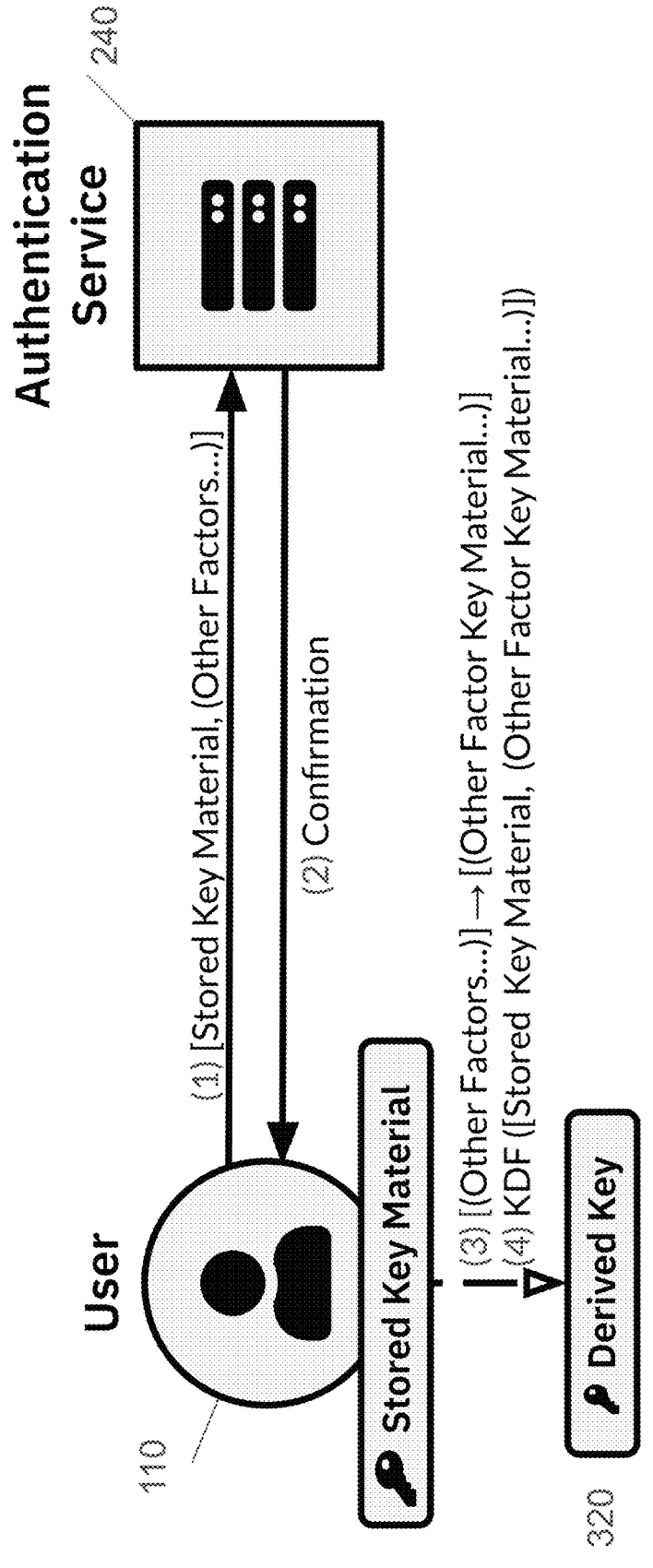
FIG. 47 shows a process of a user deriving a key using a system and method for multi-factor key derivation with a device memory factor according to one embodiment of the present disclosure.

In one embodiment, one or more factors used to derive a multi-factor derived key 320 are stored permanently or semi-permanently on a user device, as shown in FIG. 47. The suggested use case for this is to ease the login process on a device after it has previously been used to login successfully; for example, a 2-of-3 threshold-based multi-factor derived key 320 based on a password, HOTP code, and a stored factor would allow password authentication (in combination with the stored factor) to be sufficient for deriving the key when the user 110 is on a device with stored key material, while the password must be combined with HOTP when a new device is used (and thus no key material is stored on the device). Alternatively, a standard multi-factor derived key 320 based on a password and HOTP code may be used, and the HOTP key material may itself be directly stored on the device to bypass the HOTP step in subsequent key derivations.

In one embodiment, a trusted computing system (such as Intel SGX, AWS Nitro, Apple Secure Enclave, etc.) is used as part of the multi-factor key derivation process, as shown in FIG. 48. Trusted hardware can be used as a general way to construct key material for an arbitrary authentication factor by verifying the factor and outputting some securely stored key material if and only if it is valid. This technique is particularly useful for including authentication factors in a multi-factor derived key 320 when it is difficult to do so using cryptography alone. In step 1, a user 110 sends a request to an authentication service 240 containing a trusted computing system. This request may include one or more cryptographic keys necessary to achieve a secure communication channel with the trusted computing system. In step 2, the authentication service 240 response with an attestation document containing one or more cryptographic keys necessary to achieve a secure communication channel. The user 110 verifies the attestation document, and a bilateral channel between the user 110 and the trusted computing system has now been established. In step 3, the user 110 sends one or more authentication factors to the trusted computing chip through the secure channel (eg. by sending a TOTP code to the trusted computing chip). In step 4, the trusted computing chip verifies the authentication factors and, if acceptable, responds with key material that it has securely stored. In step 5, any other factors being used can be converted into key material locally (eg. a password). In step 6, the multi-factor derived key 320 is derived from key material provided by the trusted computing system (combined with locally derived key material, if applicable).

Figure 49:
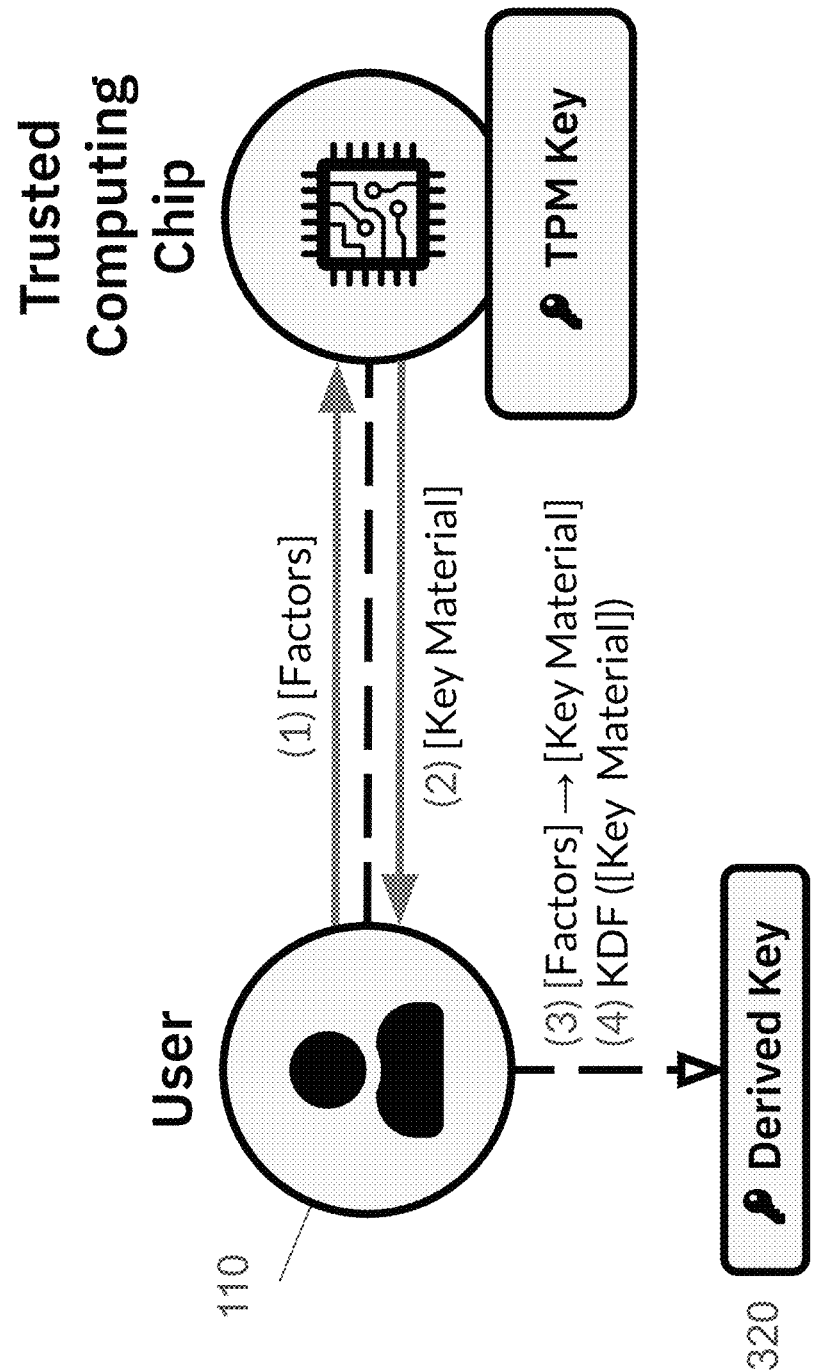
FIG. 49 shows a process of a user deriving a key using an offline system and method for multi-factor key derivation according to one embodiment of the present disclosure.

In one embodiment, a user 110 derives a multi-factor derived key 320 locally without interacting with an authentication service 240, as shown in FIG. 49. Per the example of FIG. 49, some factors (such as passwords) may be directly converted to key material via their non-interactive factor constructions, while other factors (such as TOTP codes) may be converted to key material by interacting with a local trusted computing chip. Any key material provided by the trusted computing system can be combined with any locally-derived key material to produce the multi-factor derived key 320. Non-interactive multi-factor key derivation has important applications to decentralized systems such as crypto-currency wallets.

Figure 50:
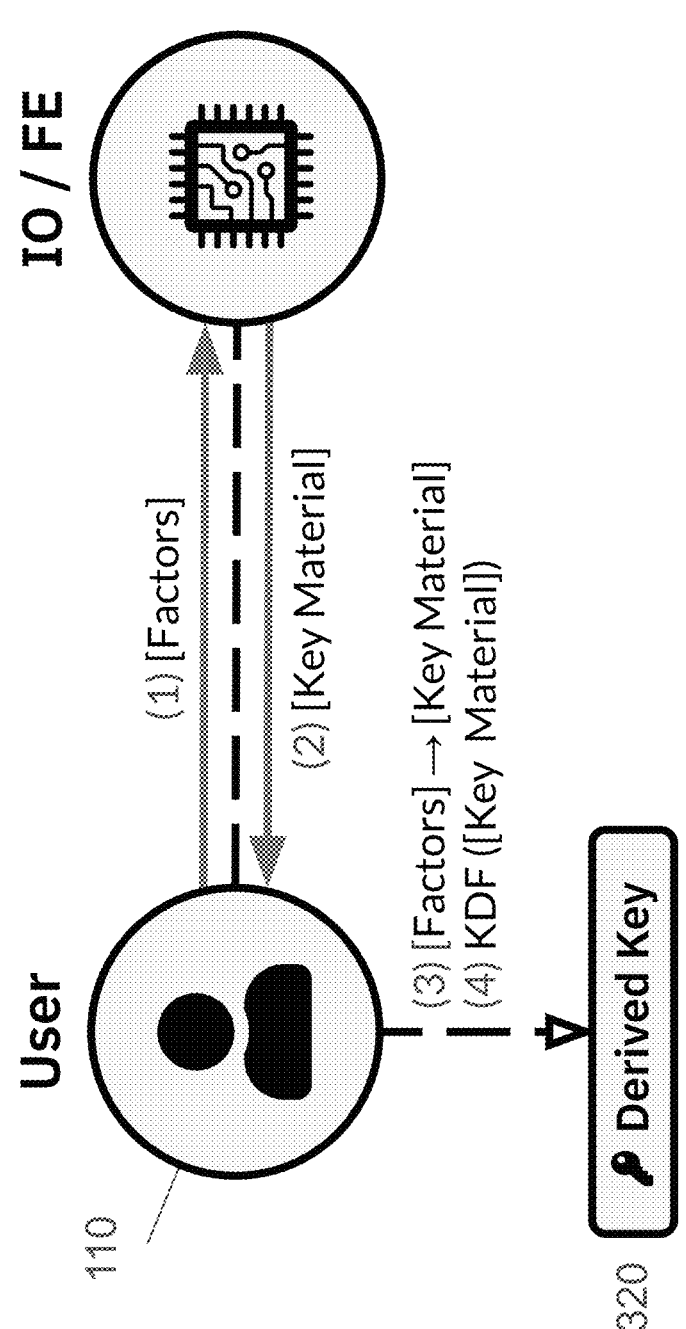
FIG. 50 shows a process of a user deriving a key using a system and method for multi-factor key derivation with an IO/FE based factor according to one embodiment of the present disclosure.

In one embodiment, cryptographic techniques such as indistinguishability obfuscation (IO) or functional encryption (FE) are used to derive key material from arbitrary authentication factors, as shown in FIG. 50. Per the example of FIG. 50, some factors (such as passwords) may be directly converted to key material via their non-interactive factor constructions, while other factors (such as TOTP codes) may be converted to key material by providing them as input to an obfuscated program and receiving key material as output or using a functional encryption of the key material that reveals key material upon successful verification of the factor. Any key material provided by the obfuscated program or functional encryption can be combined with any locally derived key material to produce the multi-factor derived key 320. IO and FE are useful for including authentication factors in a multi-factor derived key 320 when it is difficult to do so by only using simple cryptographic techniques such as encryption, signing, and hashing.

Figure 51:
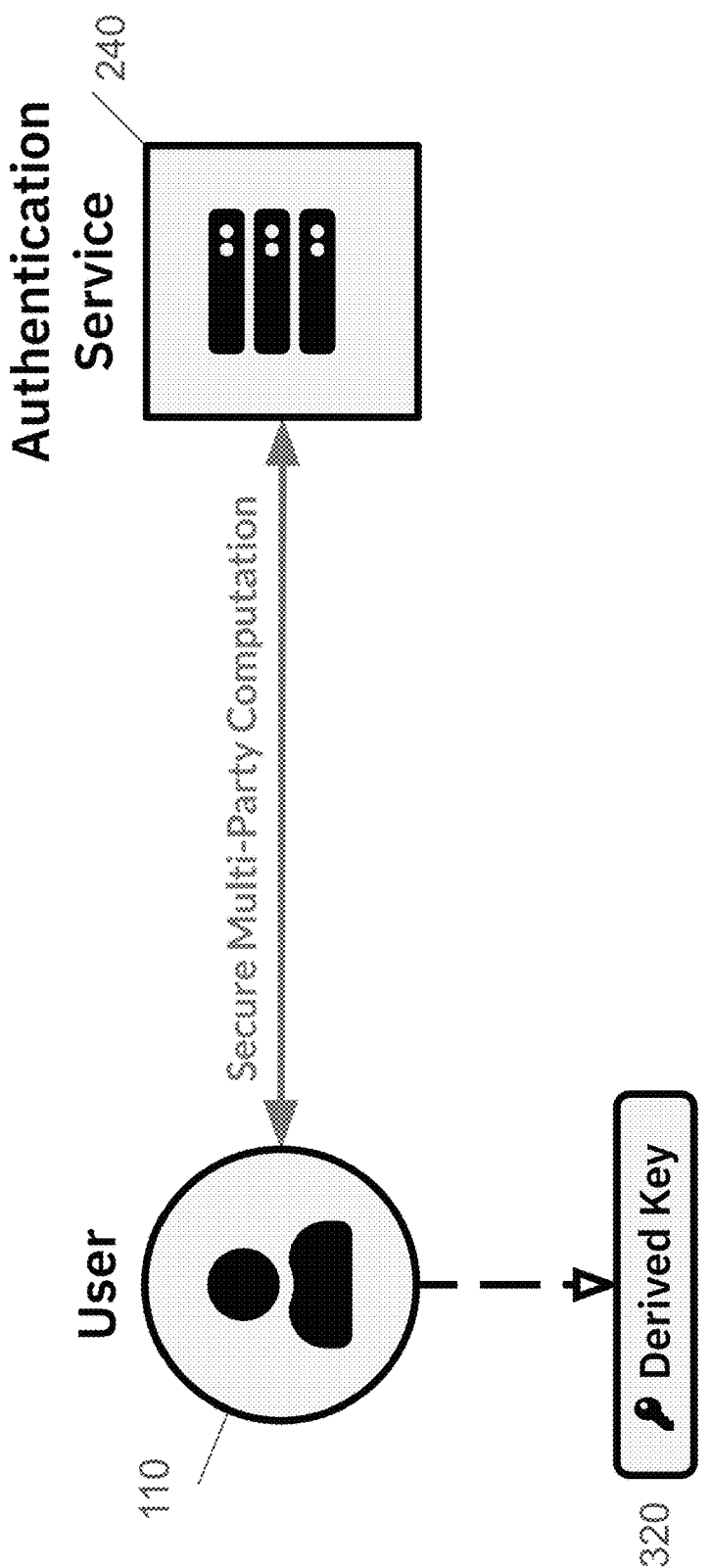
FIG. 51 shows a process of a user deriving a key using a system and method for multi-factor key derivation using secure multi-party computation according to one embodiment of the present disclosure.

In one embodiment, secure multi-party computation between the user 110 and authentication service 240 (using techniques such as garbled circuits or homomorphic encryption) is used to derive key material for a multi-factor derived key 320, as shown in FIG. 51. A secure multi-party computation protocol can be configured such that the user 110 must present a valid authentication factor to obtain the corresponding key material, without ever actually revealing the authentication factor, key material, or derived key to the authentication service 240 in plaintext. It is useful for deriving key material from authentication factors when it is difficult to do so by only using simple cryptographic techniques such as encryption, signing, and hashing.

Figure 52:
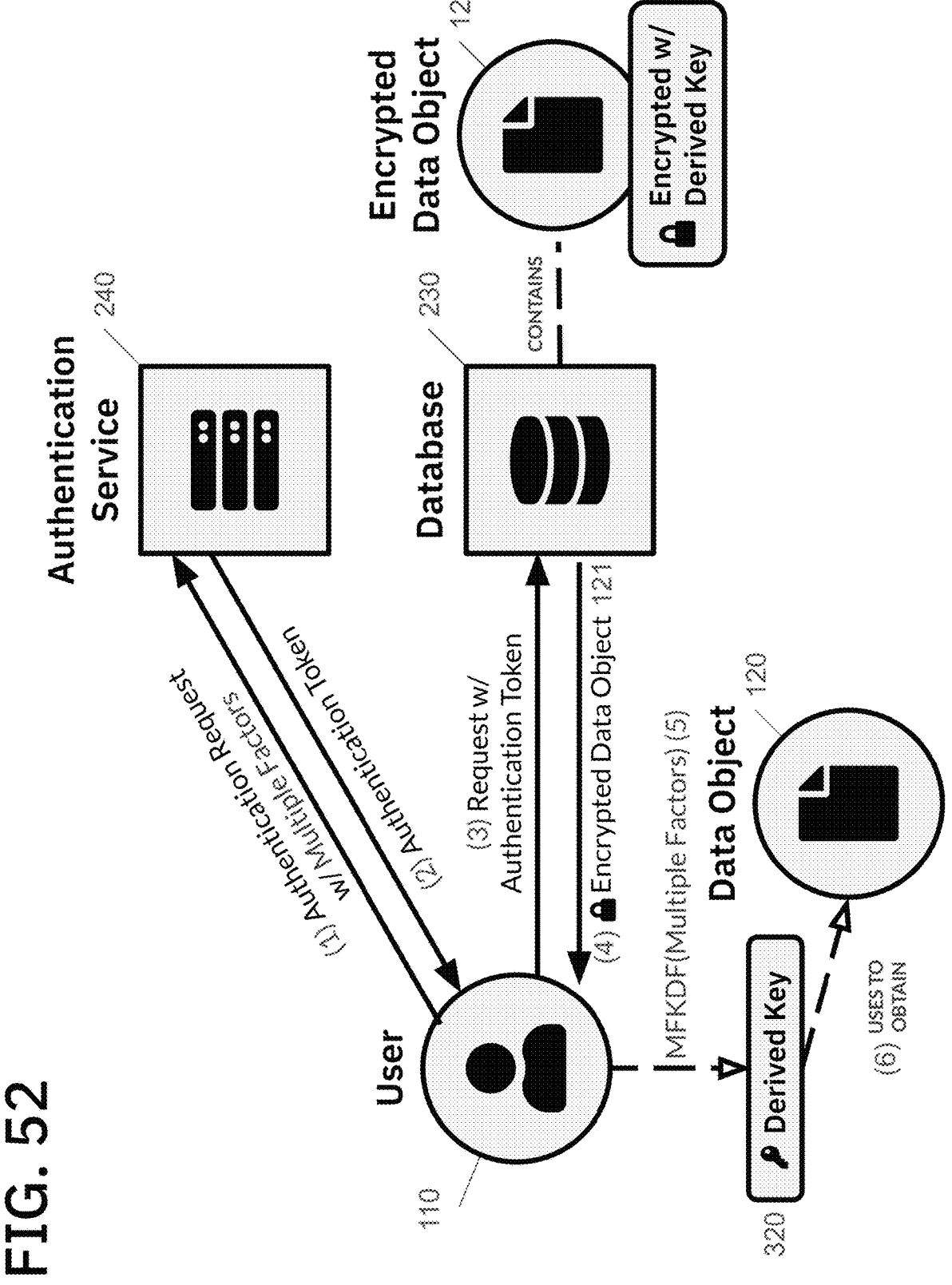
FIG. 52 shows a process of a user retrieving a data object from a data storage system which uses multi-factor authentication and encryption at rest based on a multi-factor derived key according to one embodiment of the present disclosure.

FIG. 52 illustrates a secure data storage system in which data is encrypted at rest using a multi-factor derived key 320. A user 110 performs a multi-factor authentication process with an authentication service 240 (for example, using both a password and a HOTP code) to obtain an authentication token, which is then used to obtain an encrypted data object 121 from a database 230. Using a multi-factor key derivation method, the multiple factors (such as the password and HOTP code) are together used to derive a key, which in turn can be used to retrieve the data object 120. Unlike a system using password-based key derivation, even an adversary which has stolen a user's password and which exploits a vulnerability in the data storage system to obtain stored encrypted data will still be unable to derive the key and will thus not be able to decrypt the data. The password and HOTP-based multi-factor derived key 320 forces the adversary to simultaneously guess the user's password and HOTP code in order to derive the key successfully.

The system and method for multi-factor key derivation described herein advantageously increases the difficulty of an adversary in obtaining a user's derived key. Suppose a user's password contains 108 possibilities and their HOTP code contains 106 possibilities. Further, suppose a chosen KDF configuration includes computational difficulty such that either the adversary or the user may make 100 key derivation attempts per second. In a password-based key derivation system, the adversary may require 108 attempts to guess the user's password, taking up to 106 seconds (or about 11.6 days), which is feasible in practice. The user, knowing the correct password, requires only one attempt, taking about 10 ms. Consider, now, a multi-factor derived key based on the user's password and HOTP code. Once again, the user knowing the correct password and HOTP code, requires only one attempt, taking about 10 ms. However, the adversary may now require up to 1014 attempts to correctly guess the user's password and HOTP code simultaneously, taking up to 1012 seconds (or about 31,689 years), which is completely infeasible in practice. The full benefits and advantages of multi-factor authentication are therefore now also realized in the key derivation process, ensuring encrypted data is fully protected by all available authentication factors, and significantly increasing the difficulty of brute-force attacks.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A method for multi-factor key derivation comprising:
    receiving, by a hardware processor, a plurality of authentication factors, wherein the plurality of authentication factors includes at least two different types of authentication factors;
    routing, by the hardware processor, each of the plurality of authentication factors to at least one of a plurality of intermediate factor-specific functions;
    converting, by the hardware processor, the plurality of authentication factors into key material using the plurality of intermediate factor-specific functions; and
    deriving, by the hardware processor, a cryptographic key from said key material using a key derivation function.

2. The method for multi-factor key derivation of claim 1, further comprising an authentication service with the capability of confirming the at least one of the plurality of authentication factors, wherein a derived cryptographic key is used to authenticate the user with the authentication service.

3. The method for multi-factor key derivation of claim 1, wherein a salt or a pad is used as a component of the key derivation function.

4. The method for multi-factor key derivation of claim 1, wherein the derived key is further used to decrypt an additional key.

5. The method for multi-factor key of claim 1, wherein the plurality of authentication factors are selected from a set of authentication factors used to initially establish the cryptographic key, wherein the plurality of authentication factors required to derive the cryptographic key is less than a number of authentication factors in the set of authentication factors.

6. The method for multi-factor key derivation of claim 1, wherein at least one other key is used in deriving the cryptographic key.

7. The method for multi-factor key derivation of claim 1, wherein a derived key is later modified to change at least one of the plurality of authentication factors used to derive the key.

8. The method for multi-factor key derivation of claim 1, wherein a trusted computing system provides at least a portion of the key material used to derive the key.

9. The method for multi-factor key derivation of claim 1, wherein multi-party computation or functional encryption is used to provide at least a portion of the key material used to derive the key.

10. The method for multi-factor key derivation of claim 1, wherein at least one of the plurality of authentication factors is a fixed string of characters.

11. The method for multi-factor key derivation of claim 1, wherein at least one of the plurality of authentication factors is an HMAC-based one-time password (HOTP) code or a time-based one-time password (TOTP) code.

12. The method for multi-factor key derivation of claim 1, wherein a hardware token constitutes at least one of the plurality of authentication factors.

13. The method for multi-factor key derivation of claim 1, wherein a single sign-on (SSO) process constitutes at least one of the plurality of authentication factors.

14. The method for multi-factor key derivation of claim 1, wherein a code sent via out-of-band authentication constitutes at least one of the plurality of authentication factors.

15. The method for multi-factor key derivation of claim 1, wherein a mobile application constitutes at least one of the plurality of authentication factors.

16. The method for multi-factor key derivation of claim 1, wherein at least one of the plurality of authentication factors is behavioral authentication or biometric authentication.

17. The method for multi-factor key derivation of claim 1, wherein a location factor constitutes at least one of the plurality of authentication factors.

18. The method for multi-factor key derivation of claim 1, wherein a device identifier or key material stored on a user device constitutes at least one of the plurality of authentication factors.

19. The method for multi-factor key derivation of claim 1, wherein an obfuscated program is used to provide at least a portion of the key material.

20. The method for multi-factor key derivation of claim 1, further comprising a database configured to store data objects encrypted with one or more multi-factor derived keys.

* * * * *